(12) United States Patent
Murakami et al.

(10) Patent No.: US 11,201,671 B2
(45) Date of Patent: Dec. 14, 2021

(54) COMMUNICATION SYSTEM, TERMINAL, CONTROL METHOD, AND RECORDING MEDIUM

(71) Applicant: Panasonic Intellectual Property Corporation of America, Torrance, CA (US)

(72) Inventors: Yutaka Murakami, Kanagawa (JP); Nobuhiko Hashida, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/744,766

(22) Filed: Jan. 16, 2020

(65) Prior Publication Data

US 2020/0153507 A1 May 14, 2020

Related U.S. Application Data

(63) Continuation of application No. PCT/JP2018/026258, filed on Jul. 12, 2018.
(Continued)

(51) Int. Cl.
*H04B 10/00* (2013.01)
*H04B 10/116* (2013.01)
(Continued)

(52) U.S. Cl.
CPC .......... *H04B 10/116* (2013.01); *H04B 10/85* (2013.01); *H04N 7/22* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS 10,504,077 B1 * 12/2019 Hu .................. G07D 11/32
2006/0055804 A1 3/2006 Arai et al.
(Continued)

FOREIGN PATENT DOCUMENTS

| CN | 105783914 | 7/2016 |
|---|---|---|
| JP | 2004-221924 | 8/2004 |

(Continued)

OTHER PUBLICATIONS

Extended European Search Report dated Jun. 29, 2020 in corresponding European Patent Application No. 18834335.4.
(Continued)

*Primary Examiner* — Daniel G Dobson
(74) *Attorney, Agent, or Firm* — Wenderoth, Lind & Ponack, L.L.P.

(57) ABSTRACT

A communication system includes: a plurality of cameras that generate image data by capturing images; a server that stores the image data generated by each of the plurality of cameras; and a plurality of transmission devices in one-to-one correspondence with the plurality of cameras. Each of the plurality of transmission devices transmits light including, as a visible light communication signal, information related to communication for accessing a storage location at which the image data generated by a corresponding one of the plurality of cameras is stored in the server.

6 Claims, 60 Drawing Sheets

Related U.S. Application Data

(60) Provisional application No. 62/539,800, filed on Aug. 1, 2017, provisional application No. 62/534,880, filed on Jul. 20, 2017.

(51) Int. Cl.
  *H04B 10/85* (2013.01)
  *H04N 7/22* (2006.01)
  *H04J 14/00* (2006.01)

(58) Field of Classification Search
  CPC ............ H04B 10/1127; H04B 10/1129; H04B 10/114; H04B 10/1141; H04B 10/1143; H04B 10/1149; H04B 10/116
  See application file for complete search history.

(56) References Cited

U.S. PATENT DOCUMENTS

| | | | |
|---|---|---|---|
| 2013/0330088 A1 | 12/2013 | Oshima et al. | |
| 2014/0186026 A1* | 7/2014 | Oshima | H04B 10/116 398/25 |
| 2015/0147070 A1 | 5/2015 | Oshima et al. | |

FOREIGN PATENT DOCUMENTS

| | | |
|---|---|---|
| JP | 2006-86858 | 3/2006 |
| JP | 2008-236159 | 10/2008 |
| JP | 2008236159 A * | 10/2008 |
| JP | 2015-152958 | 8/2015 |
| WO | 2015/148561 | 10/2015 |

OTHER PUBLICATIONS

International Search Report (ISR) dated Oct. 2, 2018 in International (PCT) Application No. PCT/JP2018/026258.
"NGP use case document", IEEE802.11-16/0137r4, Mar. 2016 (https://mentor.ieee.org/802.11/dcn/16/11-16-0137-04-00az-ngp-use-case-document.pptx).
Hisao Koga, et al., "High-speed Power Line Communication System based on Wavelet OFDM", Proceedings of ISPLC 2003.
S. Galli, et al., "Advanced Signal Processing for PLCs: Wavelet-OFDM", Proceedings of 2008 IEEE International Symposium on Power Line Communications and its Applications.

* cited by examiner

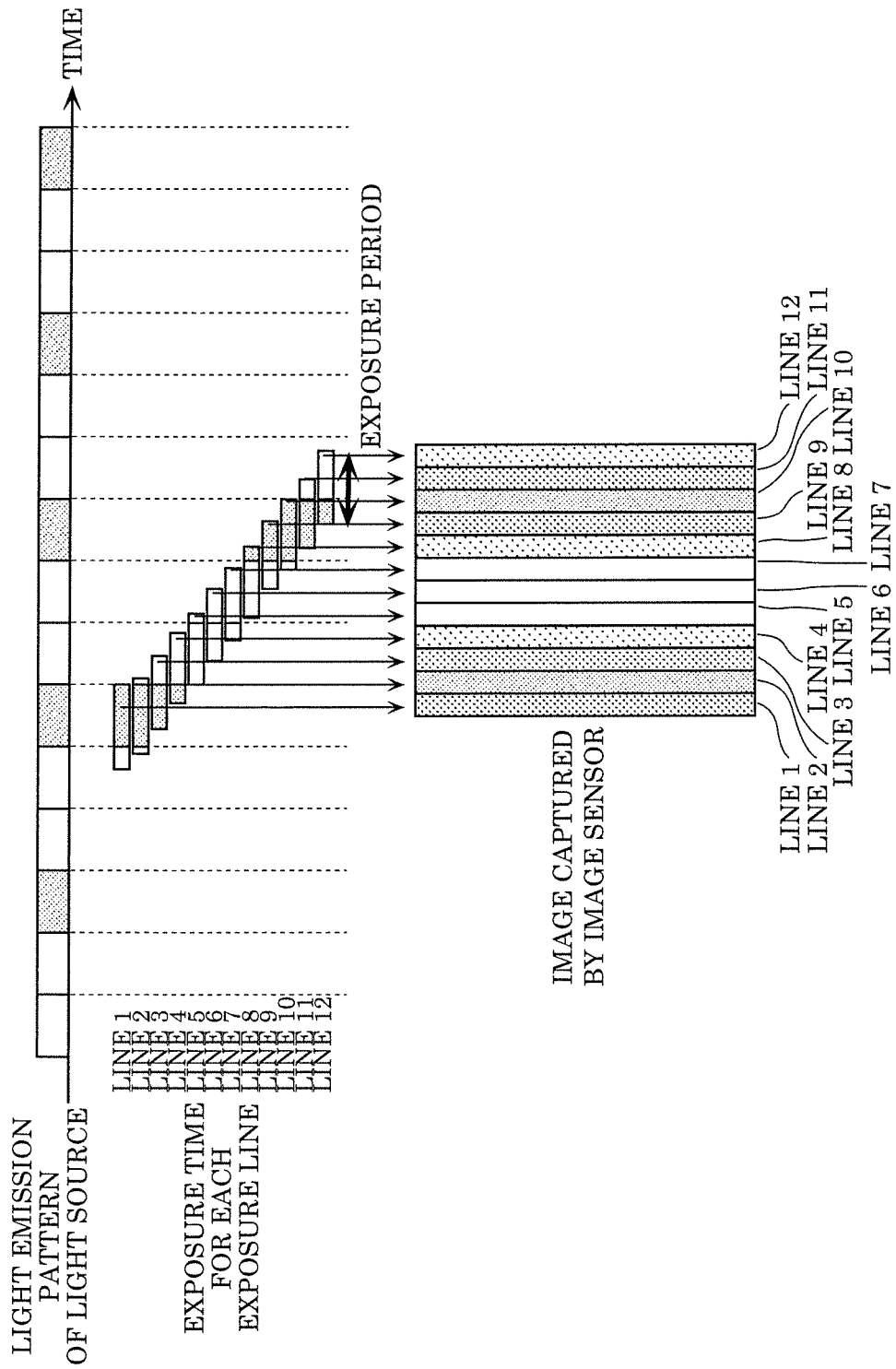

COMMUNICATION SYSTEM, TERMINAL, CONTROL METHOD, AND RECORDING MEDIUM

CROSS REFERENCE TO RELATED APPLICATIONS

This application is a U.S. continuation application of PCT International Patent Application Number PCT/JP2018/026258 filed on Jul. 12, 2018, claiming the benefit of priority of U.S. Provisional Patent Application No. 62/534,880 filed on Jul. 20, 2017, and U.S. Provisional Patent Application No. 62/539,800 filed on Aug. 1, 2017, the entire contents of which are hereby incorporated by reference.

BACKGROUND

1. Technical Field

The present disclosure relates to a communication system, a terminal, a control method, and a recording medium.

2. Description of the Related Art

Devices can use global positioning system (GPS) as a method for obtaining location information. In such cases, devices receive a modulated signal transmitted from a satellite, and estimate location by positioning calculation. However, it is difficult for the device to estimate location information when the device is indoors, where reception of the radio waves transmitted by the GPS satellite is difficult.

As disclosed in "NGP use case document," IEEE802.11-16/0137r4, March 2016. https://mentor.ieee.org/802.11/dcn/16/11-16-0137-04-00az-ngp-use-case-document.pptx, to overcome this problem, there is a method by which the device uses radio waves transmitted from an access point in a wireless local area network (LAN) to estimate location.

SUMMARY

However, since it is not easy to know the service set identifier (SSID) of an access point that can be securely accessed, when the device attempts to obtain location information, there is a possibility that the device will connect to an insecure SSID access point, leading to the possibility of a compromise of information.

Accordingly, the method of obtaining location information can be improved upon.

A communication system according to one aspect of the present disclosure includes: a plurality of cameras that generate image data by capturing an image; a server that stores the image data generated by each of the plurality of cameras; and a plurality of transmission devices in one-to-one correspondence with the plurality of cameras. Each of the plurality of transmission devices transmits light including, as a visible light communication signal, information related to communication for accessing a storage location at which the image data generated by a corresponding one of the plurality of cameras is stored in the server.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

According to the present disclosure, it is possible to improve the method of obtaining location information.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 36G illustrates an example of a light-emission pattern of a light source and a captured image;

DETAILED DESCRIPTION OF THE EMBODIMENTS

Figure 1:
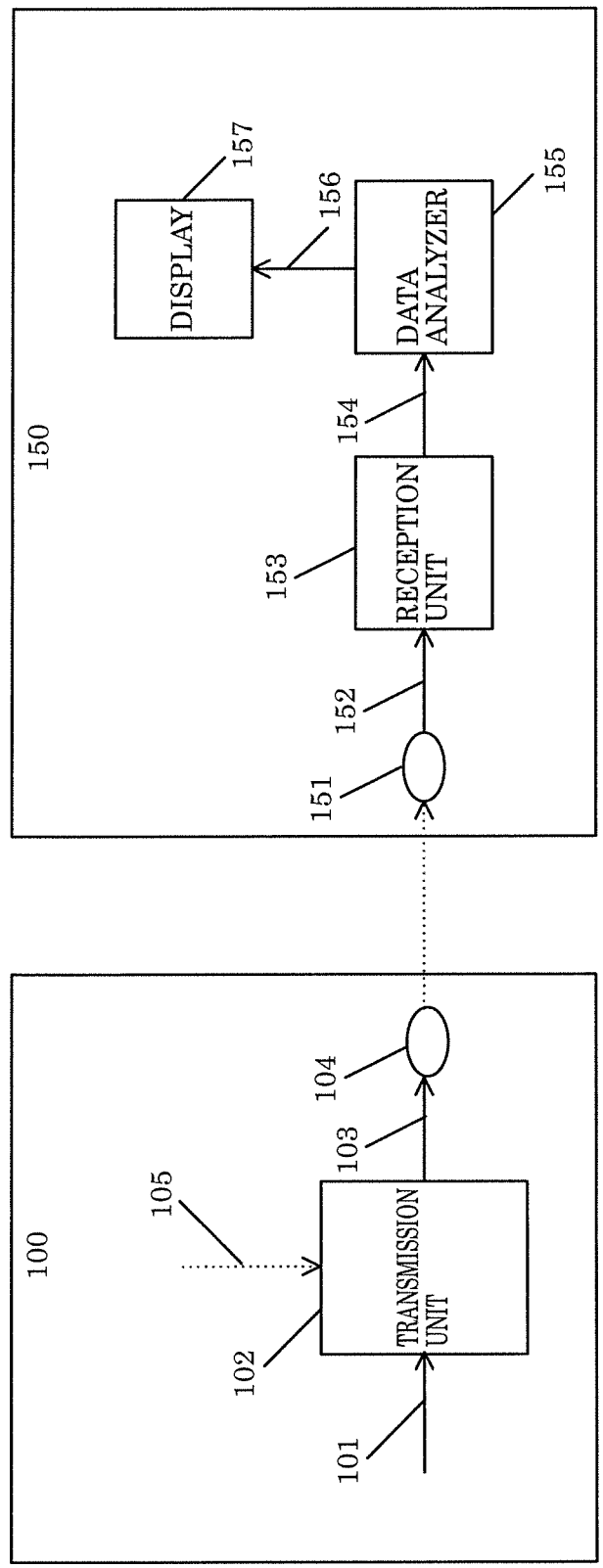
FIG. 1 illustrates one example of a configuration of a device and a terminal.

A communication system according to one aspect of the present disclosure includes: a plurality of cameras that generate image data by capturing an image; a server that stores the image data generated by each of the plurality of cameras; and a plurality of transmission devices in one-to-one correspondence with the plurality of cameras. Each of the plurality of transmission devices transmits light including, as a visible light communication signal, information related to communication for accessing a storage location at which the image data generated by a corresponding one of the plurality of cameras is stored in the server.

With the above aspect, the communication system can more securely provide a terminal with information related to communication for accessing the storage location of image data. The terminal can more securely obtain the location information.

More specifically, the communication system, for example, transmits a modulated signal (for optical communication) including information related to a location from, for example, a light emitting diode (LED) lamp, light source, or light that is provided in a room and emits visible light. The terminal (device) uses, for example, an image sensor such as a Complementary Metal Oxide Semiconductor (CMOS) image sensor or a CMOS image sensor using an Organic Photoconductive Film (OPF) (i.e., an organic CMOS image sensor) to receive a modulated signal (for optical communication), performs processing such as demodulation, and obtains at least information related to a location, whereby the terminal achieves the advantageous effect of being able to securely obtain information related to a location.

For example, the information includes address information indicating the storage location at which the image data is stored.

With the above aspect, the communication system can more easily and securely obtain location information by transmitting address information via visible light communication.

For example, the information includes an encryption key used in encryption of communication for a terminal to access the storage location at which the image data is stored.

With the above aspect, the communication system can more easily and securely obtain location information by transmitting an encryption key via visible light communication.

For example, the information includes an identifier of a base station for wireless communication for a terminal to access the storage location at which the image data is stored.

With the above aspect, the communication system can more easily and securely obtain location information by transmitting an identifier of a base station via visible light communication.

For example, the information includes position information indicating a position of a location at which the image was captured.

With the above aspect, the communication system can more easily and securely obtain location information by transmitting position information of the image capture location via visible light communication.

A terminal according to one aspect of the present disclosure includes: a reception device that receives light including, as a visible light communication signal, information indicating a storage location of image data; and a transceiver device that receives the image data from the storage location indicated in the information received by the reception device.

With this aspect, it is possible to more securely obtain location information.

A control method according to one aspect of the present disclosure is for a communication system including a plurality of cameras, a server, and a plurality of transmission devices in one-to-one correspondence with the plurality of cameras. The control method includes: generating image data by the plurality of cameras capturing an image; storing the image data generated by each of the plurality of cameras in the server; and transmitting, by each of the plurality of transmission devices, light including, as a visible light communication signal, information related to communication for accessing a storage location at which the image data generated by a corresponding one of the plurality of cameras is stored in the server.

This achieves the same advantageous effects as those described for the communication system.

A control method for a terminal according to one aspect of the present disclosure includes: receiving light including, as a visible light communication signal, information indicating a storage location of image data; and receiving the image data from the storage location indicated in the information received.

This achieves the same advantageous effects as those described for the terminal.

General or specific aspects of the above may be realized as a system, method, integrated circuit, computer program, computer-readable storage medium such as a Compact Disc Read only Memory (CD-ROM), or any given combination thereof.

Hereinafter, embodiments are specifically described with reference to the drawings.

Each of the embodiments described below shows a general or specific example. The numerical values, shapes, materials, components, the arrangement and connection of the components, steps, the processing order of the steps etc. shown in the following embodiments are mere examples, and therefore do not limit the scope of the appended Claims and their equivalents. Therefore, among the components in the following embodiments, those not recited in any one of the independent claims defining the broadest concept are described as optional components.

Embodiment 1

FIG. 1 illustrates one example of configurations of device 100 including, for example, a light emitting diode (LED) light source, lamp, light source, and/or light that emits visible light, and terminal 150. Device 100 includes, for example, a light emitting diode (LED) lamp, light source, and/or light that emits visible light. Note that this device is referred to as a "first device".

Transmission unit 102 receives an input of information related to a location or information 101 related to a position. Moreover, transmission unit 102 may receive an input of information 105 related to a time. Moreover, transmission unit 102 may receive an input of both (i) the information related to a location or information 101 related to a position and (ii) information 105 related to a time.

Transmission unit 102 receives an input of information related to a location or information 101 related to a position and/or information 105 related to a time, and based on the one or more input signals, generates a modulated signal (for optical communication), and outputs modulated signal 103. For example, modulated signal 103 is transmitted from light source 104.

Next, examples of the information related to a location or information 101 related to a position will be given.

Example 1

Information related to a location or information 101 related to a position may be information indicating the latitude and/or longitude of a location or position. For example, the information related to a location or information 101 related to a position may be information indicating "45 degrees north latitude, 135 degrees east longitude".

Example 2

Information related to a location or information 101 related to a position may be information indicating an address. For example, the information related to a location or information 101 related to a position may be information indicating "1-1-1 XYZ-machi, Chiyoda-ku, Tokyo-to".

Example 3

Information related to a location or information 101 related to a position may be information indicating a building or facility, for example. For example, the information related to a location or information 101 related to a position may be information indicating "Tokyo Tower".

Example 4

Information related to a location or information 101 related to a position may be information indicating a fixed location or position of something at a building or facility, for example.

For example, assume there are five parking spaces for automobiles in a parking lot. Assume the first through fifth parking spaces are named A-1 through A-5, respectively. In this example, the information related to a location or information 101 related to a position may be information indicating, for example, "A-3".

This example is not limited to only parking spaces in a parking lot.

Information related to a location or information 101 related to a position may be for example, information related to a section, a seat, a store, a facility, etc., at, for example, a concert facility, a stadium such as a baseball, soccer, or tennis stadium, an airplane, an airport lounge, a railway, a station, etc.

Note that methods for configuring the information related to a location or information 101 related to a position are not limited to the above examples.

Terminal 150 receives the modulated signal transmitted by first device 100.

Light receiver 151 is, for example, a CMOS or organic CMOS image sensor. Light receiver 151 receives light including the modulated signal output from the first device, and outputs reception signal 152. Reception unit 153 receives an input of reception signal 152, performs processing such as demodulation and error correction decoding on the modulated signal included in the reception signal, and outputs reception data 154.

Note that reception signal 152 output from light receiver 151 may be a signal including information on an image or moving picture obtained by the image sensor, and may be an output signal from an element that performs photo-electric conversion (an element that converts light into an electric signal). In the following description, when a reception-side device is described as receiving a modulated signal without giving any further details on the processes performed by light receiver 151, this means that the reception-side device obtains a signal of an image or moving picture and a modulated signal for transmitting information by photo-electric conversion (converting light into an electric signal) of light including the modulated signal by light receiver 151. However, the method described above used to receive the modulated signal by the reception-side device is merely one non-limiting example.

Data analyzer 155 receives an input of reception data 154, estimates, for example, the location or position of terminal 150 from reception data 154, and outputs information 156 including at least information on the location or position of terminal 150.

Display 157 receives an input of information 156, and displays information related to the location or position of terminal 150 based on the location or position of terminal 150 included in information 156.

Figure 2:
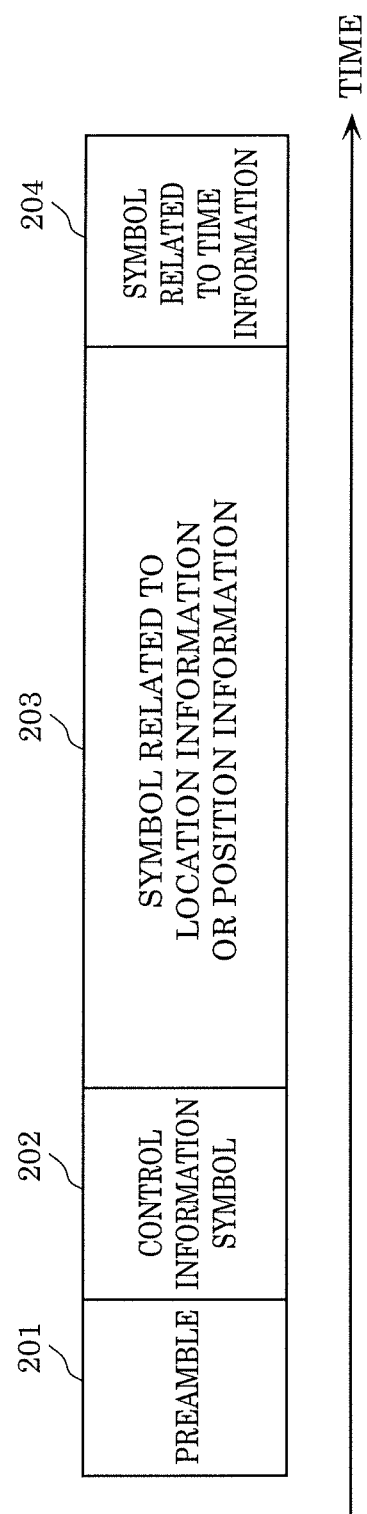
FIG. 2 illustrates one example of a frame configuration transmitted in a modulated signal transmitted by a device.

FIG. 2 illustrates one example of a configuration of a frame transmitted in a modulated signal transmitted by first device 100. In FIG. 2, time is represented on the horizontal axis. For example, the first device transmits preamble 201 and then transmits control information symbol 202, symbol 203 related to location information or position information, and symbol 204 related to time information.

Here, preamble 201 is a symbol for terminal 150, which receives the modulated signal transmitted by first device 100, to perform, for example, signal detection, time synchronization, and/or frame synchronization.

Control information symbol 202 is, for example, a symbol including data on, for example, the configuration method of the modulated signal, the error correction encoding scheme used, and/or the frame configuration method.

Symbol 203 related to location information or position information is a symbol including information related to a location or information related to a position illustrated in FIG. 1.

The frame may include symbols other than symbols 201, 202, and 203. For example, as illustrated in FIG. 2, the frame may include symbol 204 related to time information. Symbol 204 related to time information includes, for example, information indicating a time of transmission of the modulated signal by the first device. Note that the frame configuration of the modulated signal transmitted by the first device is not limited to the frame configuration illustrated in FIG. 2. Moreover, the symbols included in the modulated signal are not limited to the configuration illustrated in FIG. 2 (the modulated signal may include symbols including other data and/or information).

Next, the advantageous effects achieved when the first device transmits a modulated signal and the terminal receives the modulated signal, as described with reference to FIG. 1 and FIG. 2, will be described.

Since the first device transmits the modulated signal via visible light, a terminal capable of receiving the modulated signal is not in a location significantly far from the location of the first device. Accordingly, by the terminal obtaining the location or position information transmitted by the first device, the terminal can achieve an advantageous effect whereby it is possible to easily (i.e., without having to perform complicated signal processing) obtain accurate position information. Moreover, when the first device is disposed in a place where reception of satellite radio waves from a GPS satellite is difficult, it is possible to achieve an advantageous effect whereby it is possible for the terminal to securely obtain accurate position information even in locations in which reception of radio waves from a GPS satellite is difficult, by the terminal receiving the modulated signal transmitted by the first device.

Embodiment 2

In this embodiment, a configuration in which a plurality of the first devices described in Embodiment 1 are provided will be described.

Figure 3:
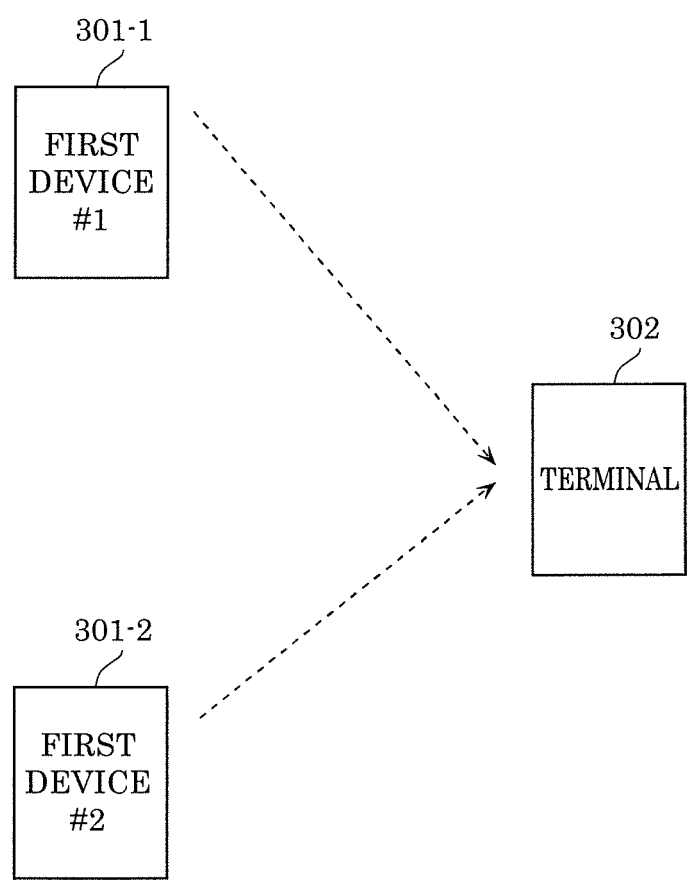
FIG. 3 illustrates one example of a configuration including a plurality of devices.

In this embodiment, for example, as illustrated in FIG. 3, first device #1 301-1 having the same configuration as first device 100 illustrated in FIG. 1 transmits a modulated signal, and terminal 302 receives the modulated signal. Terminal 302 receives the modulated signal transmitted by first device #1 301-1, and obtains, for example, information related to first location or position #1 and information related to first time #1.

Similarly, first device #2 301-2 having the same configuration as first device 100 illustrated in FIG. 1 transmits a modulated signal, and terminal 302 receives the modulated signal. Terminal 302 receives the modulated signal transmitted by first device #2 301-2, and obtains, for example, information related to first location or position #2 and information related to first time #2.

With this, terminal 302 can know the distance between first device #1 301-1 and first device #2 301-2 illustrated in FIG. 3 from the information related to first location or position #1 and the information related to first location or position #2. Moreover, terminal 302 can know the distance between terminal 302 and first device #1 301-1 based on the information related to first time #1, and, for example, the time at which the terminal receives the modulated signal transmitted by first device #1 301-1. Similarly, terminal 302 can know the distance between terminal 302 and first device #2 301-2 based on the information related to first time #2, and, for example, the time at which the terminal receives the modulated signal transmitted by first device #2 301-2.

Moreover, terminal 302 knows the position of first device #1 from the information related to the first location or position #1. Moreover, terminal 302 knows the position of first device #2 from the information related to the first location or position #2. Terminal 302 knows the geometry of the triangle formed by first device #1 301-1, first device #2 301-2, and terminal 302 from the distance between first device #1 301-1 and first device #2 301-2, the distance between first device #1 301-1 and the terminal, and the distance between first device #2 301-2 and the terminal.

Accordingly, terminal 302 can accurately calculate and obtain the position of terminal 302 from the position of the first device #1, the position of the first device #2, and the geometry of the triangle formed by first device #1 301-1, first device #2 301-2, and terminal 302.

However, the geodetic measurement method used by terminal 302 to obtain the location or position information is not limited to the method described above; any geodetic measurement method may be used. Examines of geodetic measurement methods include triangulation, traverse calculation, leveling, etc.

As described above, the terminal can obtain the above-described information from a plurality of devices including light sources that transmit location information, and as a result, it is possible to achieve an advantageous effect whereby the terminal can accurately estimate position. Moreover, as described in Embodiment 1, when the device including a light source that transmits location information is disposed in a place where reception of satellite radio waves from a GPS satellite is difficult, it is possible to achieve an advantageous effect whereby it is possible for the terminal to securely obtain accurate position information even in locations in which reception of radio waves from a GPS satellite is difficult, by the terminal receiving the modulated signal transmitted by the device.

Note that in the above example, the terminal receives modulated signals transmitted by two devices, but an embodiment in which the terminal receives modulated signals transmitted by more than two devices can be implemented in the same manner. Note that the more devices there are, the more accurately the terminal can calculate the position information, so from this viewpoint, more devices are more beneficial.

Embodiment 3

Figure 4:
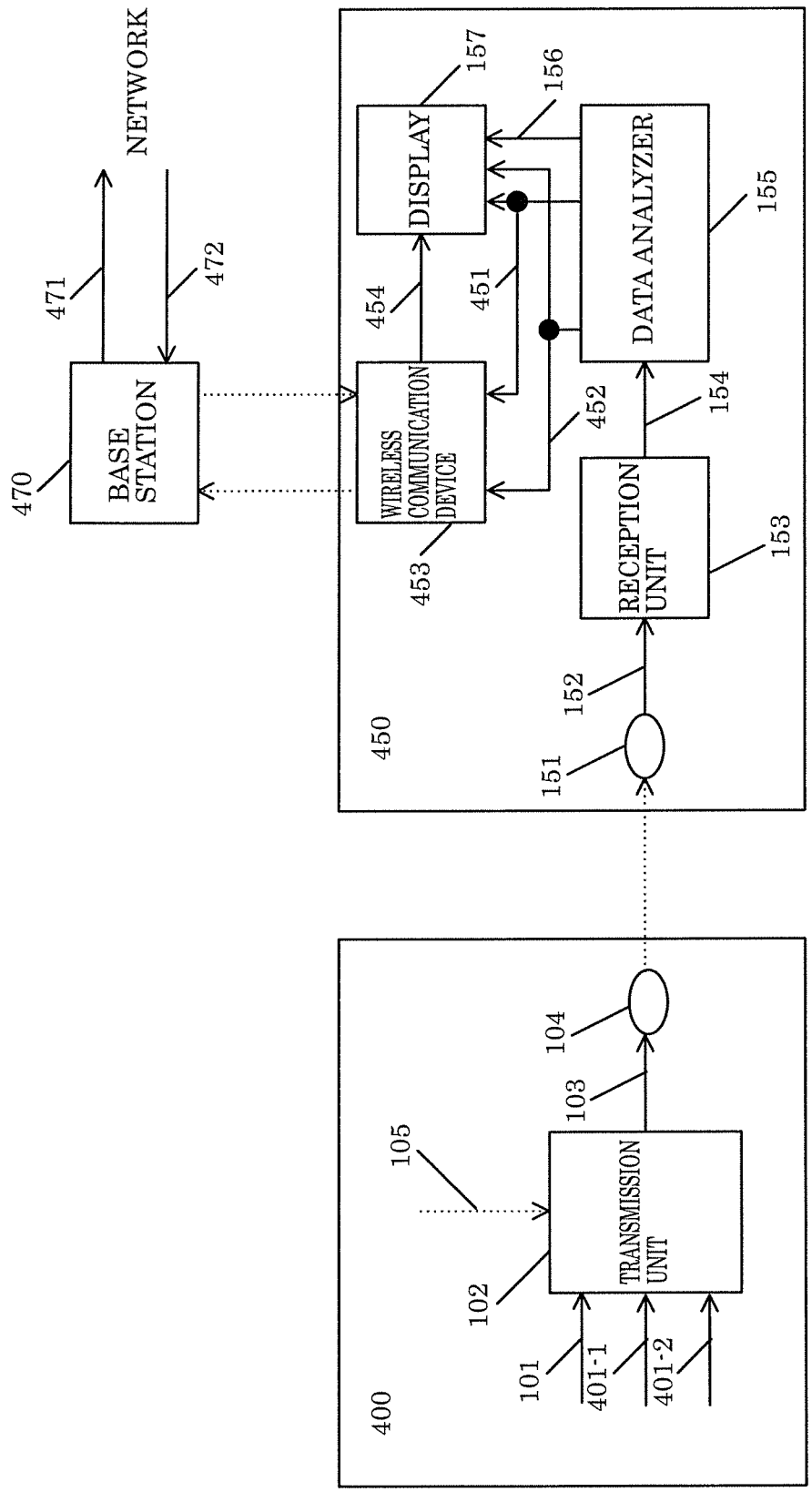
FIG. 4 illustrates one example of a configuration of a device, a terminal, and a base station that communicates with the terminal.

FIG. 4 illustrates one example of configurations of: a device including, for example, an LED light source, lamp, light source, and/or light that emits visible light; a terminal; and, for example, a base station that communicates with the terminal. Device 400 in FIG. 4 includes, for example, an LED lamp, light source, and/or light that emits visible light. Note that the device is referred to as a "first device". In first device 400 in FIG. 4, elements that operate the same as in first device 100 in FIG. 1 share like reference marks.

Terminal 450 in FIG. 4 indicates the configuration of a terminal, and elements that are the same as in FIG. 1 share like reference marks.

In first device 400 in FIG. 4, transmission unit 102 receives inputs of, for example, information related to a location or information 101 related to a position, information 401-1 related to a service set identifier (SSID), and information 401-2 related to an access destination. Moreover, transmission unit 102 may receive an input of information 105 related to a time.

Transmission unit 102 receives inputs of information related to a location or information 101 related to a position, information 401-1 related to an SSID, information 401-2 related to an access destination, and/or information 105 related to a time, and based on the one or more input signals, generates a modulated signal (for optical communication), and outputs modulated signal 103. For example, modulated signal 103 is transmitted from light source 104.

Note that since examples of the information related to a location or information 101 related to a position are the same as described in Embodiment 1, repeated description will be omitted.

Next, information 401-1 related to an SSID and information 401-2 related to an access destination will be described.

First, information 401-1 related to an SSID will be described.

Information 401-1 related to an SSID is information indicating the SSID of the base station (or access point (AP)) 470 illustrated in FIG. 4. When processing is performed for determining whether or not the SSID notified via the optical signal is the SSID of a secure base station, first device 400 can provide access to base station 470, which is a secure access destination for terminal 450. With this, terminal 450 in FIG. 4 can achieve the advantageous effect of being able to securely obtain information from base station (or AP) 470. On the other hand, first device 400 can restrict the terminals that access base station 470 to terminals in a space in which it is possible to receive optical signals transmitted (emitted) by first device 400.

Note that when terminal 450 receives an optical signal transmitted via a predetermined scheme, it may be determined that the notified SSID is the SSID of a secure base station, and, alternatively, processing for determining whether the SSID is secure or not may be performed. For example, first device 400 may transmit a predetermined identifier in an optical signal, and the terminal may determine whether the notified SSID is the SSID of a secure base station or not based on the received identifier. Alternatively, the processing for determining whether the base station is secure or not may be omitted by terminal 450, and instead, the user may select a first device 400 that is highly secure utilizing the characteristics of the visible light, and the SSID of the highly secure base station may be obtained by terminal 450 receiving the optical signal from first device 400.

Note that although FIG. 4 only illustrates base station (or AP) 470, for example, when there is a base station (or AP) other than base station (or AP) 470, terminal 450 in FIG. 4 accesses base station (or AP) 470 to obtain information.

Information 401-2 related to an access destination is information related to an access destination for terminal 450 in FIG. 4 to access base station (or AP) 470 and then obtain information (note that a specific example of operations will be given later).

Terminal 450 in FIG. 4 receives the modulated signal transmitted by first device 400. Note that in terminal 450 in FIG. 4, operations that are the same as in terminal 150 in FIG. 1 share like reference marks.

Light receiver 151 included in terminal 450, examples of which include an image sensor such as a CMOS or organic CMOS image sensor, receives the modulated signal transmitted by first device 400. Reception unit 153 receives an input of reception signal 152 received by light receiver 151, performs processing such as demodulation and error correction decoding on the reception signal, and outputs reception data 154.

Data analyzer 155 receives an input of reception data 154, estimates, for example, the location or position of the terminal from reception data 154, and outputs information 156 including at least information on the location or position of the terminal, information 451 related to an SSID, and information 452 related to an access destination.

Display 157 receives inputs of information 156 including information on the location or position of the terminal, information 451 related to an SSID, and information 452 related to an access destination, and, for example, displays the location or position of the terminal, the SSID of a communication partner that wireless communication device 453 included in terminal 450 accesses, and the access destination (this display is referred to as a "first display").

For example, after the first display, wireless communication device 453 included in terminal 450 in FIG. 4 receives inputs of information 451 related to an SSID and information 452 related to an access destination. Then, wireless communication device 453 included in terminal 450 in FIG. 4 connects to the communication partner by using, for example, radio waves, based on information 451 related to an SSID. Note that in the example illustrated in FIG. 4, wireless communication device 453 included in terminal 450 in FIG. 4 connects to base station 470.

Then, based on information 452 related to an access destination, wireless communication device 453 included in terminal 450 in FIG. 4 generates a modulated signal from data including the information related to an access destination, and transmits the generated modulated signal to base station 470 over, for example, radio waves.

Base station (or AP) 470, which is the communication partner of the terminal in FIG. 4, receives the modulated signal transmitted by wireless communication device 453 included in terminal 450 in FIG. 4. Then, base station (or AP) 470 performs processing such as demodulation and error correction decoding on the received modulated signal, outputs reception data 471 including information on the access destination transmitted by terminal 450 in FIG. 4, and based on the information on the access destination, base station (or AP) 470 accesses a desired access destination over a network and, for example, obtains desired information 472 from the access destination.

Then, base station 470 receives an input of the desired information 472, generates a modulated signal from the desired information 472, and transmits the modulated signal to terminal 450 in FIG. 4 over, for example, radio waves.

Wireless communication device 453 in terminal 450 in FIG. 4 receives the modulated signal transmitted by base station 470, performs processing such as demodulation and error correction decoding, and obtains the desired information 472.

For example, assume the desired information 472 is information related to a section, a seat, a store, a facility, etc., on/at, for example, a map, a map or floor guide for a building, a map or floor guide for a facility, a map or floor guide for a parking lot, a concert facility, a stadium such as a baseball, soccer, or tennis stadium, an airplane, an airport lounge, a railway, a station, etc.

Display 157 receives inputs of the desired information 472, information 156 including, at least information on the location or position of the terminal, information 451 related to an SSID, and after the first display, displays a result of mapping the position of the terminal on the display of the map, floor guide, facility information, seat information, or store information, based on the desired information 472 and information 156 including at least information on the location or position of the terminal.

Figure 5:
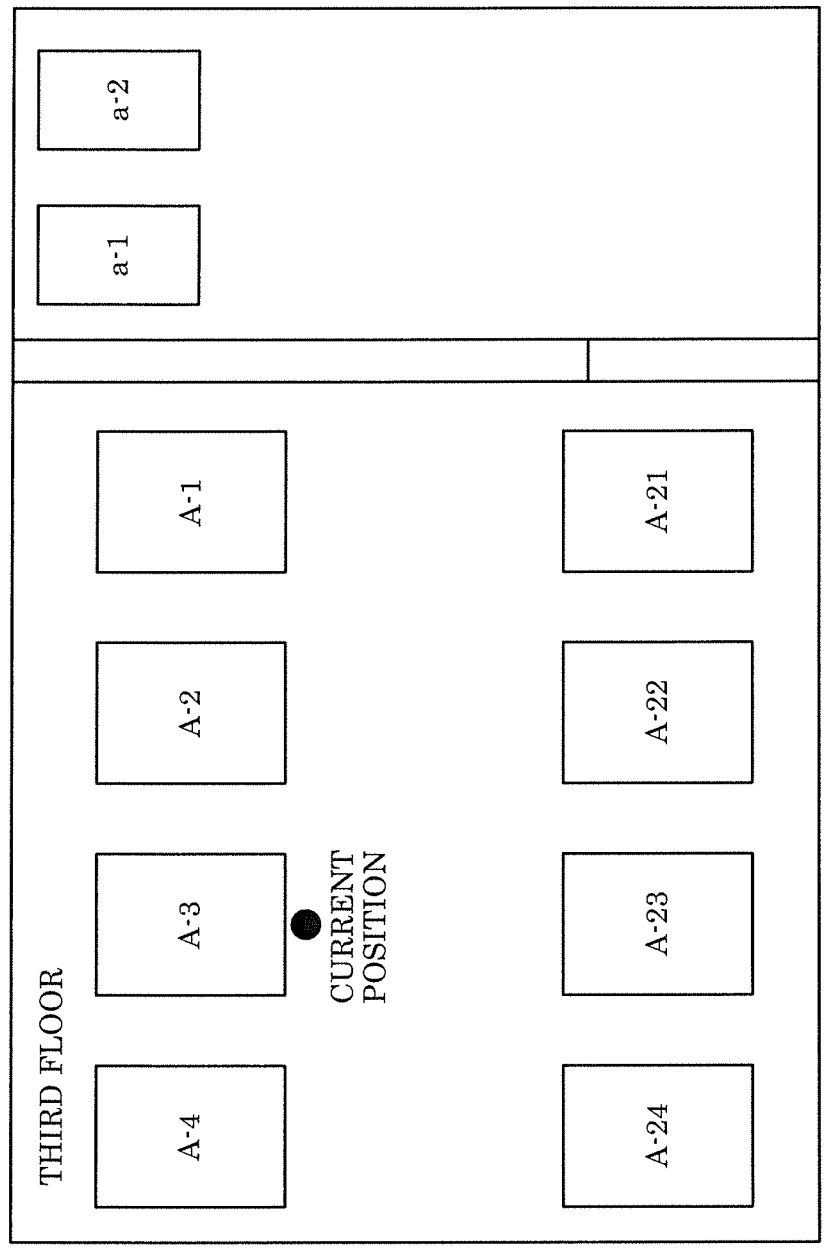
FIG. 5 illustrates a specific example of a screen displayed on a display.

A specific example will be given. FIG. 5 illustrates one example of a display displayed by display 157. The display in FIG. 5 indicates that this is the third floor of a building. Each of A-1, A-2, A-3, A-4, A-21, A-22, A-23, and A-24 indicates a position of a parking space for an automobile. a-1 and a-2 indicate positions of elevators. The information on this map is the desired information 472. As illustrated in FIG. 5, the "current location" is mapped on the map. Here, the current location is information obtained from information 156 including at least information on the location or position of the terminal.

Figure 6:
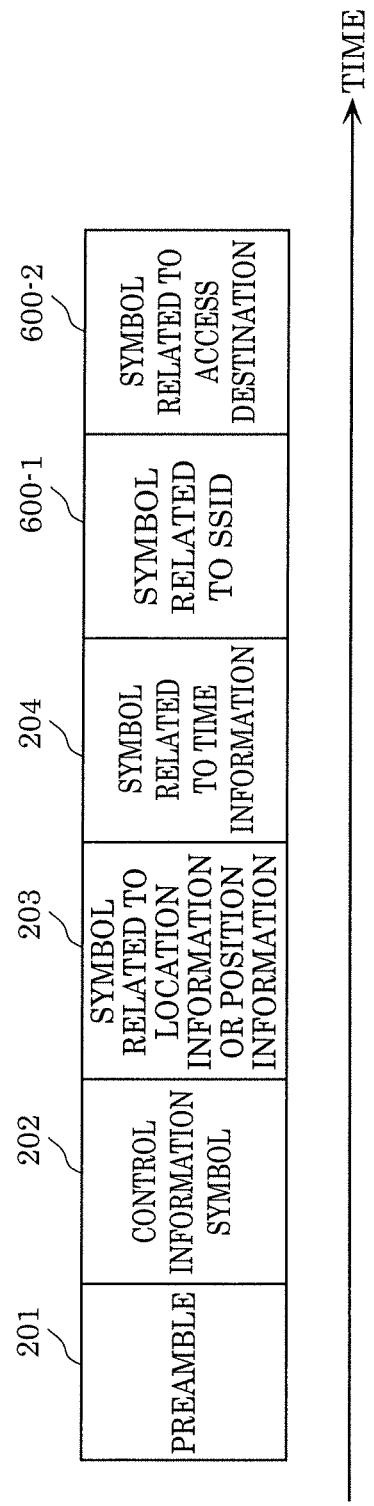
FIG. 6 illustrates one example of a frame configuration of a modulated signal transmitted by a device.

FIG. 6 illustrates one example of a configuration of a frame of a modulated signal transmitted by first device 400 in FIG. 4. In FIG. 6, time is represented on the horizontal axis, and symbols that transmit the same information as indicated in FIG. 2 share like reference marks. Accordingly, repeated description will be omitted First device 400 transmits symbol 600-1 related to an SSID and symbol 600-2 related to an access destination in addition to preamble 201, control information symbol 202, symbol 203 related to location information or position information, and symbol 204 related to time information.

Note that symbol 600-1 related to an SSID is a symbol for transmitting information 401-1 related to an SSID illustrated in FIG. 4, and symbol 600-2 related to an access destination is a symbol for transmitting information 401-2 related to an access destination in FIG. 4. Note that in the frame illustrated in FIG. 6, symbols other than the symbols shown in FIG. 6 may be included. Moreover, the frame configuration, including the order in which the symbols are transmitted, is not limited to the configuration illustrated in FIG. 6.

Figure 7:
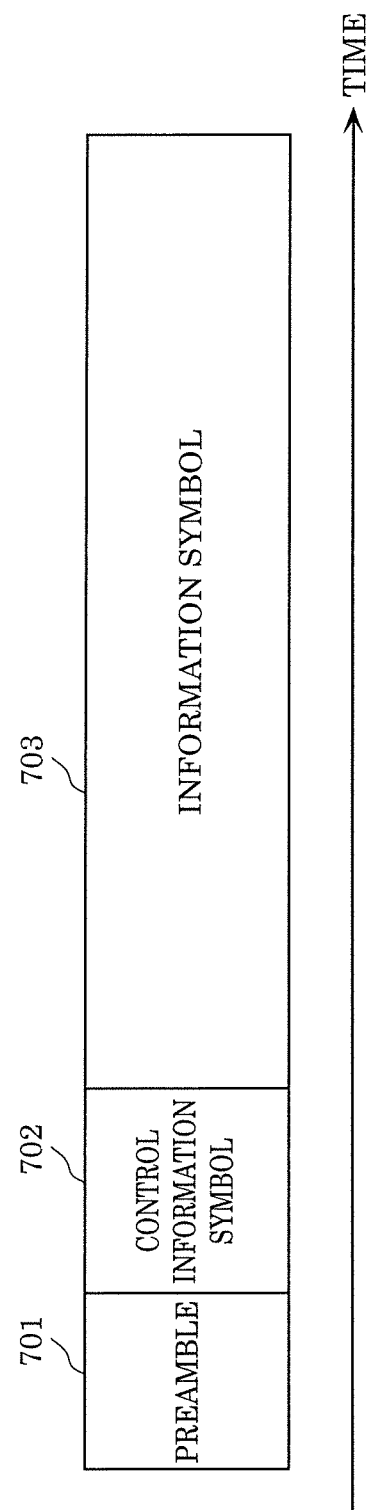
FIG. 7 illustrates one example of a frame configuration of a modulated signal transmitted by a base station.

FIG. 7 illustrates one example of a frame configuration of a modulated signal transmitted by base station 470 illustrated in FIG. 4. Time is represented on the horizontal axis. As illustrated in FIG. 7, base station 470 transmits, for example, preamble 701, and then transmits control information symbol 702 and information symbol 703.

Here, preamble 701 is a symbol for the terminal, which receives the modulated signal transmitted by base station 470, to perform, for example, signal detection, time synchronization, frame synchronization, and/or frequency offset estimation.

Control information symbol 702 includes, for example, information related to the error correction encoding scheme method and/or demodulation scheme used in the generation of the modulated signal, and information related to frame configuration.

Information symbol 703 is a symbol for transmitting information. Note that in this embodiment, information symbol 703 is a symbol for transmitting the desired information 472 described above.

Note that base station 470 in FIG. 4 may transmit a frame including symbols other than the symbols illustrated in FIG. 7 (for example, a frame including a pilot symbol (reference symbol) midway through the information symbol). Moreover, the frame configuration, including the order in which the symbols are transmitted, is not limited to the configuration illustrated in FIG. 7. In FIG. 7, a plurality of symbols may be present along the frequency axis, that is to say, symbols may be present on a plurality of frequencies (a plurality of carriers).

Moreover, for example, a modulated signal that has the frame configuration illustrated in FIG. 6 and is transmitted by the first device being transmitted at a regular timing, e.g., repeatedly transmitted is conceivable. This makes it possible for a plurality of terminals to implement the operations described above.

Figure 8:
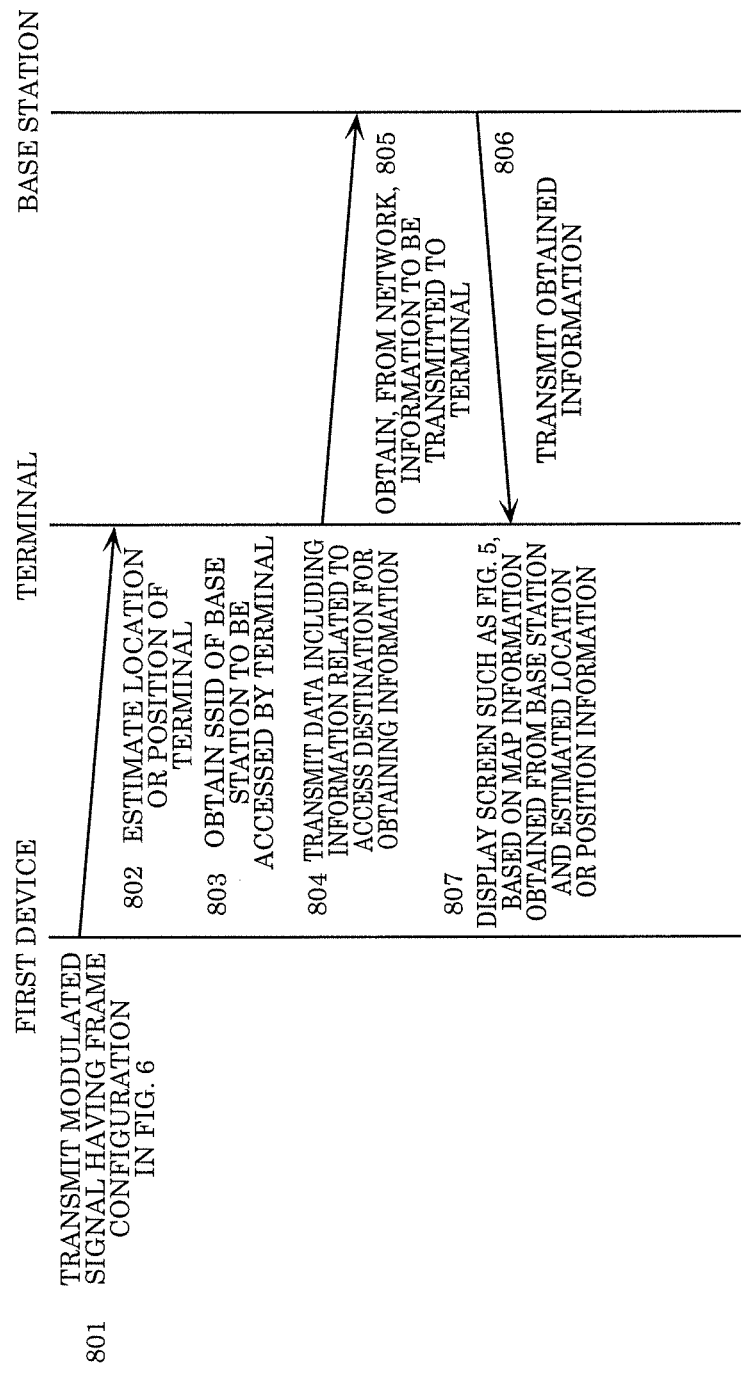
FIG. 8 is a flow chart of one example of processes performed by a device, a terminal, and a base station.

FIG. 8 is a flow chart illustrating one example of processes implemented by first device 400, terminal 450, and base station (or AP) 470 illustrated in FIG. 4.

First, as 801 in FIG. 8 illustrates, first device 400 in FIG. 4 transmits a modulated signal having the frame configuration illustrated in FIG. 6.

Then, as 802 in FIG. 8 illustrates, the modulated signal transmitted by first device 400 in FIG. 4 is received, and terminal 450 in FIG. 4 performs terminal location or position estimation.

Likewise, as 803 in FIG. 8 illustrates, the modulated signal transmitted by first device 400 in FIG. 4 is received, and terminal 450 in FIG. 4 knows the SSID of the base station to be accessed by the terminal.

Then, as 804 in FIG. 8 illustrates, terminal 450 in FIG. 4 transmits, to base station (or AP) 470 in FIG. 4, a modulated signal including data including information related to an access destination for obtaining information, such as a map, using, for example, radio waves.

As 805 in FIG. 8 illustrates, base station (or AP) 470 receives the modulated signal transmitted by terminal 450, obtains the information on the access destination, accesses the desired access destination and obtains desired information, such as a map, over a network.

Then, as 806 in FIG. 8 illustrates, base station (or AP) 470 in FIG. 4 transmits a modulated signal including desired information, such as the obtained map, to terminal 450 using, for example, radio waves.

As 807 in FIG. 8 illustrates, terminal 450 receives the modulated signal transmitted by base station (or AP) 470 and obtains (for example) the map. Terminal 450 displays a screen such as the one illustrated in FIG. 5, based on information on (for example) the map and the location or position of the terminal already obtained.

Next, an example of operations performed when a plurality of first devices 400 and base station (or AP) 470 are disposed in the location illustrated in FIG. 5.

Figure 9:
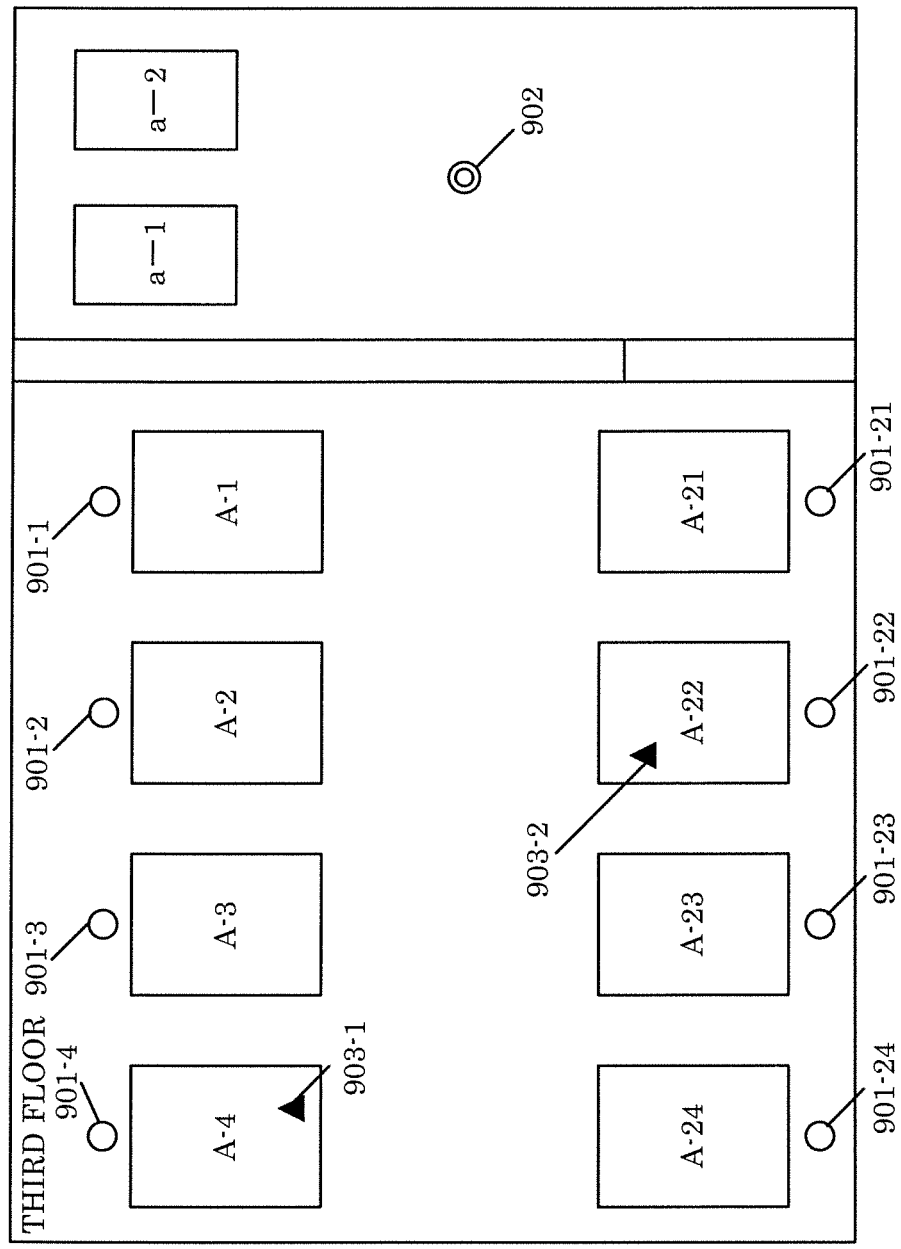
FIG. 9 illustrates a specific example of a screen displayed on a display.

Similar to FIG. 5, FIG. 9 illustrates a map of a given location.

As described with reference to FIG. 5, FIG. 9 is a map of the third floor of a building. Each of A-1, A-2, A-3, A-4, A-21, A-22, A-23, and A-24 indicates a position of a parking space for an automobile, and a-1 and a-2 indicate elevators.

The position of circle 901-1 in FIG. 9 indicates the location of a first device having the same configuration as device 100 illustrated in FIG. 4. A first device having the same configuration as device 100 in FIG. 4 at the position of 901-1 is referred to as "first device #1". The first device #1 holds and transmits, as information related to a location or information related to a position, information labeled "A-1".

The position of circle 901-2 in FIG. 9 indicates the location of a first device having the same configuration as device 100 illustrated in FIG. 4. A first device having the same configuration as device 100 in FIG. 4 and located at the position of 901-2 is referred to as "first device #2". The first device #2 holds and transmits, as information related to a location or information related to a position, information labeled "A-2".

The position of circle 901-3 in FIG. 9 indicates the location of a first device having the same configuration as device 100 illustrated in FIG. 4. A first device having the same configuration as device 100 in FIG. 4 and located at the position of 901-3 is referred to as "first device #3". The first device #3 holds and transmits, as information related to a location or information related to a position, information labeled "A-3".

The position of circle 901-4 in FIG. 9 indicates the location of a first device having the same configuration as device 100 illustrated in FIG. 4. A first device having the same configuration as device 100 in FIG. 4 and located at the position of 901-4 is referred to as "first device #4". The first device #4 holds and transmits, as information related to a location or information related to a position, information labeled "A-4".

The position of circle 901-21 in FIG. 9 indicates the location of a first device having the same configuration as device 100 illustrated in FIG. 4. A first device having the same configuration as device 100 in FIG. 4 and located at the position of 901-21 is referred to as "first device #21". The first device #21 holds and transmits, as information related to a location or information related to a position, information labeled "A-21".

The position of circle 901-22 in FIG. 9 indicates the location of a first device having the same configuration as device 100 illustrated in FIG. 4. A first device having the same configuration as device 100 in FIG. 4 and located at the position of 901-22 is referred to as "first device #22". The first device #22 holds and transmits, as information related to a location or information related to a position, information labeled "A-22".

The position of circle 901-23 in FIG. 9 indicates the location of a first device having the same configuration as device 100 illustrated in FIG. 4. A first device having the same configuration as device 100 in FIG. 4 and located at the position of 901-23 is referred to as "first device #23". The first device #23 holds and transmits, as information related to a location or information related to a position, information labeled "A-23".

The position of circle 901-24 in FIG. 9 indicates the location of a first device having the same configuration as first device 400 illustrated in FIG. 4. A first device having the same configuration as first device 400 in FIG. 4 and located at the position of 901-24 is referred to as "first device #24". The first device #24 holds and transmits, as information related to a location or information related to a position, information labeled "A-24".

The position of double circle 902 in FIG. 9 indicates the location of a base station (or AP) having the same configuration as base station 470 illustrated in FIG. 4. Here, the SSID of a base station (or AP) having the same configuration as base station 470 in FIG. 4 and located at the position of 902 is "abcdef".

When the terminals located around the positions illustrated in the map in FIG. 9 communicate wirelessly, the terminals may access a base station (or AP) having the same configuration as base station 470 in FIG. 4 and located at position 902 in FIG. 9. Accordingly, the first device #1 located at 901-1 in FIG. 9 transmits "abcdef" as information on an SSID (see 401-1 in FIG. 4).

Similarly, the first device #2 located at 901-2 in FIG. 9 transmits "abcdef" as information on an SSID (see 400-1 in FIG. 4).

The first device #3 located at 901-3 in FIG. 9 transmits "abcdef" as information on an SSID (see 401-1 in FIG. 4).

The first device #4 located at 901-4 in FIG. 9 transmits "abcdef" as information on an SSID (see 401-1 in FIG. 4).

The first device #21 located at 901-21 in FIG. 9 transmits "abcdef" as information on an SSID (see 401-1 in FIG. 4).

The first device #22 located at 901-22 in FIG. 9 transmits "abcdef" as information on an SSID (see 401-1 in FIG. 4).

The first device #23 located at 901-23 in FIG. 9 transmits "abcdef" as information on an SSID (see 401-1 in FIG. 4).

The first device #24 located at 901-24 in FIG. 9 transmits "abcdef" as information on an SSID (see 401-1 in FIG. 4).

Next, a specific example of operations will be given.

Assume a terminal having the same configuration as terminal 450 in FIG. 4 is positioned at 903-1 in FIG. 9. The terminal receives a modulated signal transmitted by the first device #4 positioned at 901-4 in FIG. 9, and receives position information referred to as "A-4". Moreover, the terminal obtains information on the SSID "abcdef", and as a result, the terminal accesses a base station (or AP) that has the same configuration as base station 470 in FIG. 4 and is positioned at 902 in FIG. 9, whereby the terminal obtains information, such as a map, from the base station (or AP) that has the same configuration as base station 470 in FIG. 4 and is positioned at 902 in FIG. 9. Then, the terminal displays map information and position information (see FIG. 5; however, FIG. 5 is only one, non-limiting example).

Assume a terminal having the same configuration as terminal 450 in FIG. 4 is positioned at 903-2 in FIG. 9. The terminal receives a modulated signal transmitted by the first device #22 positioned at 901-22 in FIG. 9, and receives position information referred to as "A-22". Moreover, the terminal obtains information on the SSID "abcdef", and as a result, the terminal accesses a base station (or AP) that has the same configuration as base station 470 in FIG. 4 and is positioned at 902 in FIG. 9, whereby the terminal obtains information, such as a map, from the base station (or AP) that has the same configuration as base station 470 in FIG. 4 and is positioned at 902 in FIG. 9. Then, the terminal displays map information and position information (see FIG. 5; however, FIG. 5 is only one, non-limiting example).

Note that the terminal stores a map (surrounding information) and position information, such as those illustrated in FIG. 5, in storage included in the terminal, and when the user of the terminal needs it, may make more use of the map (surrounding information) and position information by reading the stored information.

As described above, since the first device transmits the modulated signal via visible light, a terminal capable of receiving the modulated signal is limited to being located within a region capable of receiving the signal light from the position of the first device. Accordingly, by the terminal obtaining the location or position information transmitted by the first device, the terminal can achieve an advantageous effect whereby it is possible to easily (i.e., without having to perform complicated signal processing) obtain accurate position information. Moreover, when the first device is disposed in a place where reception of satellite radio waves from a GPS satellite is difficult, it is possible to achieve an advantageous effect whereby it is possible for the terminal to securely obtain accurate position information even in locations in which reception of radio waves from a GPS satellite is difficult, by the terminal receiving the modulated signal transmitted by the first device.

Furthermore, an advantageous effect is achieved in which, based on information on the SSID transmitted by the first device, the terminal connects to the base station (or AP) and obtains information to securely retrieve information. This is because, when information from a visible light modulated signal is obtained, since it is visible light, the user can easily recognize the first device transmitting the modulated signal, making it possible for the user to determine whether the source of information is secure or not.

For example, when an SSID is obtained from a modulated signal transmitted by a wireless LAN over radio waves, it is difficult for the user to determine which device transmitted the radio waves. Accordingly, from the viewpoint of ensuring information security, obtaining the SSID via visible light communication is more suitable.

Note that a plurality of input signals may further be in wireless communication device 453 in terminal 450 in FIG. 4. For example, a control signal for controlling wireless communication device 453 may be in wireless communication device 453, and information transmitted by the base station may be in wireless communication device 453 as input signals. Here, based on the control signal, operations for the start of communication by wireless communication device 453 are conceivable as one example. As described above, the configuration of the first device is not limited to the configuration of first device 400 in FIG. 4, moreover the configuration of the terminal is not limited to the configuration of terminal 450 in FIG. 4, and moreover the device to which base station 470 connects is not limited to the configuration illustrated in FIG. 4.

Moreover, although only one base station (or AP) is exemplified in the configuration illustrated in FIG. 4, a plurality of (secure) base stations (or APs) accessible by the terminal may be included. Here, the symbol related to an SSID transmitted by first device 400 in FIG. 4 may include information indicating the SSIDs of the plurality of base stations (or APs). Terminal 450 in FIG. 4 may select a base station (or AP) to wirelessly connect to based on the information on the SSIDs of the base stations (or connect to the plurality of base stations (or APs)).

For example, assume there are three base stations (or APs). The three base stations are named base station #A, base station #B, and base station #C. The SSID of base station #A is "abcdef", the SSID of base station #B is "ghijk", and the SSID of base station #C is "pqrstu". In such cases, symbol 600-1 related to an SSID in the frame configuration illustrated in FIG. 6 of the modulated signal transmitted by the first device includes information related to the SSID "abcdef" of base station #A, the SSID "ghijk" of base station #B, and the SSID "pqrstu" of base station #C. Terminal 450 in FIG. 4 receives symbol 600-1 related to an SSID, and based on the SSID "abcdef" of base station #A, the SSID "ghijk" of base station #B, and the SSID "pqrstu" of base station #C, selects a base station (or AP) to wirelessly connect to.

Supplemental Information

It goes without saying that the embodiments and other subject matter described in the present specification may be combined and implemented.

Moreover, the embodiments are merely examples. For example, while a modulation scheme, an error correction encoding scheme (error correction code, code length, encode rate, etc., to be used), control information, etc., are exemplified, it is possible to carry out the present disclosure with the same configuration even when other types of a modulation scheme, an error correction encoding scheme (error correction code, code length, encode rate, etc., to be used), control information, etc., are applied.

Regarding the modulation scheme, even when a modulation scheme other than the modulation schemes described in the present specification is used, it is possible to carry out the embodiments and the other subject matter described in the present specification. For example, Amplitude Phase Shift Keying (APSK) (such as 16 APSK, 64 APSK, 128 APSK, 256 APSK, 1024 APSK and 4096 APSK), Pulse Amplitude Modulation (PAM) (such as 4 PAM, 8 PAM, 16 PAM, 64 PAM, 128 PAM, 256 PAM, 1024 PAM and 4096 PAM), Phase Shift Keying (PSK) (such as BPSK, QPSK, 8 PSK, 16 PSK, 64 PSK, 128 PSK, 256 PSK, 1024 PSK and 4096 PSK), and Quadrature Amplitude Modulation (QAM) (such as 4 QAM, 8 QAM, 16 QAM, 64 QAM, 128 QAM, 256 QAM, 1024 QAM and 4096 QAM) may be applied, or in each modulation scheme, uniform mapping or non-uniform mapping may be performed. Moreover, a method for arranging 2, 4, 8, 16, 64, 128, 256, 1024, etc., signal points on an I-Q plane (a modulation scheme having 2, 4, 8, 16, 64, 128, 256, 1024, etc., signal points) is not limited to a signal point arrangement method of the modulation schemes described herein.

In the present specification, conceivable devices that include the wireless communication device described in the present specification include a communications and broadcast apparatus, such as a broadcast station, a base station, an access point, a terminal or a mobile phone, or a communication apparatus such as a television, a radio, a terminal, a personal computer, a mobile phone, an access point, or a base station. Moreover, the wireless communication device described in the present specification is conceivably a device having communication functions that is connectable via some interface to a device for executing an application in, for example, a television, a radio, a personal computer or a mobile phone.

In the present specification, conceivable devices that include the reception unit described in the present specification include a communications and broadcast apparatus, such as a broadcast station, a base station, an access point, a terminal or a mobile phone, or a communication apparatus such as a television, a radio, a terminal, a personal computer, a mobile phone, an access point, or a base station.

Moreover, in the wireless communication via radio waves according to this embodiment, symbols other than data symbols, such as pilot symbols (preamble, unique word, post-amble, reference symbol, etc.) or symbols for control information, may be arranged in any way in a frame. Here, the terms "pilot symbol" and "control information symbol" are used, but the naming of such symbols is not important; the functions that they perform are.

A pilot symbol may be a known symbol that is modulated using PSK modulation in a transceiver (alternatively, a symbol transmitted by a transmitter can be known by a receiver by the receiver being synchronized), and the receiver detects, for example, frequency synchronization, time synchronization, and a channel estimation (Channel State Information (CSI)) symbol (of each modulated signal) by using the symbol.

Moreover, the symbol for control information is a symbol for transmitting information required to be transmitted to a communication partner in order to establish communication pertaining to anything other than data (such as application data) (this information is, for example, the modulation scheme, error correction encoding scheme, the encode rate of the error correction encoding scheme, or settings information in an upper layer).

Note that the present disclosure is not limited to each exemplary embodiment, and can be carried out with various modifications. For example, in each embodiment, the present disclosure is described as being performed as a communication device. However, the present disclosure is not limited to this case, and the above communication method can also be used as software.

Note that, for example, a program for executing the above-described communication method may be stored in Read Only Memory (ROM) in advance to cause a Central Processor Unit (CPU) to operate this program.

Moreover, the program for executing the communication method may be stored in a computer-readable storage medium, the program stored in the recording medium may be recorded in Random Access Memory (RAM) in a computer, and the computer may be caused to operate according to this program.

Each configuration of each of the above-described embodiments, etc., may be realized as a large scale integration (LSI) circuit, which is typically an integrated circuit. These integrated circuits may be formed as separate chips, or may be formed as one chip so as to include the entire configuration or part of the configuration of each embodiment. LSI is described here, but the integrated circuit may also be referred to as an integrated circuit (IC), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used. Further, when development of a semiconductor technology or another derivative technology provides a circuit integration technology which replaces LSI, as a matter of course, functional blocks may be integrated by using this technology. Adaption of biotechnology, for example, is a possibility.

Embodiment 4

Figure 10:
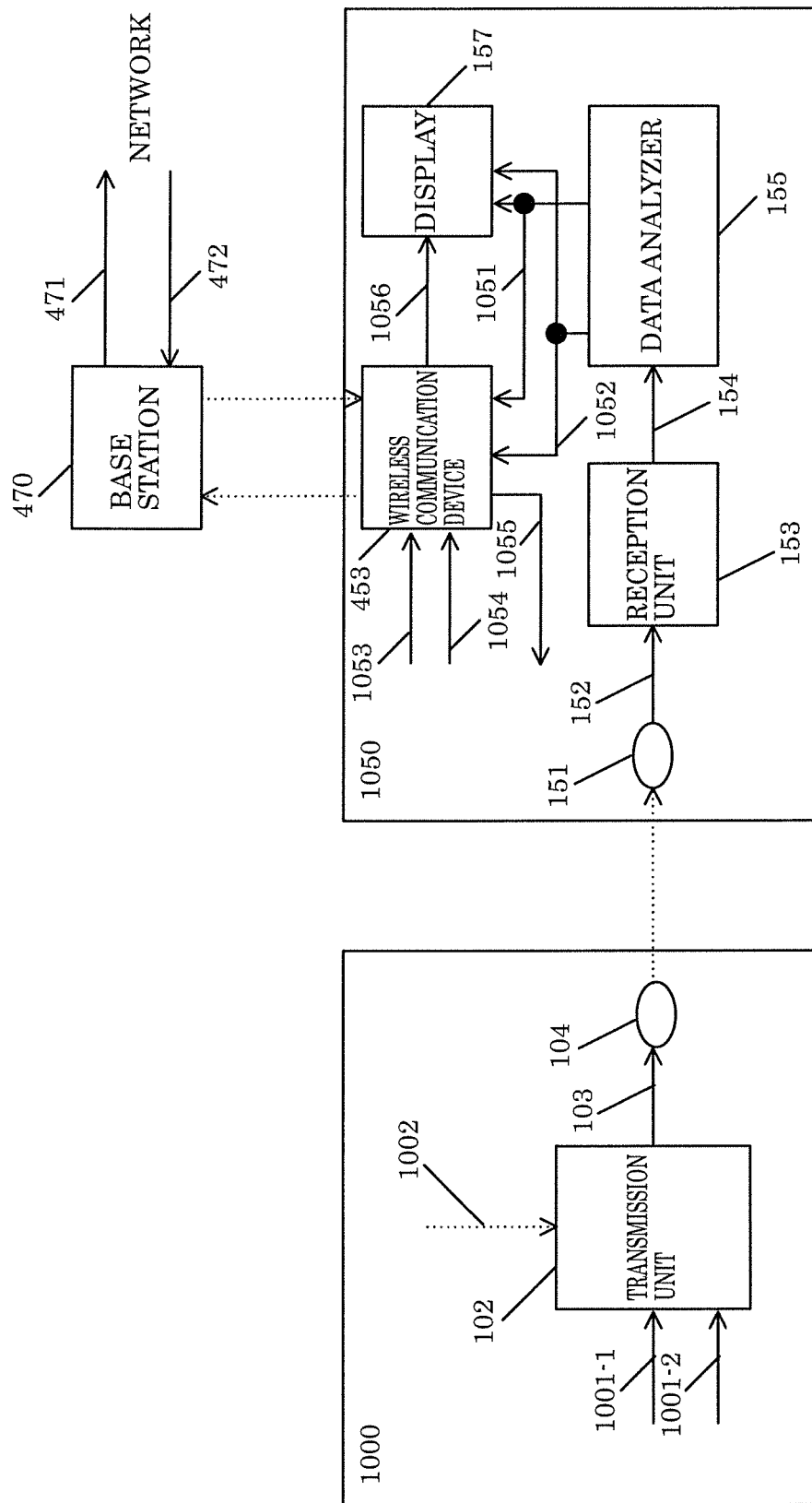
FIG. 10 illustrates one example of a configuration of a communication system.

FIG. 10 illustrates one example of a configuration of a communication system according to this embodiment. The communication system illustrated in FIG. 10 includes, for example: device 1000 including an LED light source, lamp, light source, and/or light that emits visible light; terminal 1050; and, for example, base station 470 that communicates with terminal 1050. Device 1000 in FIG. 10 includes, for example, an LED lamp, light source, and/or light that emits visible light. Note that device 1000 is referred to as a "second device" in this embodiment. In second device 1000 in FIG. 10, elements that operate the same as in first device 100 in FIG. 1 share like reference marks.

In terminal 1050 in FIG. 10, components that operate the same as terminal 150 in FIG. 1 share like reference marks.

Note that communication between wireless communication device 453 and base station 470 in FIG. 10 is performed using, for example, radio waves.

In second device 1000 in FIG. 10, transmission unit 102 receives inputs of information 1001-1 related to an SSID, information 1001-2 related to an encryption key, and data 1002, and based on these input signals, generates a modulated signal (for optical communication), and outputs modulated signal 103. For example, modulated signal 103 is transmitted from light source 104.

Next, information 1001-1 related to an SSID and information 1001-2 related to an encryption key will be described.

First, information 1001-1 related to an SSID will be described.

Information 1001-1 related to an SSID is information indicating the SSID of base station (or AP) 470 in FIG. 10. Note that, in this example, base station (or AP) 470 transmits modulated signals over radio waves, and receives radio wave modulated signals. In other words, second device 1000 can provide access to base station 470, which is a secure access destination for the terminal. With this, terminal 1050 in FIG. 10 can achieve the advantageous effect of being able to securely obtain information from base station (or AP) 470. On the other hand, device 1000 can restrict the terminals that access base station 470 to terminals in a space in which it is possible to receive optical signals transmitted (emitted) by device 1000. Note that when terminal 1050 receives an optical signal transmitted via a predetermined scheme, it may be determined that the notified SSID is the SSID of a secure base station, and, alternatively, processing for determining whether the SSID is secure or not may be performed. For example, device 1000 may transmit a predetermined identifier in an optical signal, and the terminal may determine whether the notified SSID is the SSID of a secure base station or not based on the received identifier.

Note that although FIG. 10 only illustrates base station (or AP) 470, for example, when there is a base station (or AP) other than base station (or AP) 470, terminal 1050 in FIG. 10 accesses base station (or AP) 470 to obtain information.

Information 1001-2 related to an encryption key is information related to an encryption key required for terminal 1050 in FIG. 10 to establish communication with base station (or AP) 470 in FIG. 10. Encrypted communication is possible between terminal 1050 in FIG. 10 and base station (or AP) 470 as a result of terminal 1050 in FIG. 10 obtaining this information from second device 1000 in FIG. 10.

Terminal 1050 in FIG. 10 receives the modulated signal transmitted by second device 1000. Note that in terminal 1050 in FIG. 10, components that operate the same as terminal 150 in FIG. 1 and terminal 450 in FIG. 4 share like reference marks.

Light receiver 151 included in terminal 1050, examples of which include an image sensor such as a CMOS or organic CMOS image sensor, receives the modulated signal transmitted by second device 1000. Reception unit 153 receives an input of reception signal 152 received by light receiver 151, performs processing such as demodulation and error correction decoding on the reception signal, and outputs reception data 154.

Data analyzer 155 receives an input of reception data 154, and outputs, based on the reception data, for example, information 1051 on the SSID of the base station (470) to be connected to, and information 1052 on the encryption key for communication with the base station (470) to be connected to. For example, in a wireless local area network (LAN), examples of encryption schemes include wired equivalent privacy (WEP), Wi-Fi (registered trademark) protected access (WPA), and Wi-Fi protected access 2 (WPA2) (pre-shared key (PSK) mode, extended authentication protocol (EAP) mode). However, the encryption method is not limited to these examples.

Display 157 receives inputs of information 1051 on the SSID and information 1052 on the encryption key, and, for example, displays the SSID of the communication partner to be accessed by wireless communication device 453 included in the terminal, and the encryption key (this display is referred to as a "first display" in this embodiment).

For example, after the first display, wireless communication device 453 included in terminal 1050 in FIG. 10 receives inputs of information 1051 on the SSID and information 1052 on the encryption key, and establishes a connection with base station (or AP) 470 (for example, the connection uses radio waves). Here, when base station (or AP) 470 also communicates with wireless communication device 453 in terminal 1050 in FIG. 10, base station (or AP) 470 transmits a modulated signal using, for example, radio waves.

Thereafter, wireless communication device 453 included in terminal 1050 in FIG. 10 receives inputs of data 1053 and control signal 1054, demodulates data 1053 in accordance with control signal 1054, and transmits a modulated signal as radio waves.

Then, for example, base station (or AP) 470 transmits data to the network (471) and receives data (472) from the network. Thereafter, for example, base station (or AP) 470 transmits, to terminal 1050 in FIG. 10, a modulated signal as radio waves.

Wireless communication device 453 included in terminal 1050 in FIG. 10 performs processing such as demodulation and error correction decoding on the modulated signal received as radio waves to obtain reception data 1056. Display 157 displays a display based on reception data 1056.

Figure 11:
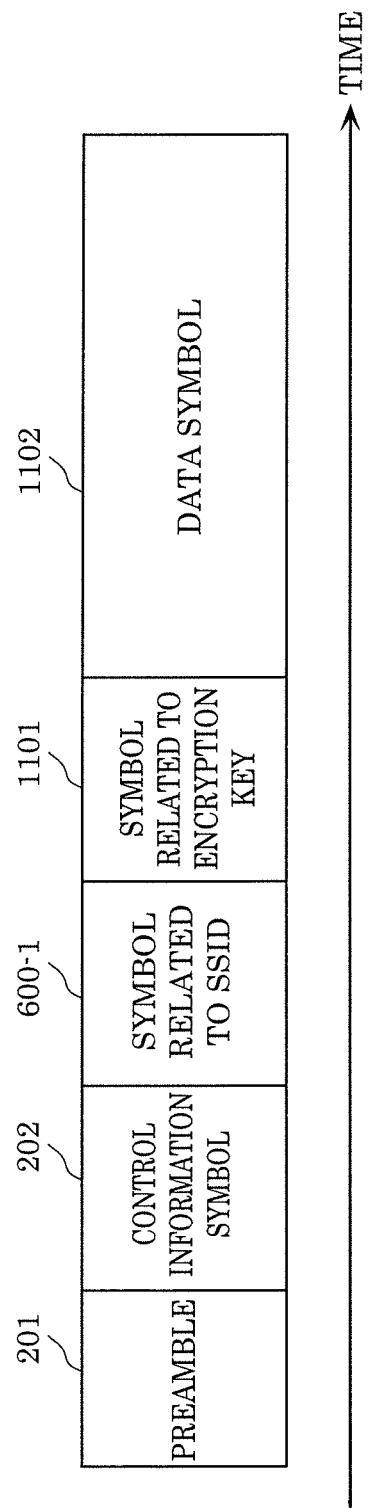
FIG. 11 illustrates one example of a frame configuration of a modulated signal transmitted by a device.

FIG. 11 illustrates one example of a configuration of a frame of a modulated signal transmitted by second device 1000 in FIG. 10. In FIG. 11, time is represented on the horizontal axis, and symbols that are the same as in FIG. 2 and FIG. 6 share like reference marks. Accordingly, repeated description thereof will be omitted.

Symbol 600-1 related to an SSID is a symbol for transmitting information 1001-1 related to an SSID in FIG. 10, and symbol 1101 related to an encryption key is a symbol for transmitting information 1001-2 related to an encryption key in FIG. 10. Data symbol 1102 is a symbol for transmitting data 1002.

The second device transmits preamble 201, control information symbol 202, symbol 600-1 related to an SSID, symbol 1101 related to an encryption key, and data symbol 1102. Note that second device 1000 in FIG. 10 may transmit a frame including symbols other than the symbols illustrated in FIG. 11. Moreover, the frame configuration, including the order in which the symbols are transmitted, is not limited to the configuration illustrated in FIG. 11.

Figure 12:
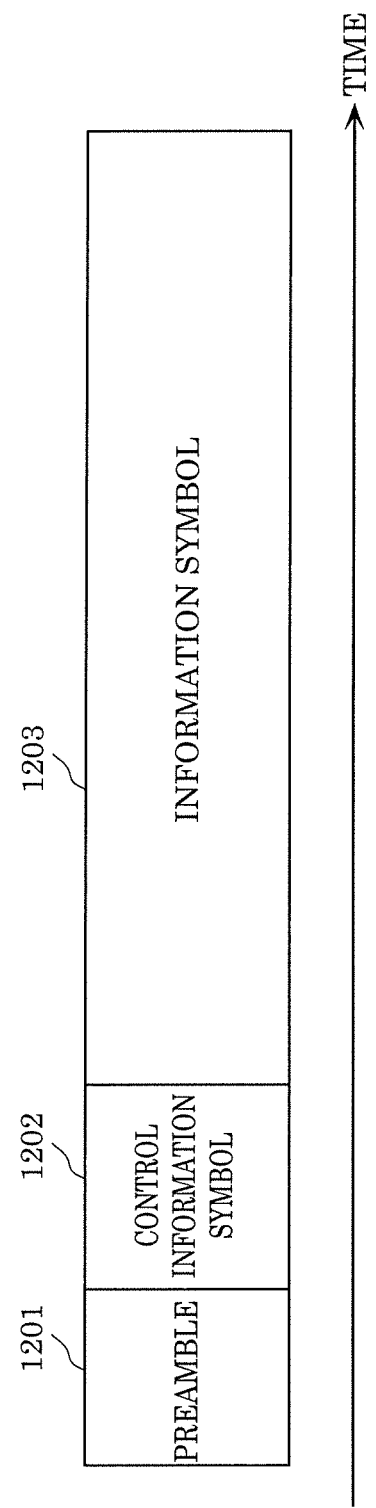
FIG. 12 illustrates one example of a frame configuration of a modulated signal transmitted by a wireless communication device.

FIG. 12 illustrates one example of a configuration of a frame of a modulated signal transmitted by wireless communication device 453 included in terminal 1050 in FIG. 10. In FIG. 12, time is represented on the horizontal axis. As illustrated in FIG. 12, wireless communication device 453 included in terminal 1050 in FIG. 10 transmits, for example, preamble 1201, and then transmits control information symbol 1202 and information symbol 1203.

Here, preamble 1201 is a symbol used for base station (or AP) 470 that receives the modulated signal transmitted by wireless communication device 453 in terminal 1050 in FIG. 10 to perform, for example, signal detection, time synchronization, frame synchronization, frequency synchronization, and frequency offset estimation.

Control information symbol 1202 includes data such as information related to the error correction encoding scheme method and/or demodulation scheme used in the generation of the modulated signal, information related to frame configuration, and information related to the transmission method used, and base station (or AP) 470, for example, demodulates the modulated signal based on the information included in control information symbol 1202.

Information symbol 1203 is a symbol for wireless communication device 453 included in terminal 1050 in FIG. 10 to transmit data.

Note that wireless communication device 453 included in terminal 1050 in FIG. 10 may transmit a frame including symbols other than the symbols illustrated in FIG. 12 (for example, a frame including a pilot symbol (reference symbol) midway through the information symbol). Moreover, the frame configuration, including the order in which the symbols are transmitted, is not limited to the configuration illustrated in FIG. 12. In FIG. 12, a plurality of symbols may be present along the frequency axis, that is to say, symbols may be present on a plurality of frequencies (a plurality of carriers).

Note that in Embodiment 3, when wireless communication device 453 included in terminal 1050 in FIG. 4 transmits a modulated signal, the frame configuration illustrated in FIG. 12 may be used.

FIG. 7 illustrates one example of a configuration of a frame of a modulated signal transmitted by base station 470 in FIG. 10. In FIG. 7, time is represented on the horizontal axis. As illustrated in FIG. 7, base station 470 transmits, for example, preamble 701, and then transmits control information symbol 702 and information symbol 703.

Here, preamble 701 is a symbol for wireless communication device 453 included in terminal 1050 in FIG. 10, which receives the modulated signal transmitted by base station 470, to perform, for example, signal detection, time synchronization, frame synchronization, frequency synchronization, and/or frequency offset estimation.

Control information symbol 702 includes data such as information related to the error correction encoding scheme method and/or demodulation scheme used in the generation of the modulated signal, information related to frame configuration, and information related to the transmission method used, and wireless communication device 453 included in terminal 1050 in FIG. 10, for example, demodulates the modulated signal based on the information included in this symbol.

Information symbol 703 is a symbol for base station (or AP) 470 in FIG. 10 to transmit data.

Note that base station (or AP) 470 in FIG. 10 may transmit a frame including symbols other than the symbols illustrated in FIG. 7 (for example, a frame including a pilot symbol (reference symbol) midway through the information symbol). Moreover, the frame configuration, including the order in which the symbols are transmitted, is not limited to the configuration illustrated in FIG. 7. In FIG. 7, a plurality of symbols may be present along the frequency axis, that is to say, symbols may be present on a plurality of frequencies (a plurality of carriers).

Moreover, for example, a modulated signal that has the frame configuration illustrated in FIG. 11 and is transmitted by second device 1000 being transmitted at a regular timing, e.g., repeatedly transmitted is conceivable. This makes it possible for a plurality of terminals to implement the operations described above.

Figure 13:
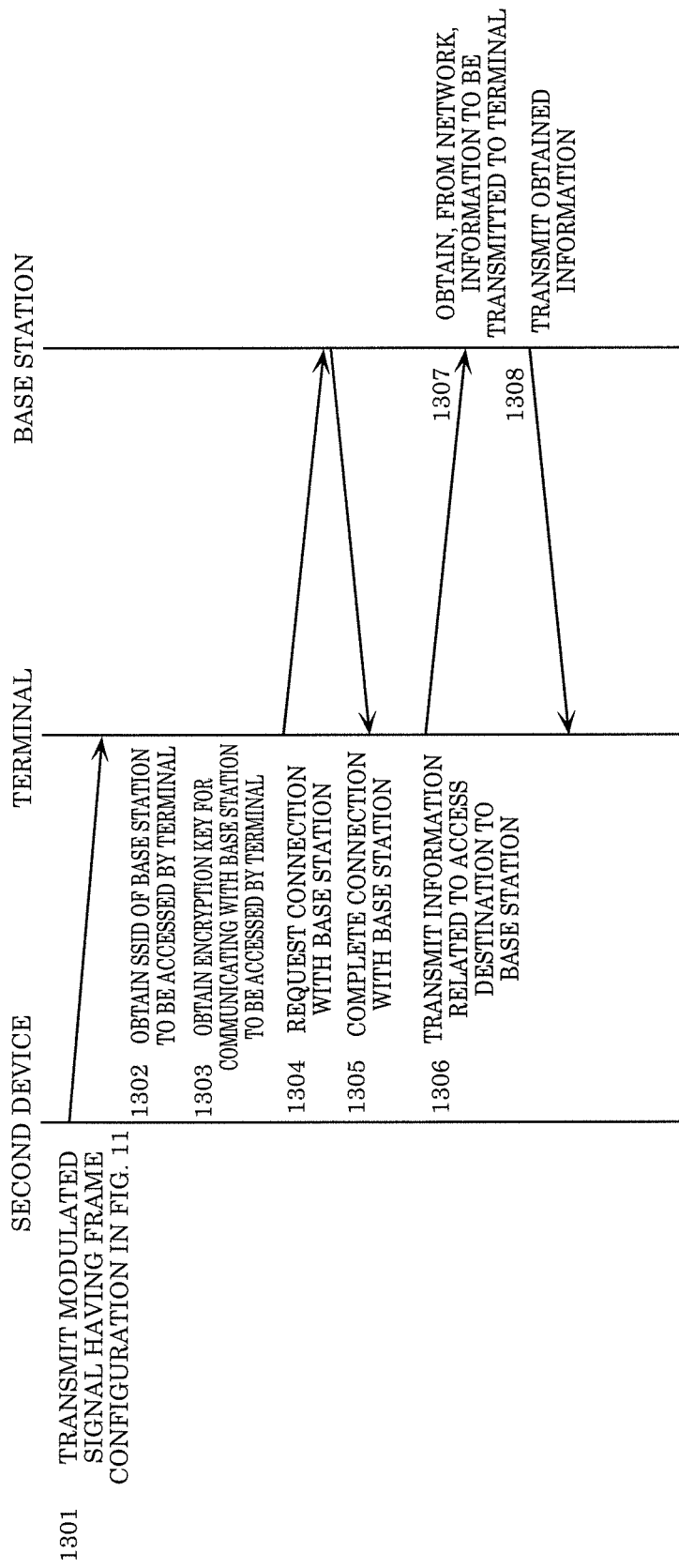
FIG. 13 is a flow chart of one example of processes performed by a device, a terminal, and a base station.

FIG. 13 is a flow chart illustrating one example of processes implemented by second device 1000, terminal 1050, and base station (or AP) 470 in FIG. 10.

First, as 1301 in FIG. 13 illustrates, second device 1000 in FIG. 10 transmits a modulated signal having the frame configuration illustrated in FIG. 11.

Likewise, as 1302 in FIG. 13 illustrates, the modulated signal transmitted by second device 1000 in FIG. 10 is received, and terminal 1050 in FIG. 10 obtains the SSID of the base station to be accessed by terminal 1050.

Likewise, as 1303 in FIG. 13 illustrates, terminal 1050 in FIG. 10 obtains an encryption key to be used for communicating with base station 470 to be accessed by the terminal.

Terminal 1050 in FIG. 10 requests connection with base station 470 in FIG. 10 over radio waves (1304).

As 1305 in FIG. 13 illustrates, terminal 1050 in FIG. 10 completes the connection with base station 470 in FIG. 10 upon receiving a response from base station 470 in FIG. 10.

As 1306 in FIG. 13 illustrates, terminal 1050 in FIG. 10 transmits information on the connection destination to base station 470 in FIG. 10 using radio waves.

Then, as 1307 in FIG. 13 illustrates, base station 470 in FIG. 10 obtains information to be transmitted to terminal 1050 in FIG. 10 from the network.

As 1308 in FIG. 13 illustrates, base station 470 in FIG. 10 transmits the obtained information to terminal 1050 in FIG. 10 using radio waves, and terminal 1050 in FIG. 10 obtains the information.

For example, when necessary, terminal 1050 in FIG. 10 obtains required information from the network via base station 470 in FIG. 10.

As described above, based on the SSID information and the encryption key information transmitted from the second device, the terminal connects to the base station (or AP) and obtains information, whereby an advantageous effect that it is possible to securely obtain information via the base station (or AP) whose security has been authenticated can be achieved. This is because, when information from a visible light modulated signal is obtained, since it is visible light, the user can easily determine whether the source of information is secure or not.

For example, when an SSID is obtained from a modulated signal transmitted by a wireless LAN over radio waves, it is difficult for the user to determine which device transmitted the radio waves. Accordingly, from the viewpoint of ensuring information security, obtaining the SSID via visible light communication is more suitable.

Note that in this embodiment, the second device is exemplified as transmitting encryption key information, but, for example, when the base station (or AP) does not perform encrypted communication using an encryption key, the second device can transmit only the information related to an SSID without transmitting the encryption key information, that is, the second device may be implemented without the configuration related to an encryption key.

Moreover, the configuration of the second device is not limited to the configuration illustrated in FIG. 10, the configuration of the terminal is not limited to the configuration illustrated in FIG. 10, and the configuration of the connection destination of the base station is not limited to the configuration illustrated in FIG. 10.

Although in this embodiment, only one base station (or AP) is exemplified in the configuration illustrated in FIG. 10, a plurality of (secure) base stations (or APs) accessible by the terminal may be included (note that these base stations and the terminal transmit and receive modulated signals using radio waves). Here, the symbol related to an SSID transmitted by second device 1000 in FIG. 10 may include information indicating the SSIDs of the plurality of base stations (or APs). Moreover, the symbol related to an encryption key transmitted by second device 1000 in FIG. 10 may include encryption key information used to connect to the plurality of base stations (or APs). Terminal 1050 in FIG. 10 may select a base station (or AP) to wirelessly connect to based on the information on the SSIDs of the base stations and the encryption key information (or connect to the plurality of base stations (or APs)).

For example, assume there are three base stations (or APs). The three base stations are named base station #A, base station #B, and base station #C. The SSID of base station #A is "abcdef", the SSID of base station #B is "ghijk", and the SSID of base station #C is "pqrstu", the encryption key for connecting with base station #A is "123", the encryption key for connecting with base station #B is "456", and the encryption key for connecting with base station #C is "789".

In such cases, symbol 600-1 related to an SSID in the frame configuration illustrated in FIG. 11 of the modulated signal transmitted by the second device includes information related to the SSID "abcdef" of base station #A, the SSID "ghijk" of base station #B, and the SSID "pqrstu" of base station #C. The symbol 1101 related to an encryption key having the frame configuration illustrated in FIG. 11 includes information related to the encryption key "123" for connecting with base station #A, the encryption key "456" for connecting with base station #B, and the encryption key "789" for connecting with base station #C.

Terminal 1050 in FIG. 10 receives symbol 600-1 related to an SSID and thus obtains the SSID "abcdef" of base station #A, the SSID "ghijk" of base station #B, and the SSID "pqrstu" of base station #C, receives symbol 1101 related to an encryption key and thus obtains the encryption key "123" for connecting with base station #A, the encryption key "456" for connecting with base station #B, and the encryption key "789" for connecting with base station #C. Then, based on this information, terminal 1050 in FIG. 10 selects a base station (or AP) to wirelessly connect to (for example, via radio waves), and connects to the selected base station (or AP).

As described in this embodiment, as a result of the terminal setting which base station to access, utilizing a light source, exemplified here as an LED light source, a mode for making a special setting for processes for establishing a wireless connection between the terminal and base station in the modulated signal for connection over radio waves that is transmitted by the terminal is not required, and a mode for making a special setting for processes for establishing a wireless connection between the terminal and base station in the modulated signal for connection over radio waves that is transmitted by the base station is not required, whereby an advantageous effect that wireless communication data transmission efficiency improves can be achieved.

As described above, the encryption key may be an encryption key for an SSID on a wireless LAN, may be an encryption key for restricting the form of connection used, the form of service used, and/or the connectivity range of the network (in other words, any encryption key that is restrictive is sufficient).

Embodiment 5

Here, SSID and password separation will be described.

Figure 14:
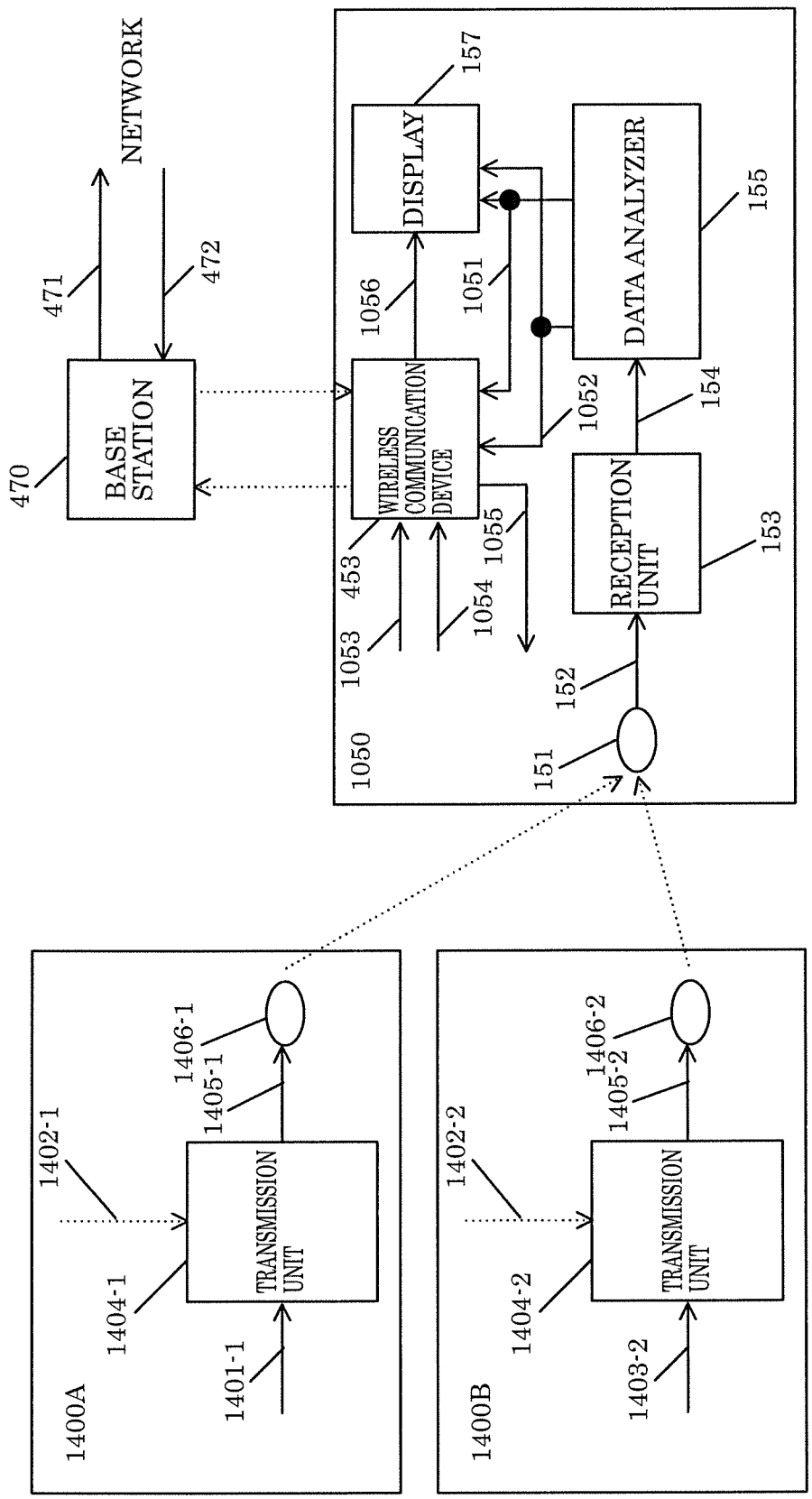
FIG. 14 illustrates one example of a configuration of devices, a terminal, and a base station that communicates with the terminal.

FIG. 14 illustrates one example of configurations according to this embodiment of: devices including, for example, an LED light source, lamp, light source, and/or light that emits visible light; a terminal; and, for example, a base station that communicates with the terminal. The communication system in FIG. 14 includes: device 1400A and 1400B each including, for example, an LED light source, lamp, light source, and/or light that emits visible light; terminal 1050; and, for example, base station 470 that communicates with terminal 1050. Note that device 1400A in FIG. 14 is referred to as a "third device" in this embodiment, and device 1400B in FIG. 14 is referred to as a "fourth device" in this embodiment. Note that in terminal 1050 in FIG. 14, operations that are the same as in FIG. 1 and FIG. 10 share like reference marks. Regarding the base station or AP as well, operations that are the same as in FIG. 4 have the same reference marks as in FIG. 4.

Note that communication between wireless communication device 453 and base station 470 in FIG. 14 is performed using, for example, radio waves.

In third device 1400A in FIG. 14, transmission unit 1404-1 receives inputs of information 1401-1 related to an SSID and data 1402-1, and based on these input signals, generates a modulated signal (for optical communication) and outputs modulated signal 1405-1. Modulated signal 1405-1 is transmitted from light source 1406-1.

In fourth device 1400B in FIG. 14, transmission unit 1404-2 receives inputs of information 1403-2 related to an encryption key and data 1402-2, and based on these input signals, generates a modulated signal (for optical communication) and outputs modulated signal 1405-2. Modulated signal 1405-2 is transmitted from light source 1406-2.

Next, information 1401-1 related to an SSID and information 1403-2 related to an encryption key will be described.

First, information 1401-1 related to an SSID will be described.

Information 1401-1 related to an SSID is information indicating the SSID of base station (or AP) 470 in FIG. 14. In other words, third device 1400A can provide access over radio waves to base station 470, which is a secure access destination for the terminal. With this, terminal 1050 in FIG. 14 can achieve the advantageous effect of being able to securely obtain information from base station (or AP) 470.

Note that when terminal 1050 receives an optical signal transmitted via a predetermined scheme, it may be determined that the notified SSID is the SSID of a secure base station, and, alternatively, processing for determining whether the SSID is secure or not may be performed. For example, device 1400A may transmit a predetermined identifier in an optical signal, and the terminal may determine whether the notified SSID is the SSID of a secure base station or not based on the received identifier.

Note that although FIG. 14 only illustrates base station (or AP) 470, for example, when there is a base station (or AP) other than base station (or AP) 470, terminal 1050 in FIG. 14 accesses base station (or AP) 470 to obtain information.

Information 1403-2 related to an encryption key is information related to an encryption key required for terminal 1050 in FIG. 14 to establish communication with base station (or AP) 470 in FIG. 14. Encrypted communication is possible between terminal 1050 in FIG. 14 and base station (or AP) 470 as a result of terminal 1050 in FIG. 14 obtaining this information from fourth device 1400B in FIG. 14.

Terminal 1050 in FIG. 14 receives the modulated signal transmitted by third device 1400A.

Light receiver 151 included in terminal 1050, examples of which include an image sensor such as a CMOS or organic CMOS image sensor, receives the modulated signal transmitted by third device 1400A. Reception unit 153 receives an input of reception signal 152 received by light receiver 151, performs processing such as demodulation and error correction decoding on the reception signal, and outputs reception data 154.

Data analyzer 155 receives an input of reception data 154, and outputs, based on the reception data, for example, information 1051 on the SSID of the base station (470) to be connected to.

Accordingly, wireless communication device 453 included in terminal 1050 obtains information on the SSID of the base station to be connected to over radio waves by wireless communication device 453, from information 1051 on the SSID.

Next, terminal 1050 in FIG. 14 receives the modulated signal transmitted by fourth device 1400B.

Light receiver 151 included in terminal 1050, examples of which include an image sensor such as a CMOS or organic CMOS image sensor, receives the modulated signal transmitted by fourth device 1400B. Reception unit 153 receives an input of reception signal 152 received by light receiver 151, performs processing such as demodulation and error correction decoding on the reception signal, and outputs reception data 154.

Data analyzer 155 receives an input of reception data 154, and outputs, based on the reception data, for example, information 1052 on the encryption key for communication with the base station (470) to be connected to. For example, in a wireless local area network (LAN), examples of encryption schemes include wired equivalent privacy (WEP), Wi-Fi protected access (WPA), and Wi-Fi protected access 2 (WPA2) (pre-shared key (PSK) mode, extended authentication protocol (EAP) mode). However, the encryption method is not limited to these examples.

Accordingly, wireless communication device 453 included in terminal 1050 obtains encryption key information for the base station to be connected to by wireless communication device 453, from information 1052 on the encryption key for communication with the base station (470) to be connected to (for example, over radio waves).

Display 157 receives inputs of information 1051 on the SSID and information 1052 on the encryption key, and, for example, displays the SSID of the communication partner to be accessed by wireless communication device 453 included in the terminal, and the encryption key (this display is referred to as a "first display" in this embodiment).

For example, after the first display, wireless communication device 453 included in terminal 1050 in FIG. 14 receives inputs of information 1051 on the SSID and information 1052 on the encryption key, and establishes a connection with base station (or AP) 470 (for example, the connection uses radio waves). Here, when base station (or AP) 470 also communicates with wireless communication device 453 in terminal 1050 in FIG. 14, base station (or AP) 470 transmits a modulated signal using, for example, radio waves.

Thereafter, wireless communication device 453 included in terminal 1050 in FIG. 14 receives inputs of data 1053 and control signal 1054, demodulates data 1053 in accordance with control signal 1054, and transmits a modulated signal as radio waves.

Then, for example, base station (or AP) 470 transmits data to the network (471) and receives data (472) from the network. Thereafter, for example, base station (or AP) 470 transmits, to terminal 1050 in FIG. 14, a modulated signal as radio waves.

Wireless communication device 453 included in terminal 1050 in FIG. 14 performs processing such as demodulation and error correction decoding on the received modulated signal to obtain reception data 1056. Display 157 displays a display based on reception data 1056.

Figure 15:
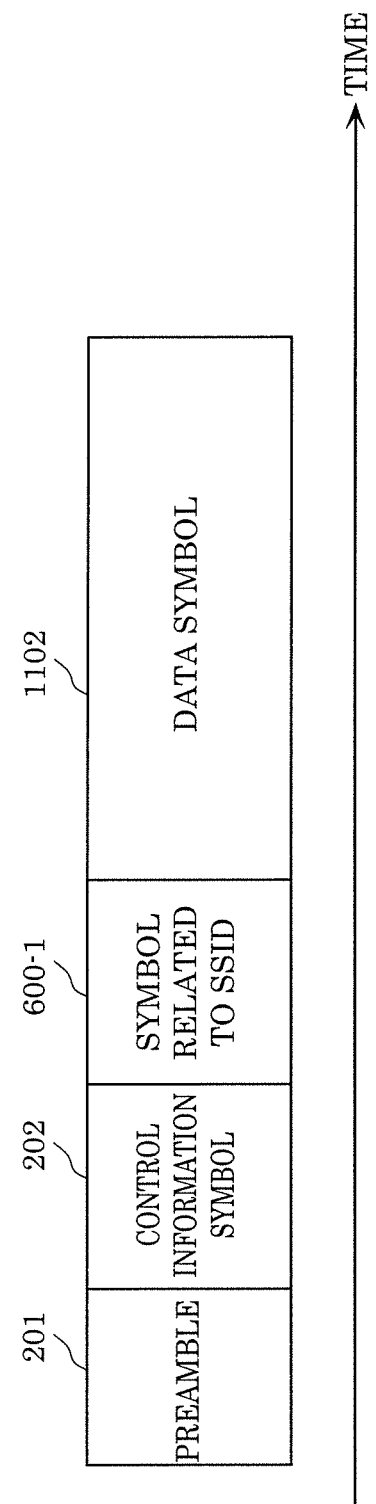
FIG. 15 illustrates one example of a frame configuration of a modulated signal transmitted by a device.

FIG. 15 illustrates one example of a configuration of a frame of a modulated signal transmitted by third device 1400A in FIG. 14. In FIG. 15, time is represented on the horizontal axis, and symbols that are the same as in FIG. 2, FIG. 6, and FIG. 11 share like reference marks. Accordingly, repeated description thereof will be omitted.

Symbol 600-1 related to an SSID is a symbol for transmitting information 1401-1 related to an SSID in FIG. 14. Data symbol 1102 is a symbol for transmitting data 1402-1.

Third device 1400A transmits preamble 201, control information symbol 202, symbol 600-1 related to an SSID, and data symbol 1102. Note that third device 1400A in FIG. 14 may transmit a frame including symbols other than the symbols illustrated in FIG. 15. Moreover, the frame configuration, including the order in which the symbols are transmitted, is not limited to the configuration illustrated in FIG. 15.

Figure 16:
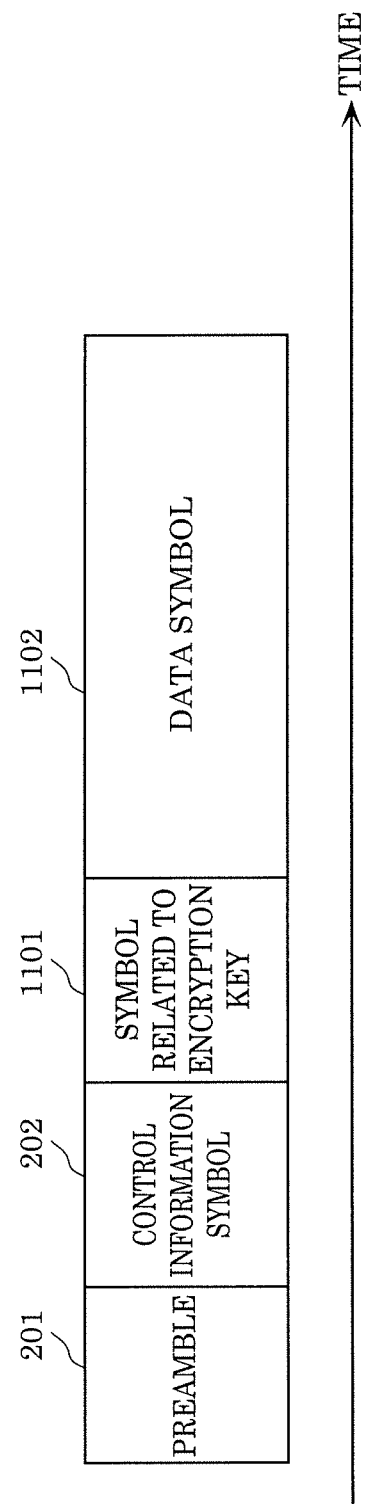
FIG. 16 illustrates one example of a frame configuration of a modulated signal transmitted by a device.

FIG. 16 illustrates one example of a configuration of a frame of a modulated signal transmitted by fourth device 1400B in FIG. 14. In FIG. 16, time is represented on the horizontal axis, and symbols that are the same as in FIG. 2 and FIG. 11 share like reference marks. Accordingly, repeated description thereof will be omitted.

Symbol 1101 related to an encryption key is a symbol for transmitting information 1403-2 related to an encryption key in FIG. 14. Data symbol 1102 is a symbol for transmitting data 1402-2.

Fourth device 1400B transmits preamble 201, control information symbol 202, symbol 1101 related to an encryption key, and data symbol 1102. Note that fourth device 1400B in FIG. 14 may transmit a frame including symbols other than the symbols illustrated in FIG. 16. Moreover, the frame configuration, including the order in which the symbols are transmitted, is not limited to the configuration illustrated in FIG. 16.

FIG. 12 illustrates one example of a configuration of a frame of a modulated signal transmitted by wireless communication device 453 included in terminal 1050 in FIG. 14. In FIG. 12, time is represented on the horizontal axis. As illustrated in FIG. 12, wireless communication device 453 included in terminal 1050 in FIG. 14 transmits, for example, preamble 1201, and then transmits control information symbol 1202 and information symbol 1203.

Here, preamble 1201 is a symbol used for base station (or AP) 470 that receives the modulated signal transmitted by wireless communication device 453 in terminal 1050 in FIG. 14 to perform, for example, signal detection, time synchronization, frame synchronization, frequency synchronization, and frequency offset estimation.

Control information symbol 1202 includes data such as information related to the error correction encoding scheme method and/or demodulation scheme used in the generation of the modulated signal, information related to frame configuration, and information related to the transmission method used, and base station (or AP) 470, for example, demodulates the modulated signal based on the information included in control information symbol 1202.

Information symbol 1203 is a symbol for wireless communication device 453 included in terminal 1050 in FIG. 14 to transmit data.

Note that wireless communication device 453 included in terminal 1050 in FIG. 14 may transmit a frame including symbols other than the symbols illustrated in FIG. 12 (for example, a frame including a pilot symbol (reference symbol) midway through the information symbol). Moreover, the frame configuration, including the order in which the symbols are transmitted, is not limited to the configuration illustrated in FIG. 12. In FIG. 12, a plurality of symbols may be present along the frequency axis, that is to say, symbols may be present on a plurality of frequencies (a plurality of carriers).

FIG. 7 illustrates one example of a configuration of a frame of a modulated signal transmitted by base station 470 in FIG. 14. In FIG. 7, time is represented on the horizontal axis. As illustrated in FIG. 7, base station 470 transmits, for example, preamble 701, and then transmits control information symbol 702 and information symbol 703.

Here, preamble 701 is a symbol for wireless communication device 453 included in terminal 1050 in FIG. 10, which receives the modulated signal transmitted by base station 470, to perform, for example, signal detection, time synchronization, frame synchronization, frequency synchronization, and/or frequency offset estimation.

Control information symbol 702 includes data such as information related to the error correction encoding scheme method and/or demodulation scheme used in the generation of the modulated signal, information related to frame configuration, and information related to the transmission method used, and wireless communication device 453 included in terminal 1050 in FIG. 14, for example, demodulates the modulated signal based on the information included in this symbol.

Information symbol 703 is a symbol for base station (or AP) 470 in FIG. 14 to transmit data.

Note that base station (or AP) 470 in FIG. 14 may transmit a frame including symbols other than the symbols illustrated in FIG. 7 (for example, a frame including a pilot symbol (reference symbol) midway through the information symbol). Moreover, the frame configuration, including the order in which the symbols are transmitted, is not limited to the configuration illustrated in FIG. 7. In FIG. 7, a plurality of symbols may be present along the frequency axis, that is to say, symbols may be present on a plurality of frequencies (a plurality of carriers).

Moreover, for example, a modulated signal that has the frame configuration illustrated in FIG. 15 and is transmitted by third device 1400A being transmitted at a regular timing, e.g., repeatedly transmitted is conceivable. This makes it possible for a plurality of terminals to implement the operations described above.

Similarly, a modulated signal that has the frame configuration illustrated in FIG. 16 and is transmitted by fourth device 1400B being transmitted at a regular timing, e.g., repeatedly transmitted is conceivable. This makes it possible for a plurality of terminals to implement the operations described above.

Figure 17:
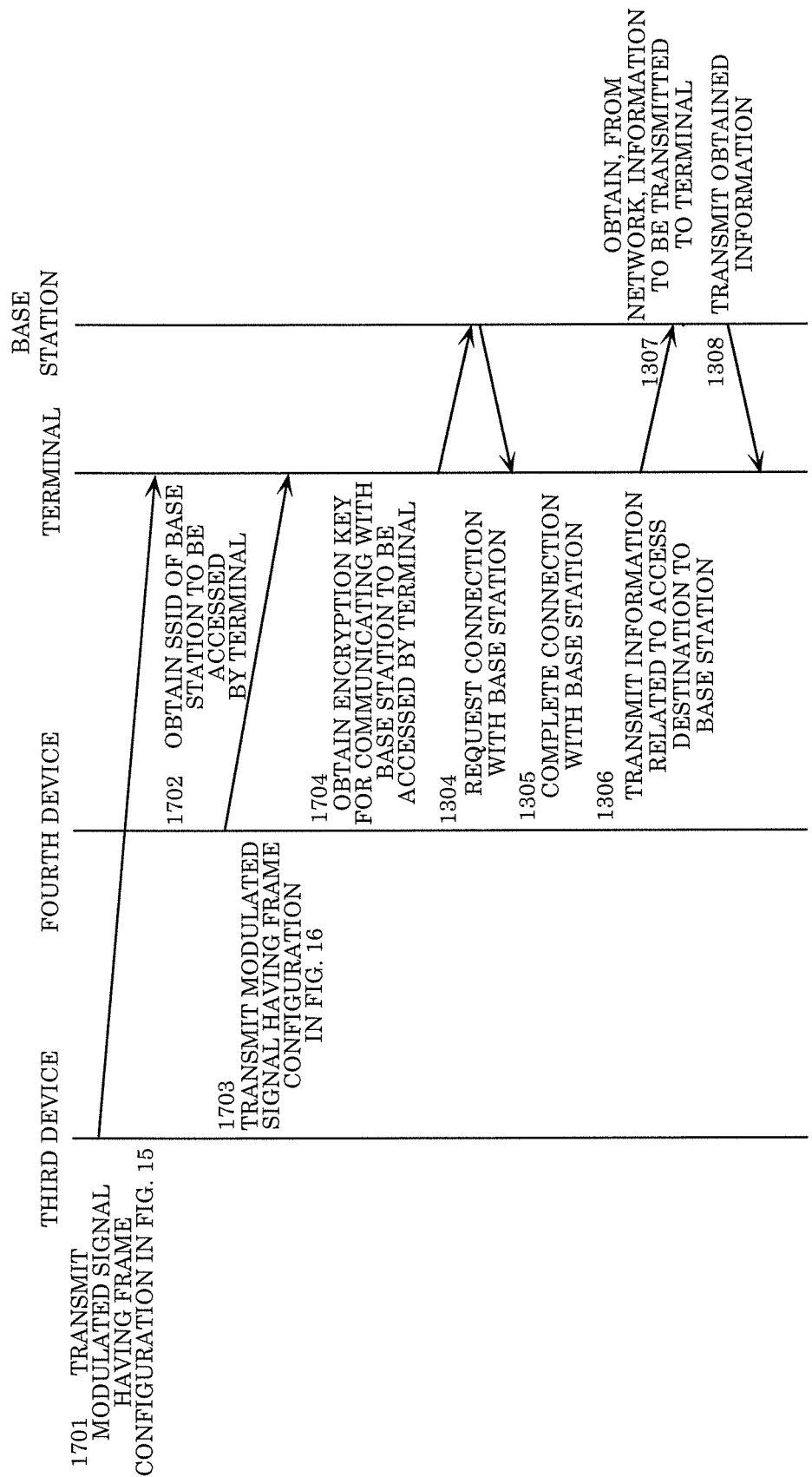
FIG. 17 is a flow chart of a first example of processes performed by devices, a terminal, and a base station.

FIG. 17 is a flow chart illustrating a first example of processes implemented by third device 1400A, fourth device 1400B, terminal 1050, and base station (or AP) 470 in FIG. 14. Note that in FIG. 17, operations that are the same as in FIG. 13 share like reference marks.

First, as 1701 in FIG. 17 illustrates, third device 1400A in FIG. 14 transmits a modulated signal having the frame configuration illustrated in FIG. 15.

As 1702 in FIG. 17 illustrates, the modulated signal transmitted by third device 1400A in FIG. 14 is received, and terminal 1050 in FIG. 14 obtains the SSID of the base station to be accessed by terminal 1050.

Next, as 1703 in FIG. 17 illustrates, fourth device 1400B in FIG. 14 transmits a modulated signal having the frame configuration illustrated in FIG. 16.

As 1704 in FIG. 17 illustrates, the modulated signal transmitted by fourth device 1400B in FIG. 14 is received, and terminal 1050 in FIG. 14 obtains an encryption key to be used for communicating with base station 470 to be accessed by the terminal.

Terminal 1050 in FIG. 14 requests connection with base station 470 in FIG. 14 over radio waves (1304).

As 1305 in FIG. 17 illustrates, terminal 1050 in FIG. 14 completes the connection with base station 470 in FIG. 14 upon receiving a response from base station 470 in FIG. 14.

As 1306 in FIG. 17 illustrates, terminal 1050 in FIG. 14 transmits information on the connection destination to base station 470 in FIG. 14 using radio waves.

Then, as 1307 in FIG. 17 illustrates, base station 470 in FIG. 14 obtains information to be transmitted to terminal 1050 in FIG. 14 from the network.

As 1308 in FIG. 17 illustrates, base station 470 in FIG. 14 transmits the obtained information to terminal 1050 in FIG. 14 using radio waves, and terminal 1050 in FIG. 14 obtains the information.

For example, when necessary, terminal 1050 in FIG. 14 obtains required information from the network via base station 470 in FIG. 14.

Figure 18:
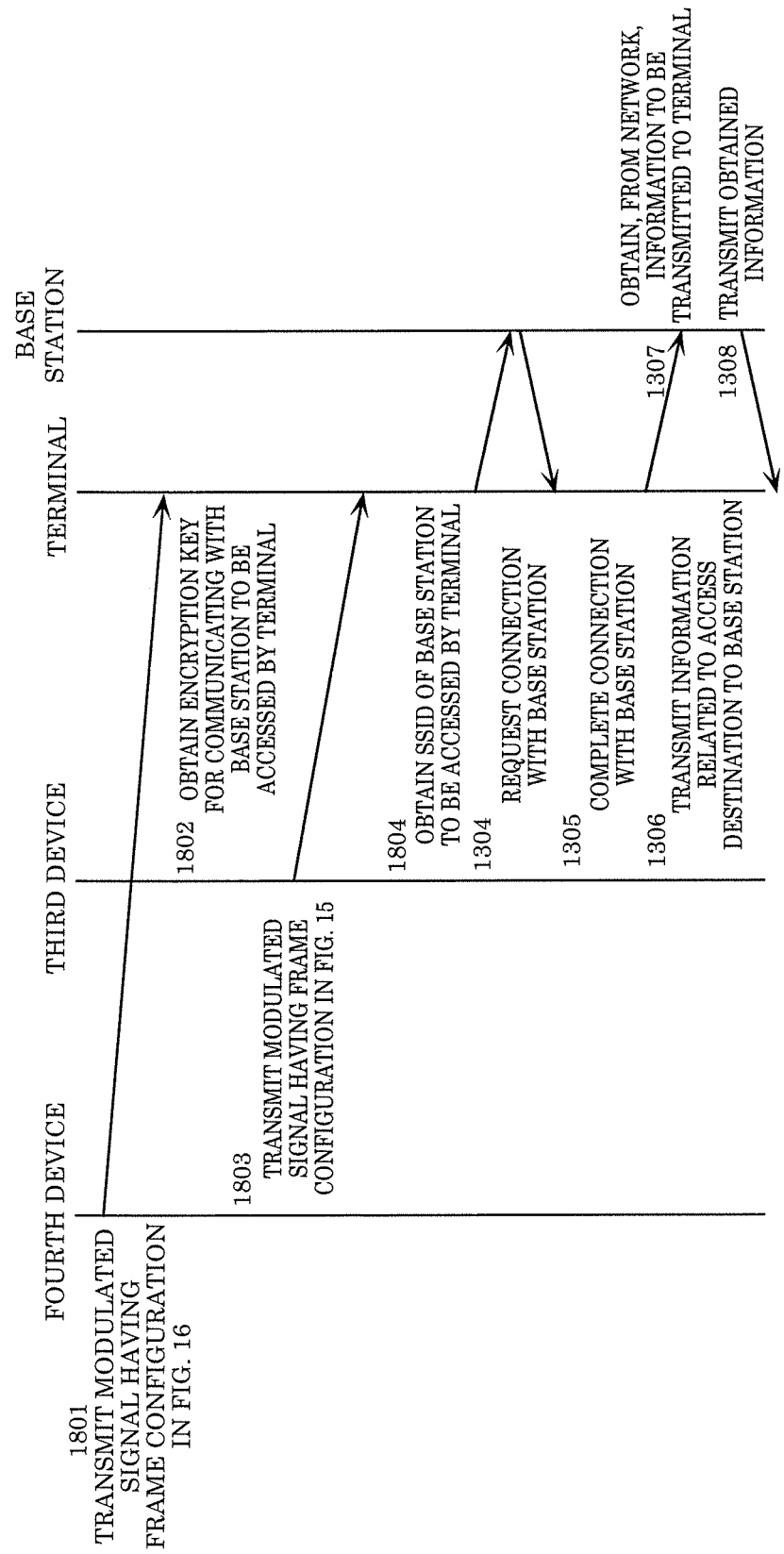
FIG. 18 is a flow chart of a second example of processes performed by devices, a terminal, and a base station.

FIG. 18 is a flow chart illustrating a second example of the above-described processes implemented by third device 1400A, fourth device 1400B, terminal 1050, and base station (or AP) 470 in FIG. 14. Note that in FIG. 18, operations that are the same as in FIG. 13 share like reference marks.

First, as 1801 in FIG. 18 illustrates, fourth device 1400B in FIG. 14 transmits a modulated signal having the frame configuration illustrated in FIG. 16.

As 1802 in FIG. 18 illustrates, the modulated signal transmitted by fourth device 1400B in FIG. 14 is received, and terminal 1050 in FIG. 14 obtains an encryption key to be used for communicating with the base station to be accessed by terminal 1050.

Next, as 1803 in FIG. 18 illustrates, third device 1400A in FIG. 14 transmits a modulated signal having the frame configuration illustrated in FIG. 15.

As 1804 in FIG. 18 illustrates, the modulated signal transmitted by third device 1400A in FIG. 14 is received, and terminal 1050 in FIG. 14 obtains the SSID of base station 470 to be accessed by the terminal.

Terminal 1050 in FIG. 14 requests connection with base station 470 in FIG. 14 over radio waves (1304).

As 1305 in FIG. 18 illustrates, terminal 1050 in FIG. 14 completes the connection with base station 470 in FIG. 14 upon receiving a response from base station 470 in FIG. 14.

As 1306 in FIG. 18 illustrates, terminal 1050 in FIG. 14 transmits information on the connection destination to base station 470 in FIG. 14 using radio waves.

Then, as 1307 in FIG. 18 illustrates, base station 470 in FIG. 14 obtains information to be transmitted to terminal 1050 in FIG. 14 from the network.

As 1308 in FIG. 18 illustrates, base station 470 in FIG. 14 transmits the obtained information to terminal 1050 in FIG. 14 using radio waves, and terminal 1050 in FIG. 14 obtains the information.

For example, when necessary, terminal 1050 in FIG. 14 obtains required information from the network via base station 470 in FIG. 14.

As described above, based on the SSID information and the encryption key information transmitted from the third and fourth devices, the terminal connects to the base station (or AP) and obtains information, whereby an advantageous effect that it is possible to securely obtain information via the base station (or AP) whose security has been authenticated can be achieved. This is because, when information from a visible light modulated signal is obtained, since it is visible light, the user can easily determine whether the source of information is secure or not.

For example, when an SSID is obtained from a modulated signal transmitted by a wireless LAN over radio waves, it is difficult for the user to determine which device transmitted the radio waves. Accordingly, from the viewpoint of ensuring information security, obtaining the SSID via visible light communication is more suitable.

Note that in this embodiment, the fourth device is exemplified as transmitting encryption key information, but, for example, when the base station (or AP) does not perform encrypted communication using an encryption key, the fourth device can transmit only the information related to an SSID without transmitting the encryption key information, that is, the fourth device may be implemented without the configuration related to an encryption key.

Moreover, as described in this embodiment, by separating the device for transmitting information related to an SSID and the device for transmitting information related to an encryption key, the terminal can implement even more secure communication with the base station.

Figure 19:
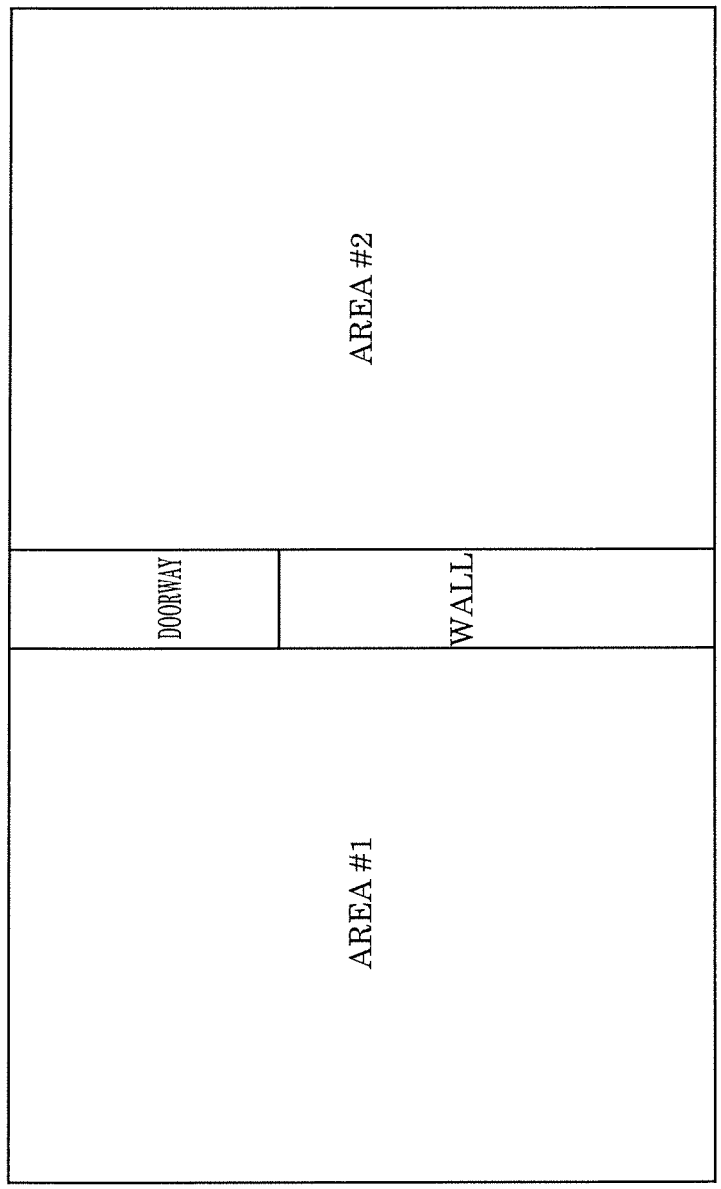
FIG. 19 illustrates one example of a space.

For example, consider the space illustrated in FIG. 19. As illustrated in FIG. 19, the space includes area #1 and area #2, and a wall and a doorway between area #1 and area #2. In this example, movement from area #1 to area #2 and movement from area #2 to area #1 is only possible through the doorway.

A base station (or AP), a third device, and a fourth device are disposed in area #1 in FIG. 19. Only a third device is disposed in area #2.

Moreover, assume that the radio waves transmitted by the base station (or AP) are receivable in either of areas #1 or #2. Here, a terminal in area #1 in which a fourth device is disposed can communicate with the base station. Moreover, even when a terminal connected to the base station in area #1 moves to area #2, communication with the base station is still possible.

When a terminal connected to the base station in area #1 moves somewhere other than area #1 or area #2, and then returns to either area #1 or area #2, communication with the base station is possible.

However, a terminal that cannot enter area #1 cannot obtain an encryption key. In such cases, the terminal can only know the SSID of the base station (or AP). Here, communication with the base station via a service that can be accepted with nothing more than knowledge of the SSID may be received by the terminal.

Accordingly, only a terminal that can enter area #1 can communicate with the base station, and as a result, communication security can be assured. Moreover, this makes it possible to construct a system that can provide different services for different areas.

Note that when the encryption key for the terminal to communicate with the base station changes (for example, on a per time interval basis), a previous encryption key cannot be used to communicate with the base station. Using such a system makes it possible to provide secure communication.

As described above, the encryption key may be an encryption key for an SSID on a wireless LAN, may be an encryption key for restricting the form of connection used, the form of service used, and/or the connectivity range of the network (in other words, any encryption key that is restrictive is sufficient).

The configurations of the third and fourth devices are not limited to the configurations illustrated in FIG. 14, the configuration of the terminal is not limited to the configuration illustrated in FIG. 14, and the configuration of the connection destination of the base station is not limited to the configuration illustrated in FIG. 14.

In this embodiment, although only one base station (or AP) is exemplified in the configuration illustrated in FIG. 14, a plurality of (secure) base stations (or APs) accessible by the terminal may be included. Here, the symbol related to an SSID transmitted by third device 1400A in FIG. 14 may include information indicating the SSIDs of the plurality of base stations (or APs). Moreover, the symbol related to an encryption key transmitted by fourth device 1400B in FIG. 14 may include encryption key information used to connect to the plurality of base stations (or APs). Terminal 1050 in FIG. 14 may select a base station (or AP) to wirelessly connect to based on the encryption key information and the information on the SSIDs of the base stations (or connect to the plurality of base stations (or APs)).

For example, assume there are three base stations (or APs). The three base stations are named base station #A, base station #B, and base station #C. The SSID of base station #A is "abcdef", the SSID of base station #B is "ghijk", and the SSID of base station #C is "pqrstu", the encryption key for connecting with base station #A is "123", the encryption key for connecting with base station #B is "456", and the encryption key for connecting with base station #C is "789".

In such cases, symbol 600-1 related to an SSID in the frame configuration illustrated in FIG. 15 of the modulated signal transmitted by the third device includes information related to the SSID "abcdef" of base station #A, the SSID "ghijk" of base station #B, and the SSID "pqrstu" of base station #C. The symbol 1101 related to an encryption key having the frame configuration illustrated in FIG. 16 of the modulated signal transmitted by the fourth device includes information related to the encryption key "123" for connecting with base station #A, the encryption key "456" for connecting with base station #B, and the encryption key "789" for connecting with base station #C.

Terminal 1050 in FIG. 14 receives symbol 600-1 related to an SSID and thus obtains the SSID "abcdef" of base station #A, the SSID "ghijk" of base station #B, and the SSID "pqrstu" of base station #C, receives symbol 1101 related to an encryption key and thus obtains the encryption key "123" for connecting with base station #A, the encryption key "456" for connecting with base station #B, and the encryption key "789" for connecting with base station #C. Then, based on this information, terminal 1050 in FIG. 14 selects a base station (or AP) to wirelessly connect to (for example, via radio waves), and connects to the selected base station (or AP).

As described in this embodiment, as a result of the terminal setting which base station to access, utilizing a light source, exemplified here as an LED light source, a mode for making a special setting for processes for establishing a wireless connection between the terminal and base station in the modulated signal for connection over radio waves that is transmitted by the terminal is not required, and a mode for making a special setting for processes for establishing a wireless connection between the terminal and base station in the modulated signal for connection over radio waves that is transmitted by the base station is not required, whereby an advantageous effect that wireless communication data transmission efficiency improves can be achieved.

Embodiment 6

Here, an example in which the base station includes an LED will be given.

Figure 20:
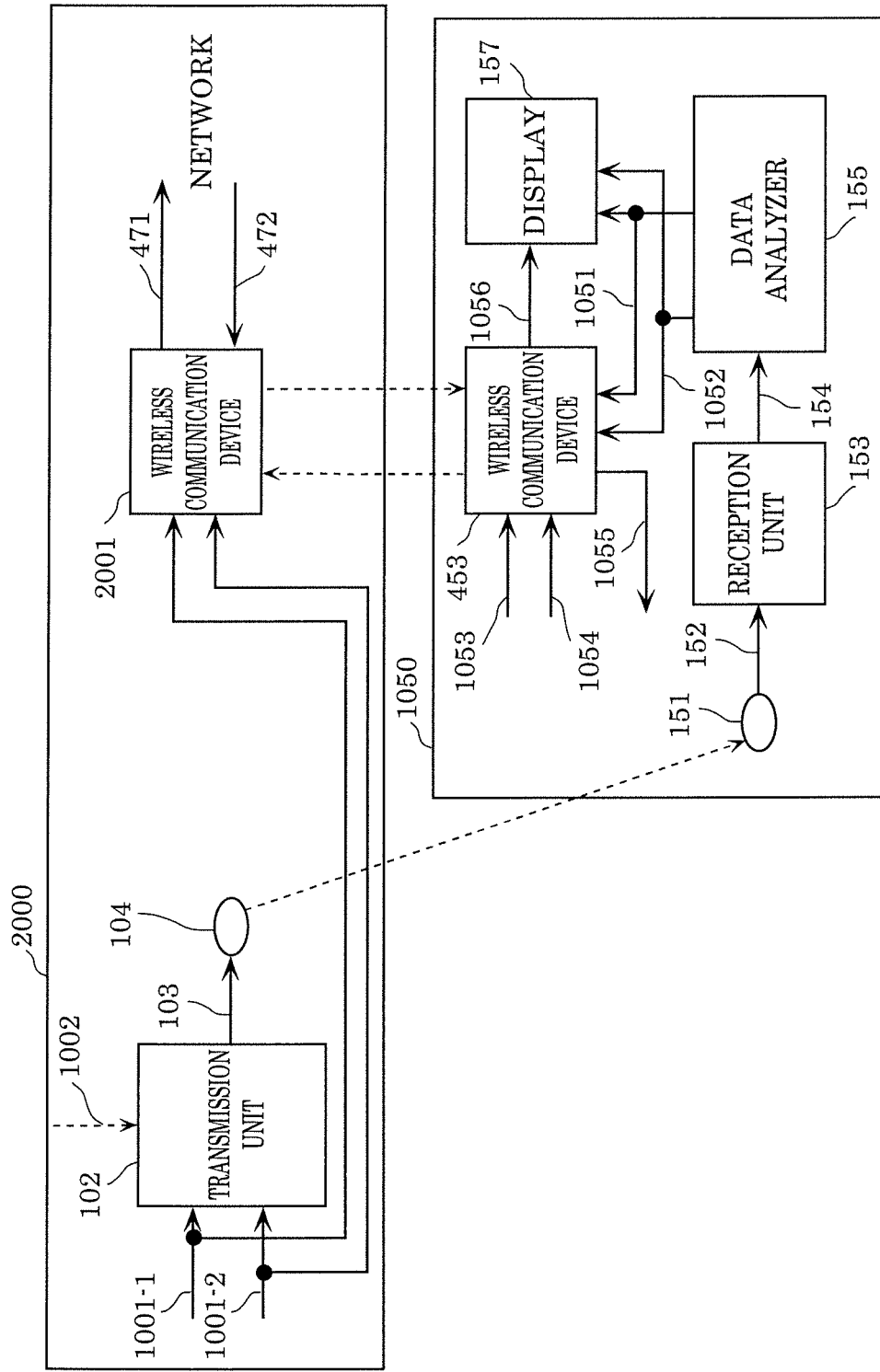
FIG. 20 illustrates one example of a configuration of a communication system.

FIG. 20 illustrates one example of a configuration of a communication system according to this embodiment. The communication system illustrated in FIG. 20 includes, for example: an LED light source, lamp, light source, and/or light that emits visible light; base station 2000 including wireless communication device 2001; and terminal 1050. Note that in FIG. 20, operations that are the same as in FIG. 1 and FIG. 10 share like reference marks.

Note that communication between wireless communication device 2001 and wireless communication device 453 in FIG. 20 is performed using, for example, radio waves.

Base station (or AP) 2000 in FIG. 20 includes, for example, an LED lamp, light source, and/or light that emits visible light. First, operations of one or more elements related to the LED lamp, light source, and/or light that emits visible light will be described.

Transmission unit 102 receives inputs of information 1001-1 related to an SSID, information 1001-2 related to an encryption key, and data 1002, and based on these input signals, generates a modulated signal (for optical communication), and outputs modulated signal 103. For example, modulated signal 103 is transmitted from light source 104.

Next, information 1001-1 related to an SSID and information 1001-2 related to an encryption key will be described.

First, information 1001-1 related to an SSID will be described.

Information 1001-1 related to an SSID is information indicating the SSID of, for example, wireless communication device 2001 that uses radio waves in base station (or AP) 2000 in FIG. 20. In other words, an "element related to the LED lamp, light source, and/or light that emits visible light" can provide access to wireless communication device 2001, which is a secure access destination for the terminal. With this, terminal 1050 in FIG. 20 can achieve the advantageous effect of being able to securely obtain information from wireless communication device 2001.

On the other hand, an element related to the LED lamp, light source, and/or light that emits visible light in base station 200 can restrict the terminals that access wireless communication device 2001 to terminals in a space in which reception of the optical signal transmitted (emitted) by the element related to the LED lamp, light source, and/or light that emits visible light in base station 200 is possible. Note that when terminal 1050 receives an optical signal transmitted via a predetermined scheme, it may be determined that the notified SSID is the SSID of a secure base station, and, alternatively, processing for determining whether the SSID is secure or not may be performed. For example, an element related to the LED lamp, light source, and/or light that emits visible light in base station 200 may transmit a predetermined identifier in an optical signal, and the terminal may determine whether the notified SSID is the SSID of a secure base station or not based on the received identifier.

Note that although FIG. 20 only illustrates base station (or AP) 2000, for example, when there is a base station (or AP) other than base station (or AP) 2000, terminal 1050 in FIG. 20 accesses base station (or AP) 2000 to obtain information.

Information 1001-2 related to an encryption key is information related to an encryption key required for terminal 1050 in FIG. 20 to establish communication with wireless communication device 2001 in FIG. 20. Encrypted communication is possible between terminal 1050 in FIG. 20 and wireless communication device 2001 as a result of terminal 1050 in FIG. 20 obtaining this information from an element related to the LED lamp, light source, and/or light that emits visible light. Terminal 1050 in FIG. 20 receives the modulated signal transmitted by an element related to the LED lamp, light source, and/or light that emits visible light in base station 200.

Note that in terminal 1050 in FIG. 20, components that operate the same as terminal 150 in FIG. 1 and terminal 1050 in FIG. 10 share like reference marks.

Light receiver 151 included in terminal 1050, examples of which include an image sensor such as a CMOS or organic CMOS image sensor, receives the modulated signal transmitted by an element related to the LED lamp, light source, and/or light that emits visible light in base station 200. Reception unit 153 receives an input of reception signal 152 received by light receiver 151, performs processing such as demodulation and error correction decoding on the reception signal, and outputs reception data 154.

Data analyzer 155 receives an input of reception data 154, and outputs, based on the reception data, for example, information 1051 on the SSID of wireless communication device 2001 in the base station to be connected to, and information 1052 on the encryption key for communication with wireless communication device 2001 in the base station to be connected to. For example, in a wireless local area network (LAN), examples of encryption schemes include wired equivalent privacy (WEP), Wi-Fi protected access (WPA), and Wi-Fi protected access 2 (WPA2) (pre-shared key (PSK) mode, extended authentication protocol (EAP) mode). However, the encryption method is not limited to these examples.

Display 157 receives inputs of information 1051 on the SSID and information 1052 on the encryption key, and, for example, displays the SSID of the communication partner to be accessed by wireless communication device 453 included in the terminal, and the encryption key (this display is referred to as a "first display" in this embodiment).

For example, after the first display, wireless communication device 453 included in terminal 1050 in FIG. 20 receives inputs of information 1051 on the SSID and information 1052 on the encryption key, and establishes a connection with wireless communication device 2001 in base station (or AP) 2000 (for example, the connection uses radio waves). Here, when wireless communication device 2001 in base station (or AP) 2000 also communicates with wireless communication device 453 in terminal 1050 in FIG. 20, wireless communication device 2001 in base station (or AP) 2000 transmits a modulated signal using, for example, radio waves.

Thereafter, wireless communication device 453 included in terminal 1050 in FIG. 20 receives inputs of data 1053 and control signal 1054, demodulates data 1053 in accordance with control signal 1054, and transmits a modulated signal as radio waves. Then, for example, wireless communication device 2001 in base station (or AP) 2000 transmits data to the network (471) and receives data (472) from the network. Thereafter, for example, wireless communication device 2001 in base station (or AP) 2000 transmits, to terminal 1050 in FIG. 20, a modulated signal as radio waves. Wireless communication device 453 included in terminal 1050 in FIG. 20 performs processing such as demodulation and error correction decoding on the modulated signal received as radio waves to obtain reception data 1056. Display 157 displays a display based on reception data 1056.

FIG. 11 illustrates one example of a configuration of a frame of a modulated signal transmitted by transmission unit 102 and light source 104 in base station (or AP) 2000 in FIG. 20. In FIG. 11, time is represented on the horizontal axis, and symbols that are the same as in FIG. 2 and FIG. 6 share like reference marks. Accordingly, repeated description thereof will be omitted.

Symbol 600-1 related to an SSID is a symbol for transmitting information 1001-1 related to an SSID in FIG. 20, and symbol 1101 related to an encryption key is a symbol for transmitting information 1001-2 related to an encryption key in FIG. 20. Data symbol 1102 is a symbol for transmitting data 1002.

Transmission unit 102 and light source 104 in base station (or AP) 2000 transmit preamble 201, control information symbol 202, symbol 600-1 related to an SSID, symbol 1101 related to an encryption key, and data symbol 1102. Note that transmission unit 102 and light source 104 in base station (or AP) 2000 in FIG. 20 may transmit a frame including symbols other than the symbols illustrated in FIG. 11. Moreover, the frame configuration, including the order in which the symbols are transmitted, is not limited to the configuration illustrated in FIG. 11.

FIG. 12 illustrates one example of a configuration of a frame of a modulated signal transmitted by wireless communication device 453 included in terminal 1050 in FIG. 20. In FIG. 12, time is represented on the horizontal axis. As illustrated in FIG. 12, wireless communication device 453 included in terminal 1050 in FIG. 20 transmits, for example, preamble 1201, and then transmits control information symbol 1202 and information symbol 1203.

Here, preamble 1201 is a symbol used for wireless communication device 2001 in base station (or AP) 2000 that receives the modulated signal transmitted by wireless communication device 453 in terminal 1050 in FIG. 20 to perform, for example, signal detection, time synchronization, frame synchronization, frequency synchronization, and frequency offset estimation.

Control information symbol 1202 includes data such as information related to the error correction encoding scheme method and/or demodulation scheme used in the generation of the modulated signal, information related to frame configuration, and information related to the transmission method used, and wireless communication device 2001 in base station (or AP) 2000, for example, demodulates the modulated signal based on the information included in control information symbol 1202.

Information symbol 1203 is a symbol for wireless communication device 453 included in terminal 1050 in FIG. 20 to transmit data.

Note that wireless communication device 453 included in terminal 1050 in FIG. 20 may transmit a frame including symbols other than the symbols illustrated in FIG. 12 (for example, a frame including a pilot symbol (reference symbol) midway through the information symbol). Moreover, the frame configuration, including the order in which the symbols are transmitted, is not limited to the configuration illustrated in FIG. 12. In FIG. 12, a plurality of symbols may be present along the frequency axis, that is to say, symbols may be present on a plurality of frequencies (a plurality of carriers).

FIG. 7 illustrates one example of a configuration of a frame of a modulated signal transmitted by wireless communication device 2001 in FIG. 20. In FIG. 7, time is represented on the horizontal axis. As illustrated in FIG. 7, base station 470 transmits, for example, preamble 701, and then transmits control information symbol 702 and information symbol 703.

Here, preamble 701 is a symbol for wireless communication device 453 included in terminal 1050 in FIG. 20, which receives the modulated signal transmitted by wireless communication device 2001 in FIG. 20, to perform, for example, signal detection, time synchronization, frame synchronization, frequency synchronization, and/or frequency offset estimation.

Control information symbol 702 includes data such as information related to the error correction encoding scheme method and/or demodulation scheme used in the generation of the modulated signal, information related to frame configuration, and information related to the transmission method used, and wireless communication device 453 included in terminal 1050 in FIG. 20, for example, demodulates the modulated signal based on the information included in the control information symbol.

Information symbol 703 is a symbol for wireless communication device 2001 in FIG. 20 to transmit data.

Note that wireless communication device 2001 included in base station 2000 in FIG. 20 may transmit a frame including symbols other than the symbols illustrated in FIG. 7 (for example, a frame including a pilot symbol (reference symbol) midway through the information symbol). Moreover, the frame configuration, including the order in which the symbols are transmitted, is not limited to the configuration illustrated in FIG. 7. In FIG. 7, a plurality of symbols may be present along the frequency axis, that is to say, symbols may be present on a plurality of frequencies (a plurality of carriers).

Moreover, for example, a modulated signal that has the frame configuration illustrated in FIG. 11 and is transmitted by an element related to the LED lamp, light source, and/or light that emits visible light in base station 200 being transmitted at a regular timing, e.g., repeatedly transmitted is conceivable. This makes it possible for a plurality of terminals to implement the operations described above.

Figure 21:
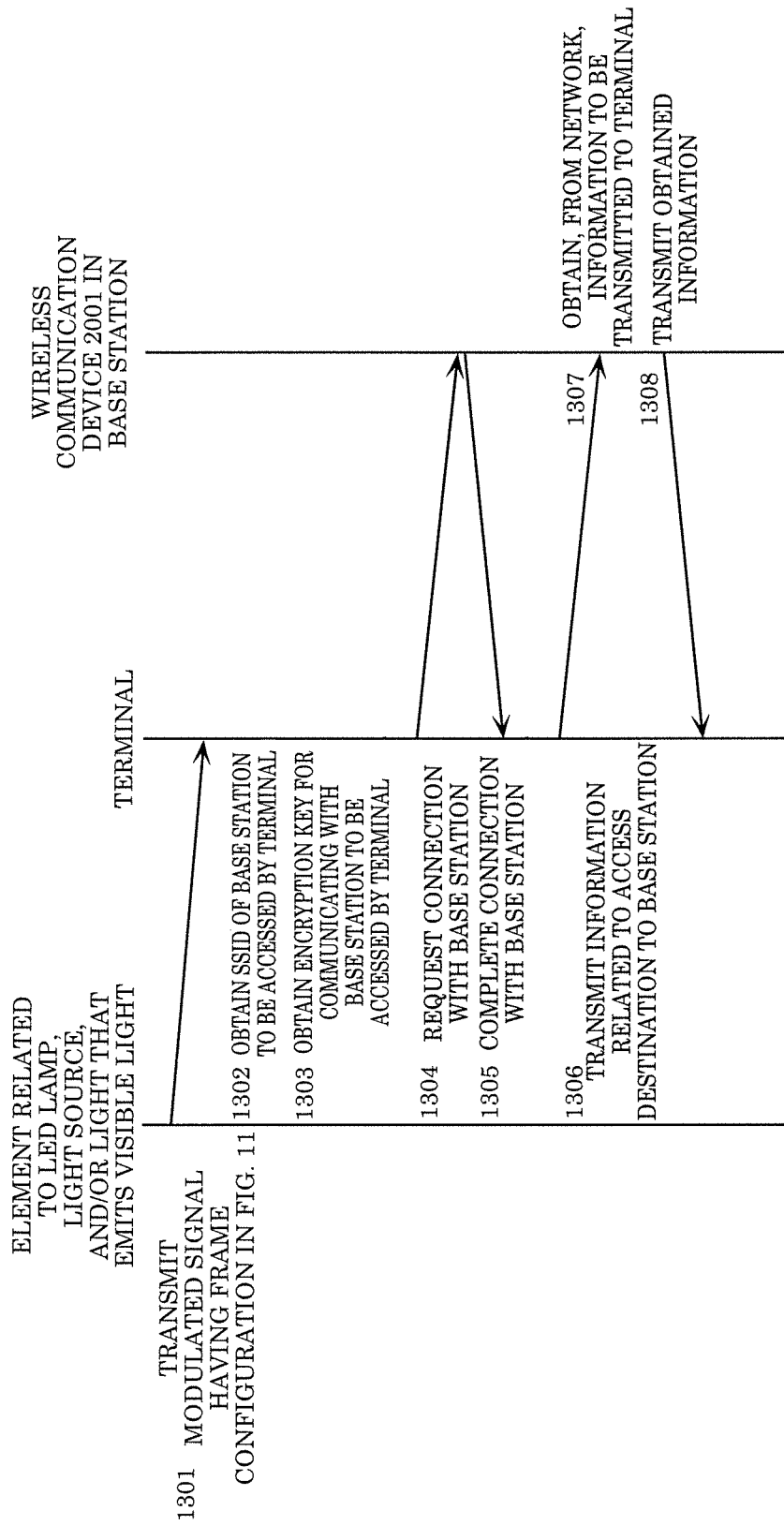
FIG. 21 is a flow chart of one example of processes performed by an element related to visible light, etc., a terminal, and a wireless communication device of a base station.

FIG. 21 is a flow chart illustrating one example of processes implemented by an element related to the LED lamp, light source, and/or light that emits visible light, terminal 1050, and wireless communication device 2001 in the base station (or AP) in FIG. 20.

First, as 1301 in FIG. 21 illustrates, an element related to the LED lamp, light source, and/or light that emits visible light in FIG. 20 transmits a modulated signal having the frame configuration illustrated in FIG. 11.

Then, as 1302 in FIG. 21 illustrates, the modulated signal transmitted by an element related to the LED lamp, light source, and/or light that emits visible light in FIG. 20 is received, and terminal 1050 in FIG. 20 obtains the SSID of the base station to be accessed by terminal 1050.

Likewise, as 1303 in FIG. 21 illustrates, terminal 1050 in FIG. 20 obtains an encryption key to be used for communicating with base station 470 to be accessed by the terminal.

Terminal 1050 in FIG. 20 requests connection with wireless communication device 2001 included in base station 2000 in FIG. 20 over radio waves (1304).

As 1305 in FIG. 21 illustrates, terminal 1050 in FIG. 20 completes the connection with wireless communication device 2001 included in base station 2000 in FIG. 20 upon receiving a response from wireless communication device 2001 included in base station 2000 in FIG. 20.

As 1306 in FIG. 21 illustrates, terminal 1050 in FIG. 20 transmits information on the connection destination to wireless communication device 2001 included in base station 2000 in FIG. 20 using radio waves.

Then, as 1307 in FIG. 21 illustrates, wireless communication device 2001 included in base station 2000 in FIG. 20 obtains information to be transmitted to terminal 1050 in FIG. 20 from the network.

As 1308 in FIG. 21 illustrates, wireless communication device 2001 included in base station 2000 in FIG. 20 transmits the obtained information to terminal 1050 in FIG. 20 using radio waves, and terminal 1050 in FIG. 20 obtains the information.

For example, when necessary, terminal 1050 in FIG. 20 obtains required information from the network via wireless communication device 2001 included in base station 2000 in FIG. 20.

As described above, based on the SSID information and the encryption key information transmitted from an element related to the LED lamp, light source, and/or light that emits visible light in the base station, the terminal connects to the base station (or AP) and obtains information, whereby an advantageous effect that it is possible to securely obtain information via the base station (or AP) whose security has been authenticated can be achieved. This is because, when information from a visible light modulated signal is obtained, since it is visible light, the user can easily determine whether the source of information is secure or not.

For example, when an SSID is obtained from a modulated signal transmitted by a wireless LAN over radio waves, it is difficult for the user to determine which device transmitted the radio waves. Accordingly, from the viewpoint of ensuring information security, obtaining the SSID via visible light communication is more suitable.

Note that in this embodiment, an element related to the LED lamp, light source, and/or light that emits visible light in the base station is exemplified as transmitting encryption key information, but, for example, when the base station (or AP) does not perform encrypted communication using an encryption key, the element related to the LED lamp, light source, and/or light that emits visible light in the base station can transmit only the information related to an SSID without transmitting the encryption key information, that is, the element related to the LED lamp, light source, and/or light that emits visible light in the base station may be implemented without the configuration related to an encryption key.

As illustrated in FIG. 20, the SSID and encryption key for wireless communication device 2001 included in base station 2000 may be overwritten. For example, in FIG. 20, information 1001-1 related to an SSID and information 1001-2 related to an encryption key are received as inputs by wireless communication device 2001. Wireless communication device 2001 included in base station 2000 overwrites the SSID and encryption key as per the input information 1001-1 related to an SSID and information 1001-2 related to an encryption key. With this, the security of the communication between the terminal and wireless communication device 2001 included in base station 2000 is assured (however, in FIG. 20, although wireless communication device 2001 included in base station 2000 has a function of being able to overwrite the SSID and encryption key, wireless communication device 2001 included in base station 2000 may have a configuration in which this function is not included).

Moreover, the configuration of an element related to the LED lamp, light source, and/or light that emits visible light in the base station is not limited to the configuration illustrated in FIG. 20, the configuration of the terminal is not limited to the configuration illustrated in FIG. 20, and the configuration of the connection destination of the wireless communication device included in the base station is not limited to the configuration illustrated in FIG. 20.

In this embodiment, although only one base station (or AP) is exemplified in the configuration illustrated in FIG. 20, a plurality of (secure) base stations (or APs) accessible by the terminal may be included (note that the wireless communication devices in these base stations transmit and receive modulated signals using radio waves). Here, the symbol related to an SSID transmitted by an element related to the LED lamp, light source, and/or light that emits visible light in FIG. 20 may include information indicating the SSIDs of the plurality of wireless communication devices in the base stations (or APs). Moreover, the symbol related to an encryption key transmitted by an element related to the LED lamp, light source, and/or light that emits visible light in FIG. 20 may include encryption key information used to connect to the plurality of wireless communication devices in the base stations (or APs). Terminal 1050 in FIG. 20 may select a wireless communication device in a base station (or AP) to wirelessly connect to (for example, over radio waves), based on the information on the SSIDs and encryption key information of the radio stations in the base stations (or connect to the plurality of wireless communication devices in the plurality of base stations (or APs)).

For example, assume there are three base stations (or APs) that include wireless communication devices. The wireless communication devices are named wireless communication device #A, wireless communication device #B, and wireless communication device #C. The SSID of wireless communication device #A is "abcdef", the SSID of wireless communication device #B is "ghijk", and the SSID of wireless communication device #C is "pqrstu", the encryption key for connecting with wireless communication device #A is "123", the encryption key for connecting with wireless communication device #B is "456", and the encryption key for connecting with wireless communication device #C is "789".

In such cases, symbol 600-1 related to an SSID in the frame configuration illustrated in FIG. 11 of the modulated signal transmitted by an element related to the LED lamp, light source, and/or light that emits visible light in base station 200 includes information related to the SSID "abcdef" of wireless communication device #A, the SSID "ghijk" of wireless communication device #B, and the SSID "pqrstu" of wireless communication device #C. The symbol 1101 related to an encryption key having the frame configuration illustrated in FIG. 11 includes information related to the encryption key "123" for connecting with wireless communication device #A, the encryption key "456" for connecting with wireless communication device #B, and the encryption key "789" for connecting with wireless communication device #C.

Terminal 1050 in FIG. 20 receives symbol 600-1 related to an SSID and thus obtains the SSID "abcdef" of wireless communication device #A, the SSID "ghijk" of wireless communication device #B, and the SSID "pqrstu" of wireless communication device #C, receives symbol 1101 related to an encryption key and thus obtains the encryption key "123" for connecting with wireless communication device #A, the encryption key "456" for connecting with wireless communication device #B, and the encryption key "789" for connecting with wireless communication device #C. Then, based on this information, terminal 1050 in FIG. 20 selects a base station (or AP) to wirelessly connect to (for example, via radio waves), and connects to the selected base station (or AP).

As described in this embodiment, as a result of the terminal setting a wireless communication device included in a base station to access using a light source, exemplified here as an LED light source, a mode for making a special setting for processes for establishing a wireless connection between the terminal and base station in the modulated signal for connection over radio waves that is transmitted by the terminal is not required, and a mode for making a special setting for processes for establishing a wireless connection between the terminal and base station in the modulated signal for connection over radio waves that is transmitted by the base station is not required, whereby an advantageous effect that wireless communication data transmission efficiency improves can be achieved.

As described above, the encryption key may be an encryption key for an SSID on a wireless LAN, may be an encryption key for restricting the form of connection used, the form of service used, and/or the connectivity range of the network (in other words, any encryption key that is restrictive is sufficient).

Embodiment 7

Here, an example in which there are a plurality of base stations and access control is performed will be given.

Figure 22:
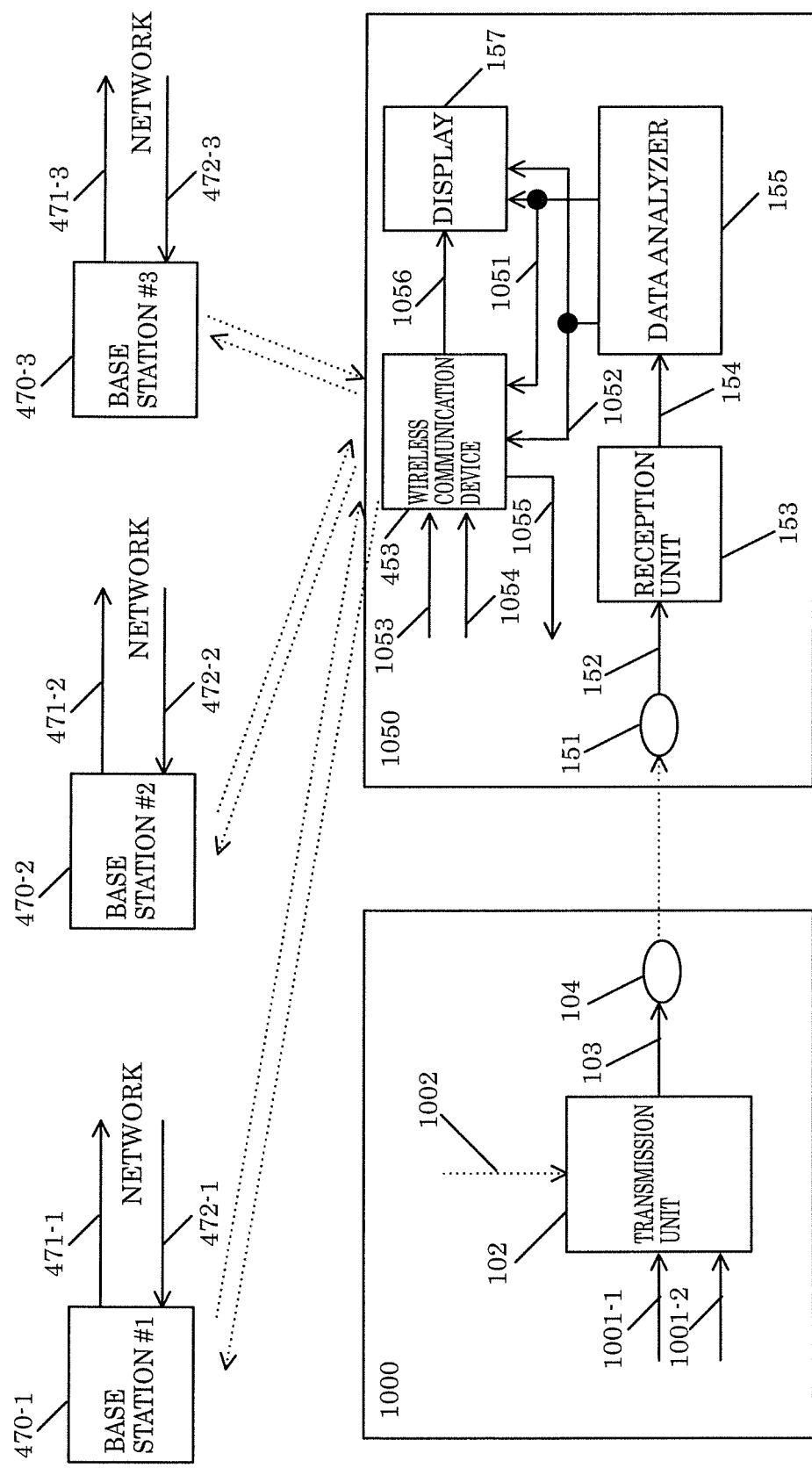
FIG. 22 illustrates one example of a configuration of a communication system.

FIG. 22 illustrates one example of a configuration of a communication system according to this embodiment. The communication system illustrated in FIG. 22 includes, for example: device 1000 including an LED light source, lamp, light source, and/or light that emits visible light; terminal 1050; and, for example, base station #1 470-1, base station #2 470-2, and base station #3 470-3 that communicate with terminal 1050. Note that in FIG. 22, operations that are the same as in FIG. 1, FIG. 4, and FIG. 10 share like reference marks.

Device 1000 in FIG. 22 includes, for example, an LED lamp, light source, and/or light that emits visible light. Note that device 1000 is referred to as a "fifth device" in this embodiment. Note that communication between wireless communication device wireless communication device 453 and base station #1 470-1, between wireless communication device 453 and base station #2 470-2, and between wireless communication device 453 and base station #3 470-3 in FIG. 22 is performed using, for example, radio waves.

In fifth device 1000 in FIG. 22, transmission unit 102 receives inputs of information 1001-1 related to an SSID, information 1001-2 related to an encryption key, and data 1002, and based on these input signals, generates a modulated signal (for optical communication), and outputs modulated signal 103. For example, modulated signal 103 is transmitted from light source 104.

Next, information 1001-1 related to an SSID and information 1001-2 related to an encryption key will be described.

First, information 1001-1 related to an SSID will be described.

For example, information 1001-1 related to an SSID is information indicating the SSID of base station (or AP) 470-1 in FIG. 22, the SSID of base station (or AP) 470-2 in FIG. 22, and the SSID of base station (or AP) 470-3 in FIG. 22. Note that, in this example, base stations (or APs) 470-1, 470-2, and 470-3 transmit modulated signals over radio waves, and receive radio wave modulated signals. In other words, fifth device 1000 can provide access to base stations 470-1, 470-2, and 470-3, which are secure access destinations for the terminal. With this, terminal 1050 in FIG. 22 can achieve the advantageous effect of being able to securely obtain information from base stations (or APs) 470-1, 470-2, and 470-3.

On the other hand, device 1000 can restrict the terminals that access base stations 470-1, 470-2, and 470-3 to terminals in a space in which it is possible to receive optical signals transmitted (emitted) by device 1000. Note that when terminal 1050 receives an optical signal transmitted via a predetermined scheme, it may be determined that the notified SSID is the SSID of a secure base station, and, alternatively, processing for determining whether the SSID is secure or not may be performed. For example, device 1000 may transmit a predetermined identifier in an optical signal, and the terminal may determine whether the notified SSID is the SSID of a secure base station or not based on the received identifier.

Note that the configuration in FIG. 22 illustrates base stations (or AP) 470-1, 470-2, and 470-3, but one or more base stations (or APs) other than base stations (or AP) 470-1, 470-2, and 470-3 may also be included.

Information 1001-2 related to an encryption key is information related to an encryption key required for terminal 1050 in FIG. 22 to establish communication with base stations (or AP) 470-1, 470-2, and 470-3 in FIG. 22. Encrypted communication is possible between the terminal and base station (or AP) 470-1, between the terminal and base station (or AP) 470-2, and between the terminal and base station (or AP) 470-3 as a result of terminal 1050 in FIG. 22 obtaining this information from fifth device 1000 in FIG. 22.

Terminal 1050 in FIG. 22 receives the modulated signal transmitted by fifth device 1000. Note that in terminal 1050 in FIG. 22, components that operate the same as terminal 150 in FIG. 1 and terminal 450 in FIG. 4 share like reference marks.

Light receiver 151 included in terminal 1050, examples of which include an image sensor such as a CMOS or organic CMOS image sensor, receives the modulated signal transmitted by fifth device 1000. Reception unit 153 receives an input of reception signal 152 received by light receiver 151, performs processing such as demodulation and error correction decoding on the reception signal, and outputs reception data 154.

Data analyzer 155 receives an input of reception data 154, and outputs, based on the reception data, for example, information 1051 on the SSIDs of the base stations (470-1, 470-2, and 470-3) to be connected to, and information 1052 on the encryption keys for communication with the base stations (470-1, 470-2, and 470-3) to be connected to. For example, in a wireless local area network (LAN), examples of encryption schemes include wired equivalent privacy (WEP), Wi-Fi protected access (WPA), and Wi-Fi protected access 2 (WPA2) (pre-shared key (PSK) mode, extended authentication protocol (EAP) mode). However, the encryption method is not limited to these examples.

Display 157 receives inputs of information 1051 on the SSID and information 1052 on the encryption key, and, for example, displays the SSID of the communication partner to be accessed by wireless communication device 453 included in the terminal, and the encryption key (this display is referred to as a "first display" in this embodiment).

For example, after the first display, wireless communication device 453 included in terminal 1050 in FIG. 22 receives inputs of information 1051 on the SSID and information 1052 on the encryption key, and establishes a connection with any one of base stations (or APs) 470-1, 470-2, and 470-3 (for example, the connection uses radio waves). Here, when the base station also communicates with wireless communication device 453 in terminal 1050 in FIG. 22, the base station transmits a modulated signal using, for example, radio waves.

Thereafter, wireless communication device 453 included in terminal 1050 in FIG. 22 receives inputs of data 1053 and control signal 1054, demodulates data 1053 in accordance with control signal 1054, and transmits a modulated signal as radio waves.

Then, for example, the base station (or AP) connected to transmits data to the network (any one of 471-1, 471-2, and 471-3) and receives data (any one of 472-1, 472-2, and 472-3) from the network. Thereafter, for example, the base station connected to transmits, to terminal 1050 in FIG. 22, a modulated signal as radio waves.

Wireless communication device 453 included in terminal 1050 in FIG. 22 performs processing such as demodulation and error correction decoding on the modulated signal received as radio waves to obtain reception data 1056. Display 157 displays a display based on reception data 1056.

Terminal 1050 in FIG. 22 receives the modulated signal transmitted by fifth device 1000. Note that in terminal 1050 in FIG. 22, components that operate the same as terminal 150 in FIG. 1 and terminal 450 in FIG. 4 share like reference marks.

Light receiver 151 included in terminal 1050, examples of which include an image sensor such as a CMOS or organic CMOS image sensor, receives the modulated signal transmitted by fifth device 1000. Reception unit 153 receives an input of reception signal 152 received by light receiver 151, performs processing such as demodulation and error correction decoding on the reception signal, and outputs reception data 154.

Data analyzer 155 receives an input of reception data 154, and outputs, based on the reception data, for example, information 1051 on the SSIDs of the base stations (470-1, 470-2, and 470-3) to be connected to, and information 1052 on the encryption keys for communication with the base stations (470-1, 470-2, and 470-3) to be connected to. For example, in a wireless local area network (LAN), examples of encryption schemes include wired equivalent privacy (WEP), Wi-Fi protected access (WPA), and Wi-Fi protected access 2 (WPA2) (pre-shared key (PSK) mode, extended authentication protocol (EAP) mode). However, the encryption method is not limited to these examples.

Display 157 receives inputs of information 1051 on the SSIDs and information 1052 on the encryption keys, and, for example, displays the SSID and of the communication partner to be accessed by wireless communication device 453 included in the terminal, and the encryption key (this display is referred to as a "first display" in this embodiment).

For example, after the first display, wireless communication device 453 included in terminal 1050 in FIG. 10 receives inputs of information 1051 on the SSIDs and information 1052 on the encryption keys, and establishes a connection with any one of base stations (or APs) 470-1, 470-2, and 470-3 (for example, the connection uses radio waves). Here, when the base station also communicates with wireless communication device 453 in terminal 1050 in FIG. 22, the base station transmits a modulated signal using, for example, radio waves.

Thereafter, wireless communication device 453 included in terminal 1050 in FIG. 22 receives inputs of data 1053 and control signal 1054, demodulates data 1053 in accordance with control signal 1054, and transmits a modulated signal as radio waves.

Then, for example, the base station (or AP) connected to transmits data to the network (any one of 471-1, 471-2, and 471-3) and receives data (any one of 472-1, 472-2, and 472-3) from the network. Thereafter, for example, the base station connected to transmits, to terminal 1050 in FIG. 22, a modulated signal as radio waves.

Wireless communication device 453 included in terminal 1050 in FIG. 22 performs processing such as demodulation and error correction decoding on the modulated signal received as radio waves to obtain reception data 1056. Display 157 performs display based on reception data 1056.

Figure 23:
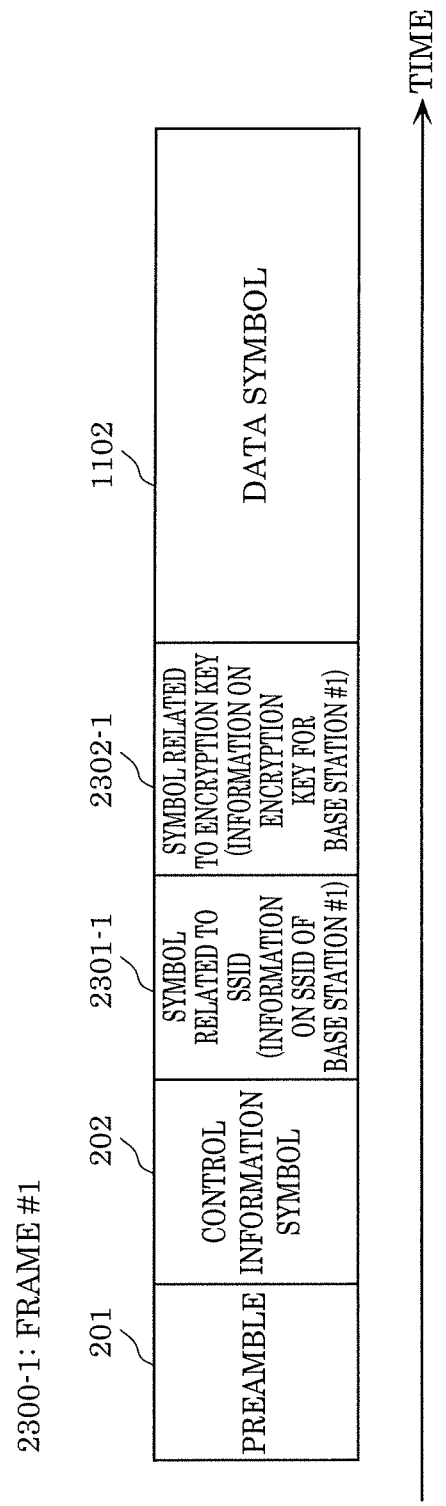
FIG. 23 illustrates one example of a frame configuration of a modulated signal transmitted by a device.
Figure 24:
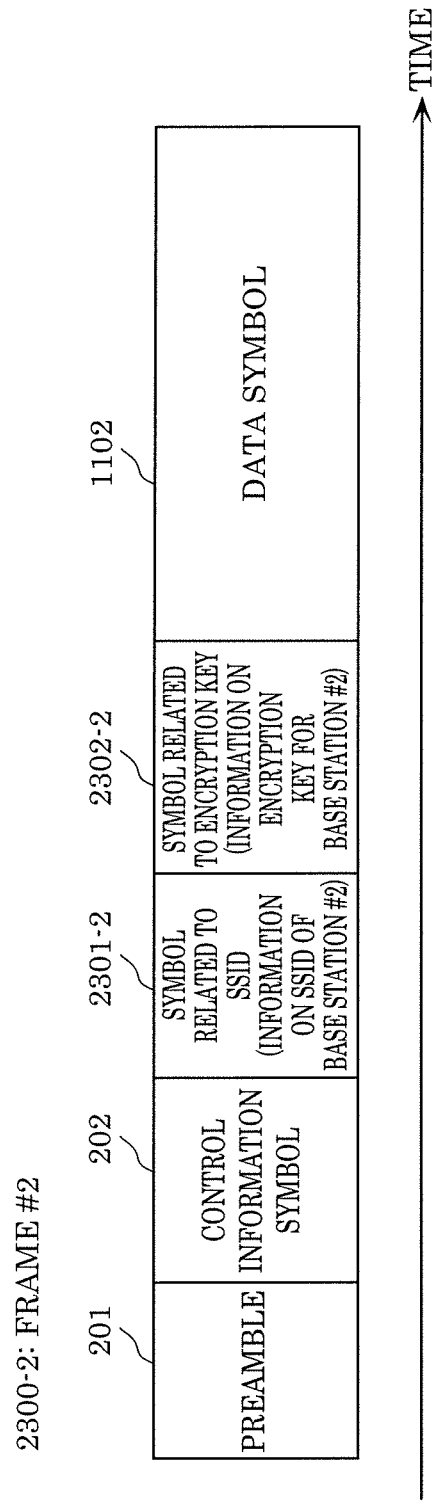
FIG. 24 illustrates one example of a frame configuration of a modulated signal transmitted by a device.
Figure 25:
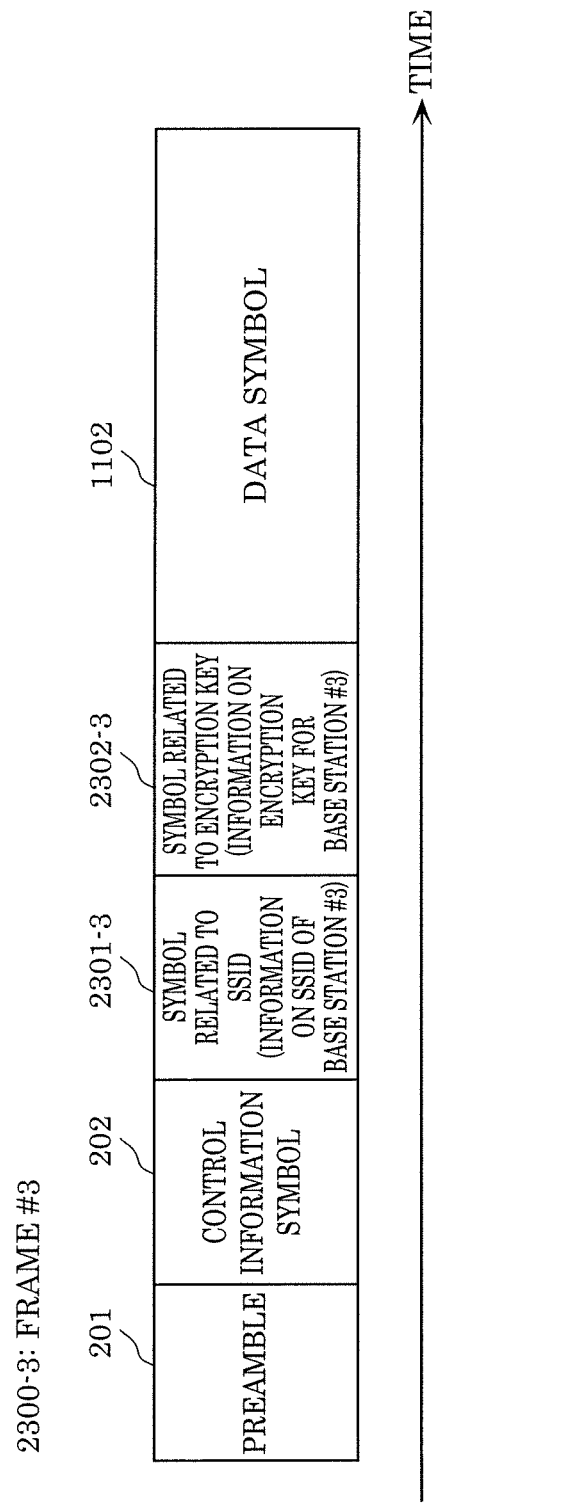
FIG. 25 illustrates one example of a frame configuration of a modulated signal transmitted by a device.

Assume, in the case of FIG. 22, there are three types of frame configurations as modulated signals transmitted by fifth device 1000 in FIG. 22. FIG. 23 illustrates frame #1 2300-1, which is one of the three types of frame configurations, FIG. 24 illustrates frame configuration #2 2300-2, which is one of the three types of frame configurations, and FIG. 25 illustrates frame configuration #3 2300-3, which is one of the three types of frame configurations.

FIG. 23 illustrates one example of the configuration of frame #1 2300-1 of a modulated signal transmitted by fifth device 1000 in FIG. 22. In FIG. 23, time is represented on the horizontal axis, and symbols that are the same as in FIG. 2 and FIG. 11 share like reference marks. Accordingly, repeated description thereof will be omitted. Frame #1 2300-1 in FIG. 23 is a frame for transmitting information on the SSID of base station #1 470-1 in FIG. 22 and an encryption key for base station #1 470-1 (an encryption key for accessing base station #1 470-1) in FIG. 22.

Symbol 2301-1 related to an SSID in FIG. 23 is a symbol for transmitting information 1001-1 related to an SSID in FIG. 22. Moreover, symbol 2301-1 related to an SSID in FIG. 23 is a symbol for fifth device 1000 in FIG. 22 to transmit the SSID of base station #1 470-1 in FIG. 22.

Symbol 2302-1 related to an encryption key in FIG. 23 is a symbol for transmitting information 1001-2 related to an encryption key in FIG. 22. Moreover, symbol 2302-1 related to an encryption key in FIG. 23 is a symbol for fifth device 1000 in FIG. 22 to transmit an encryption key for base station #1 470-1 (an encryption key for accessing base station #1 470-1) in FIG. 22.

Fifth device 1000 transmits preamble 201, control information symbol 202, symbol 2301-1 related to an SSID, symbol 2302-1 related to an encryption key, and data symbol 1102. Note that fifth device 1000 in FIG. 22 may transmit frame #1 2300-1 including symbols other than the symbols illustrated in FIG. 23. Moreover, the configuration of frame #1 2300-1, including the order in which the symbols are transmitted, is not limited to the configuration illustrated in FIG. 23.

FIG. 24 illustrates one example of the configuration of frame #2 2300-2 of a modulated signal transmitted by fifth device 1000 in FIG. 22. In FIG. 24, time is represented on the horizontal axis, and symbols that are the same as in FIG. 2 and FIG. 11 share like reference marks. Accordingly, repeated description thereof will be omitted. Frame #2 2300-2 in FIG. 24 is a frame for transmitting information on the SSID of base station #2 470-2 in FIG. 22 and an encryption key for base station #2 470-2 (an encryption key for accessing base station #2 470-2) in FIG. 22.

Symbol 2301-2 related to an SSID in FIG. 24 is a symbol for transmitting information 1001-1 related to an SSID in FIG. 22. Moreover, symbol 2301-2 related to an SSID in FIG. 24 is a symbol for fifth device 1000 in FIG. 22 to transmit the SSID of base station #2 470-2 in FIG. 22.

Symbol 2302-2 related to an encryption key in FIG. 24 is a symbol for transmitting information 1001-2 related to an encryption key in FIG. 22. Moreover, symbol 2302-2 related to an encryption key in FIG. 24 is a symbol for fifth device 1000 in FIG. 22 to transmit an encryption key for base station #2 470-2 (an encryption key for accessing base station #2 470-2) in FIG. 22.

Fifth device 1000 transmits preamble 201, control information symbol 202, symbol 2301-2 related to an SSID, symbol 2302-2 related to an encryption key, and data symbol 1102. Note that fifth device 1000 in FIG. 22 may transmit frame #2 2300-2 including symbols other than the symbols illustrated in FIG. 24. Moreover, the configuration of frame #2 2300-2, including the order in which the symbols are transmitted, is not limited to the configuration illustrated in FIG. 24.

FIG. 25 illustrates one example of the configuration of frame #3 2300-3 of a modulated signal transmitted by fifth device 1000 in FIG. 22. In FIG. 25, time is represented on the horizontal axis, and symbols that are the same as in FIG. 2 and FIG. 11 share like reference marks. Accordingly, repeated description thereof will be omitted. Frame #3 2300-3 in FIG. 25 is a frame for transmitting information on the SSID of base station #3 470-3 in FIG. 22 and an encryption key for base station #3 470-3 (an encryption key for accessing base station #3 470-3) in FIG. 22.

FIG. 25 illustrates one example of the configuration of frame #3 2300-3 of a modulated signal transmitted by fifth device 1000 in FIG. 22. In FIG. 25, time is represented on the horizontal axis, and symbols that are the same as in FIG. 2 and FIG. 11 share like reference marks. Accordingly, repeated description thereof will be omitted. Frame #3 2300-3 in FIG. 25 is a frame for transmitting information on the SSID of base station #3 470-3 in FIG. 22 and an encryption key for base station #3 470-3 (an encryption key for accessing base station #3 470-3) in FIG. 22.

Symbol 2301-3 related to an SSID in FIG. 25 is a symbol for transmitting information 1001-1 related to an SSID in FIG. 22. Moreover, symbol 2301-3 related to an SSID in FIG. 25 is a symbol for fifth device 1000 in FIG. 22 to transmit the SSID of base station #3 470-3 in FIG. 22.

Symbol 2302-3 related to an encryption key in FIG. 25 is a symbol for transmitting information 1001-2 related to an encryption key in FIG. 22. Moreover, symbol 2302-3 related to an encryption key in FIG. 25 is a symbol for fifth device 1000 in FIG. 22 to transmit an encryption key for base station #3 470-3 (an encryption key for accessing base station #3 470-3) in FIG. 22.

Fifth device 1000 transmits preamble 201, control information symbol 202, symbol 2301-3 related to an SSID, symbol 2302-3 related to an encryption key, and data symbol 1102. Note that fifth device 1000 in FIG. 22 may transmit frame #3 2300-3 including symbols other than the symbols illustrated in FIG. 25. Moreover, the configuration of frame #3 2300-3, including the order in which the symbols are transmitted, is not limited to the configuration illustrated in FIG. 25.

Figure 26:
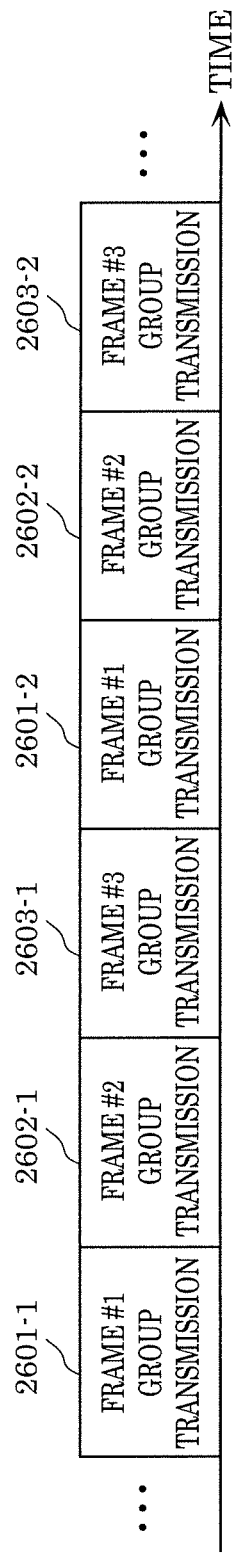
FIG. 26 illustrates one example of a transmission method used by a device to transmit a plurality of frames.

FIG. 26 illustrates an example of a transmission method used by fifth device 1000 in FIG. 22 upon transmitting frame #1 2300-1 in FIG. 23, frame #2 2300-2 in FIG. 24, and frame #3 2300-3 in FIG. 25. In FIG. 26, time is represented on the horizontal axis.

In FIG. 26, in the frame #1 group transmissions of 2601-1 and 2601-2, one or more of frames #1 2300-1 illustrated in FIG. 23 are transmitted. In the frame #2 group transmissions of 2602-1 and 2602-2, one or more of frames #2 2300-2 in FIG. 24 are transmitted. In the frame #3 group transmissions of 2603-1 and 2603-2, one or more of frames #3 2300-3 in FIG. 25 are transmitted.

This will be described in more detail next.

The recitation "in the frame #1 group transmissions of 2601-1 and 2601-2, one or more of frames #1 2300-1 illustrated in FIG. 23 are transmitted" above will be described.

For example, when an image sensor, such as a CMOS or organic CMOS image sensor is used in light receiver 151, it is possible to process the reception signal in units of frames in moving or still images. Note that, for example, when a moving picture is labeled as "4K 30p", the number of pixels of one frame is 3840×2160, and the moving picture includes 30 frames per second.

Accordingly, when fifth device 1000 in FIG. 22 transmits a modulated signal including frame #1 2300-1 in FIG. 23, frame #2 2300-2 in FIG. 24, and frame #3 2300-3 in FIG. 25 in a single frame, terminal 1050 in FIG. 22 has difficulty in selecting a base station to access from among the plurality of base stations.

In view of this, a frame configuration such as illustrated in FIG. 26 is proposed.

(Method 1-1)

Method 1-1 makes the time interval that frame #1 group transmission occupies longer than a frame of a still or moving picture by including a plurality of frames #1 2300-1 illustrated in FIG. 23, in frame #1 group transmissions of 2601-1 and 2601-2.

This method makes it possible for terminal 1050 in FIG. 22 to easily select a base station to access from among the plurality of base stations since terminal 1050 in FIG. 22 can prevent the reception of a modulated signal including, in a single frame of a still or moving picture, frame #1 2300-1 in FIG. 23, frame #2 2300-2 in FIG. 24, and frame #3 2300-3 in FIG. 25, by fifth device 1000.

(Method 2-1)

Method 2-1 makes the time interval that frame #1 2300-1 in FIG. 23 occupies longer than a frame of a still or moving picture. For example, symbol 2301-1 related to an SSID in FIG. 23 may include a plurality of items of the information on the SSID for base station #1 (the information on the SSID for base station #1 is repeatedly included), or symbol 2302-1 related to an encryption key may include a plurality of items of the information on the encryption key for base station #1 (the encryption key for connecting with base station #1) (the information on the encryption key for base station #1 (the encryption key for connecting with base station #1) is repeatedly included).

This method makes it possible for terminal 1050 in FIG. 22 to easily select a base station to access from among the plurality of base stations since terminal 1050 in FIG. 22 can prevent the reception of a modulated signal including, in a single frame of a still or moving picture, frame #1 2300-1 in FIG. 23, frame #2 2300-2 in FIG. 24, and frame #3 2300-3 in FIG. 25, by fifth device 1000.

Similarly, frame #2 group transmissions of 2602-1 and 2602-2 may have the following configurations.

(Method 1-2)

Method 1-2 makes the time interval that frame #2 group transmission occupies longer than a frame of a still or moving picture by including a plurality of frames #2 2300-2 illustrated in FIG. 24, in frame #2 group transmissions of 2602-1 and 2602-2.

(Method 2-2)

Method 2-2 makes the time interval that frame #2 2300-2 in FIG. 24 occupies longer than a frame of a still or moving picture. For example, symbol 2301-2 related to an SSID in FIG. 24 may include a plurality of items of the information on the SSID for base station #2 (the information on the SSID for base station #2 is repeatedly included), or symbol 2302-2 related to an encryption key may include a plurality of items of the information on the encryption key for base station #2 (the encryption key for connecting with base station #2) (the information on the encryption key for base station #2 (the encryption key for connecting with base station #2) is repeatedly included).

Similarly, frame #3 group transmissions of 2603-1 and 2603-2 may have the following configurations.

(Method 1-3)

Method 1-3 makes the time interval that frame #3 group transmission occupies longer than a frame of a still or moving picture by including a plurality of frames #3 2300-3 illustrated in FIG. 25, in frame #3 group transmissions of 2603-1 and 2603-2.

(Method 2-3)

Method 2-3 makes the time interval that frame #3 2300-3 in FIG. 25 occupies longer than a frame of a still or moving picture. For example, symbol 2301-3 related to an SSID in FIG. 25 may include a plurality of items of the information on the SSID for base station #3 (the information on the SSID for base station #3 is repeatedly included), or symbol 2302-3 related to an encryption key may include a plurality of items of the information on the encryption key for base station #3 (the encryption key for connecting with base station #3) (the information on the encryption key for base station #3 (the encryption key for connecting with base station #3) is repeatedly included).

Next, the advantageous effects achieved when fifth device 1000 in FIG. 22 transmits a frame, such as those illustrated in FIG. 23 through FIG. 26, will be described.

Figure 27:
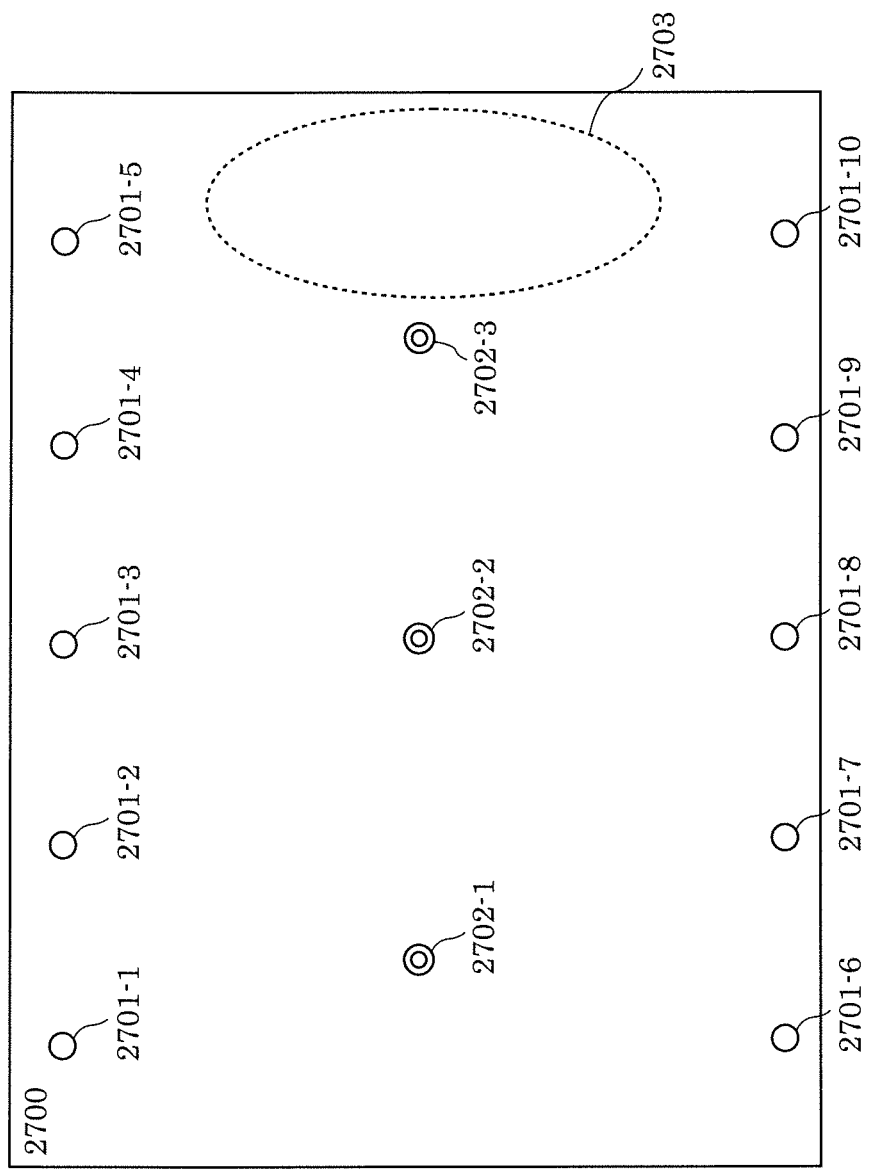
FIG. 27 illustrates one example of an area.

Consider area 2700 in FIG. 27. Fifth devices 1000 having the configuration illustrated in FIG. 22 are disposed at circles 2701-1, 2701-2, 2701-3, 2701-4, 2701-5, 2701-6, 2701-7, 2701-8, 2701-8, 2701-9, and 2701-10. Base station #1 470-1 in FIG. 22 is disposed at double circle 2702-1, base station #2 470-2 in FIG. 22 is disposed at double circle 2702-2, and base station #3 470-3 in FIG. 22 is disposed at double circle 2702-3.

For example, 99 terminals having the configuration of 1050 in FIG. 22 are present in the area indicated as 2703.

Here, for example, fifth devices 2701-5 and 2701-10 both transmit information on the SSID of base station #3 470-3 and information on the encryption key for access to base station #3 470-3 (since the base station closest to fifth devices 2701-5 and 2701-10 is base station #3 470-3).

In such cases, all of the 99 terminals having the configuration of 1050 in FIG. 22 will access base station #3 470-3 in FIG. 22. This means there is a high probability that the terminals having the configuration of 1050 in FIG. 22 will have difficulty accessing base station #3 470-3 in FIG. 22.

Taking this point into consideration, by making it so that the 99 terminals having the configuration of 1050 in FIG. 22 access base station #1 470-1 (2702-1) in FIG. 22, base station #2 470-2 (2702-2) in FIG. 22, and base station #3 470-3 (2702-3) in FIG. 22 as evenly as possible, it is possible to achieve the advantageous effect of a reduction in terminals having difficulty accessing a base station, as described above.

In this embodiment, when fifth device 1000 in FIG. 22 transmits a frame, such as those illustrated in FIG. 23 through FIG. 26, the 99 terminals having the configuration of 1050 in FIG. 22 typically access fifth device 1000 in FIG. 22 at different timings, so the 99 terminals having the configuration of 1050 in FIG. 22 access base station #1 470-1 (2702-1) in FIG. 22, base station #2 470-2 (2702-2) in FIG. 22, and base station #3 470-3 (2702-3) in FIG. 22 as evenly as possible. Accordingly, the previously-described advantageous effect of a reduction in terminals having difficulty accessing a base station can be achieved.

Note that although FIG. 26 illustrates an example of a transmission method used upon fifth device 1000 in FIG. 22 transmitting frame #1 2300-1 in FIG. 23, frame #2 2300-2 in FIG. 24, and frame #3 2300-3 in FIG. 25, the transmission method used upon fifth device 1000 in FIG. 22 transmitting frame #1 2300-1 in FIG. 23, frame #2 2300-2 in FIG. 24, and frame #3 2300-3 in FIG. 25 is not limited to this example.

For example, in FIG. 26, the order of frame #1 group transmission, frame #2 group transmission, and frame #3 group transmission is repeated, but the order in which frame #1 group transmission, frame #2 group transmission, and frame #3 group transmission are transmitted is not limited to the example given in FIG. 26. For example, the transmission of frame group #1, the transmission of frame group #2, and the transmission of frame group #3 may be temporally randomized, and, alternatively, the order of the transmission of frame group #1, the transmission of frame group #2, and the transmission of frame group #3 may be a regular order different than the example given in FIG. 26. It is sufficient so long as fifth device 1000 in FIG. 22 transmits frame #1 group, frame #2 group, and frame #3 group.

Moreover, in FIG. 26, frame #1 group transmission, frame #2 group transmission, and frame #3 group transmission are exemplified as being performed consecutively, but these transmissions do not necessarily need to be performed consecutively. For example, in FIG. 26, there may be a time interval between frame #1 group transmission 2601-1 and frame #2 group transmission 2602-2.

In FIG. 26, the example includes only frame #1 group transmission, frame #2 group transmission, and frame #3 group transmission, but other symbols and/or frames may be included. Furthermore, in FIG. 26 and FIG. 22, there are three base stations, but the number of base stations is not limited to this example. As long as there are two or more base stations, they can operate the same as when there are three. Accordingly, for example, when there are N base stations (N is an integer of 2 or more), when transmission such as that illustrated in FIG. 26 is performed, frame #k group transmission is performed. Note that k is an integer greater than or equal to 1 and less than or equal to N. Then, in the transmission of frame #k group, there is a symbol related to an SSID (information on the SSID of base station #k) and a symbol related to an encryption key (information on an encryption key for base station #k).

FIG. 12 illustrates one example of a configuration of a frame of a modulated signal transmitted by wireless communication device 453 included in terminal 1050 in FIG. 22. In FIG. 12, time is represented on the horizontal axis. As illustrated in FIG. 12, wireless communication device 453 included in terminal 1050 in FIG. 22 transmits, for example, preamble 1201, and then transmits control information symbol 1202 and information symbol 1203.

Here, preamble 1201 is a symbol used for base stations (or APs) 470-1, 470-2, and 470-3 that receive the modulated signal transmitted by wireless communication device 453 in terminal 1050 in FIG. 22 to perform, for example, signal detection, time synchronization, frame synchronization, frequency synchronization, and frequency offset estimation.

Control information symbol 1202 includes data such as information related to the error correction encoding scheme method and/or demodulation scheme used in the generation of the modulated signal, information related to frame configuration, and information related to the transmission method used, and base stations (or APs) 470-1, 470-2, and 470-3, for example, demodulate the modulated signal based on the information included in control information symbol 1202.

Information symbol 1203 is a symbol for wireless communication device 453 included in terminal 1050 in FIG. 22 to transmit data.

Note that wireless communication device 453 included in terminal 1050 in FIG. 22 may transmit a frame including symbols other than the symbols illustrated in FIG. 12 (for example, a frame including a pilot symbol (reference symbol) midway through the information symbol). Moreover, the frame configuration, including the order in which the symbols are transmitted, is not limited to the configuration illustrated in FIG. 12. In FIG. 12, a plurality of symbols may be present along the frequency axis, that is to say, symbols may be present on a plurality of frequencies (a plurality of carriers).

FIG. 7 illustrates one example of a configuration of a frame of a modulated signal transmitted by base stations 470-1, 470-2, and 470-3 in FIG. 22. In FIG. 7, time is represented on the horizontal axis. As illustrated in FIG. 7, base stations 470-1, 470-2, and 470-3 transmit, for example, preamble 701, and then transmit control information symbol 702 and information symbol 703.

Here, preamble 701 is a symbol for wireless communication device 453 included in terminal 1050 in FIG. 22, which receives the modulated signals transmitted by base stations 470-1, 470-2, and 470-3, to perform, for example, signal detection, time synchronization, frame synchronization, frequency synchronization, and/or frequency offset estimation.

Control information symbol 702 includes data such as information related to the error correction encoding scheme method and/or demodulation scheme used in the generation of the modulated signal, information related to frame configuration, and information related to the transmission method used, and wireless communication device 453 included in terminal 1050 in FIG. 22, for example, demodulates the modulated signal based on the information included in the control information symbol.

Information symbol 703 is a symbol for base stations (or APs) 470-1, 470-2, and 470-3 in FIG. 22 to transmit data.

Note that base stations (or APs) 470-1, 470-2, and 470-3 in FIG. 22 may transmit a frame including symbols other than the symbols illustrated in FIG. 7 (for example, a frame including a pilot symbol (reference symbol) midway through the information symbol). Moreover, the frame configuration, including the order in which the symbols are transmitted, is not limited to the configuration illustrated in FIG. 7. In FIG. 7, a plurality of symbols may be present along the frequency axis, that is to say, symbols may be present on a plurality of frequencies (a plurality of carriers).

Figure 28:
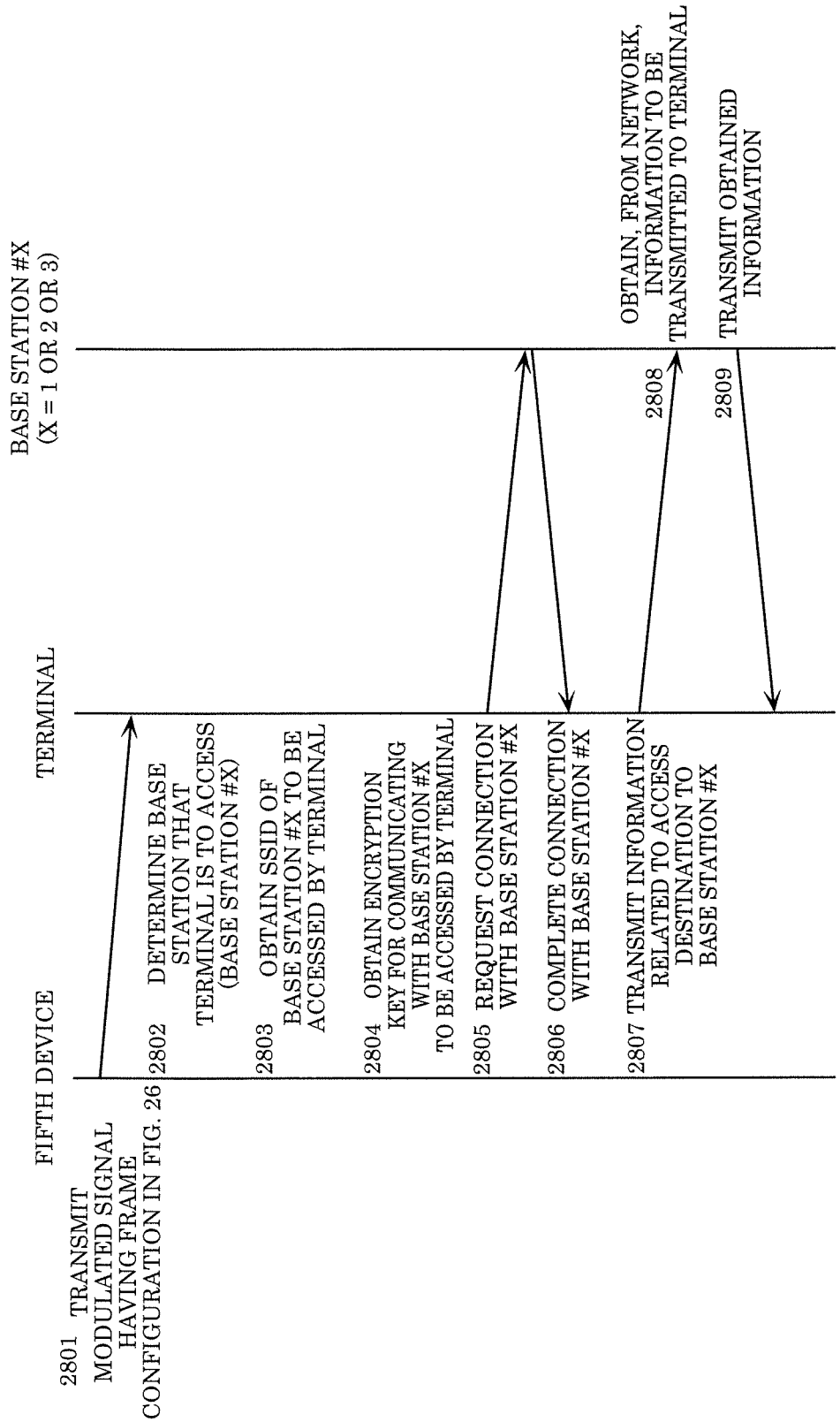
FIG. 28 is a flow chart of one example of processes performed by a device, a terminal, and a base station.

FIG. 28 is a flow chart illustrating one example of processes implemented by fifth device 1000, terminal 1050, and base station #X (or AP #X) in FIG. 22. Note that X is 1, 2, or 3.

First, as 2801 in FIG. 28 illustrates, fifth device 1000 in FIG. 22 transmits a modulated signal having the frame configuration illustrated in FIG. 26.

Likewise, as 2802 in FIG. 28 illustrates, the modulated signal transmitted by fifth device 1000 in FIG. 22 is received, and terminal 1050 in FIG. 22 selects the base station to be accessed by terminal 1050 from among base station #1 470-1, base station #2 470-2, and base station #3 470-3 in FIG. 22.

This point will be discussed next. Terminal 1050 in FIG. 22 attempts to access a base station, and receives a modulated signal transmitted by fifth device 1000 in FIG. 22. Here, for example, in one frame of a moving or still picture, any one of frame #1 group transmission, frame #2 group transmission, and frame #3 group transmission in FIG. 26 is obtained. Then, from the obtained information on the base station (for example, the SSID), terminal 1050 in FIG. 22 determines which of base station #1 470-1, base station #2 470-2, and base station #3 470-3 in FIG. 22 to access.

As 2803 in FIG. 28 illustrates, the modulated signal transmitted by fifth device 1000 in FIG. 22 is received, and terminal 1050 in FIG. 22 obtains the SSID of base station #X to be accessed by terminal 1050.

Likewise, as 2804 in FIG. 28 illustrates, terminal 1050 in FIG. 22 obtains an encryption key to be used for communicating with base station #X to be accessed by the terminal.

Terminal 1050 in FIG. 22 then requests connection with base station #X over radio waves (2805).

As 2806 in FIG. 28 illustrates, terminal 1050 in FIG. 22 completes the connection with base station #X upon receiving a response from base station #X.

As 2807 in FIG. 28 illustrates, terminal 1050 in FIG. 22 transmits information on the connection destination to base station #X using radio waves.

Then, as 2808 in FIG. 28 illustrates, base station #X obtains information to be transmitted to terminal 1050 in FIG. 22 from the network.

As 2809 in FIG. 28 illustrates, base station #X transmits the obtained information to terminal 1050 in FIG. 22 using radio waves, and terminal 1050 in FIG. 22 obtains the information.

For example, when necessary, terminal 1050 in FIG. 22 obtains required information from the network via base station #X.

As described above, based on the SSID information and the encryption key information transmitted from the fifth device, the terminal connects to the base station (or AP) and obtains information, whereby an advantageous effect that it is possible to securely obtain information via the base station (or AP) whose security has been authenticated can be achieved. This is because, when information from a visible light modulated signal is obtained, since it is visible light, the user can easily determine whether the source of information is secure or not.

For example, when an SSID is obtained from a modulated signal transmitted by a wireless LAN over radio waves, it is difficult for the user to determine which device transmitted the radio waves. Accordingly, from the viewpoint of ensuring information security, obtaining the SSID via visible light communication is more suitable.

Note that in this embodiment, the fifth device is exemplified as transmitting encryption key information, but, for example, when the base station (or AP) does not perform encrypted communication using an encryption key, the fifth device can transmit only the information related to an SSID without transmitting the encryption key information, that is, the fifth device may be implemented without the configuration related to an encryption key.

Moreover, the configuration of the fifth device is not limited to the configuration illustrated in FIG. 22, the configuration of the terminal is not limited to the configuration illustrated in FIG. 22, and the configurations of the connection destination of base stations #1, #2, and #3 are not limited to the configurations illustrated in FIG. 22.

Accordingly, when a configuration such as the one described in this embodiment is implemented, when there are a plurality of terminals in a given area, an advantageous effect of a reduction in terminals having difficulty accessing a base station can be achieved.

Note that in FIG. 27, the frame configurations of the modulated signals transmitted by the fifth devices disposed at circles 2701-1, 2701-2, 2701-3, 2701-4, 2701-5, 2701-6, 2701-7, 2701-8, 2701-8, 2701-9, and 2701-10 may all be the same as illustrated in FIG. 26, the frame configurations of the modulated signals transmitted by the fifth devices may be mutually different, and two or more of the fifth devices may transmit modulated signals having the same frame configuration.

Embodiment 8

According to the above embodiments, the transmission device that includes a light source or lamp and transmits modulated optical signals may be configured to obtain, from an external device such as a server, data to be transmitted using modulated optical signals, and update the transmission data thereupon. The reason why is because it achieves the advantageous effect that data desired by the user or device can be sequentially updated.

Hereinafter, an example of a communication system related to the above will be described.

Figure 29:
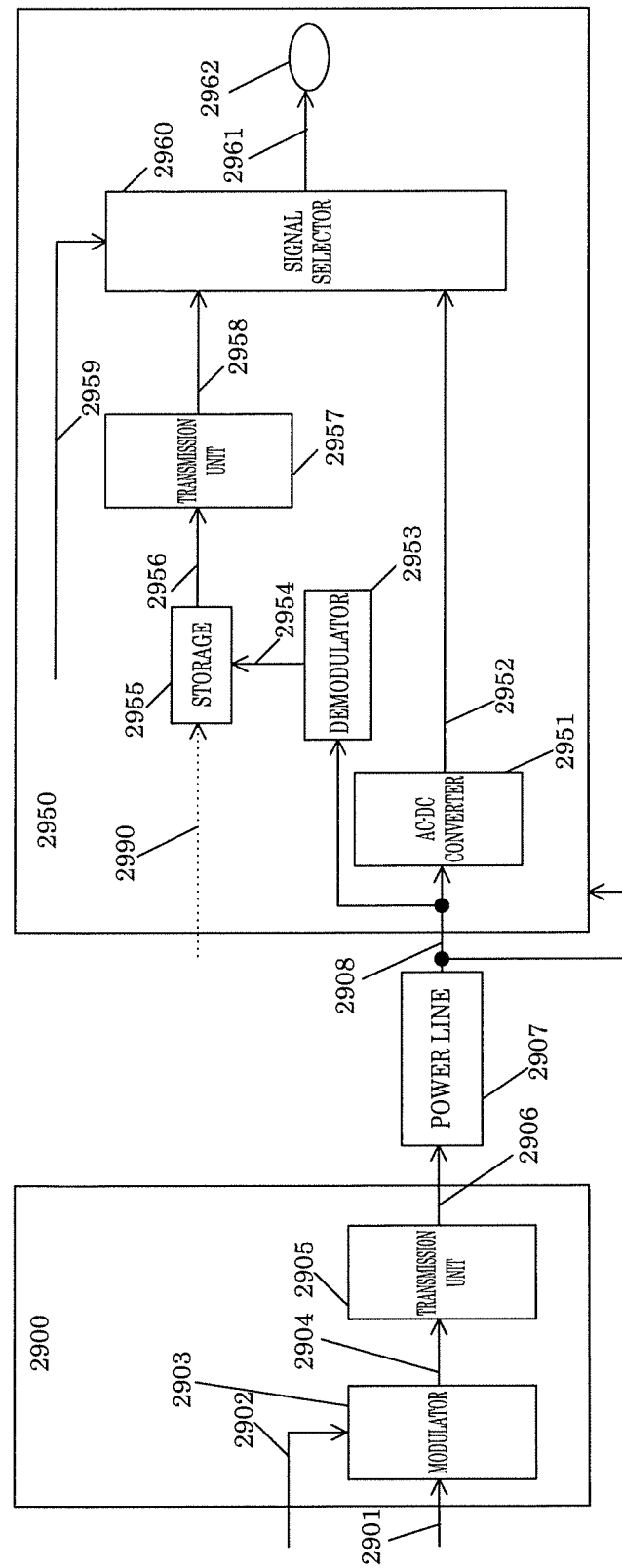
FIG. 29 illustrates one example of a configuration of a device related to modulated optical signal transmission.

FIG. 29 illustrates one example of a configuration of a device related to modulated optical signal transmission according to this embodiment. The device related to modulated optical signal transmission includes a power line communication (PLC) communication device 2900, and communication device 2950 that transmits modulated optical signals.

Modulator 2903 in the PLC communication device 2900 receives inputs of data 2901 and control signal 2902, and based on information on the error correction encoding method (error correction code, encode rate, code length (block length) etc.) and modulation scheme included in control signal 2902, performs error correction encoding and performs mapping based on the set modulation scheme to generate and output modulated signal 2904.

Note that data 2901 shall include data transmitted in a modulated optical signal transmitted by device 2950.

Transmission unit 2905 receives an input of modulated signal 2904, and implements signal processing to generate and output transmission signal 2906. Note that transmission unit 2905 may implement signal processing related to an Orthogonal Frequency Division Multiplexing (OFDM) scheme to generate and output a transmission signal 2906 based on the OFDM scheme. Moreover, transmission unit 2905 may implement signal processing related to a wavelet OFDM scheme to generate and output a transmission signal 2906 based on the wavelet OFDM scheme. However, although the above describes an OFDM or wavelet OFDM multi-carrier scheme transmission signal, the transmission signal is not limited to this example, and may be a single-carrier or a spread spectrum transmission signal. Note that the wavelet OFDM scheme is described in H. Koga, N. Kodama, and T. Konishi, "High-speed power line communication system based on wavelet OFDM," Proc. of ISPLC 2003, and S. Galli, H. Koga, and N. Kodama, "Advanced signal processing for PLCs: Wavelet-OFDM," Proc. of 2008 IEEE International Symposium on Power Line Communications and Its Applications.

One characteristic of the PLC communication device 2900 is that the transmission signal is a signal having a frequency spectrum from direct current (DC) to N [Hz]. Note that N is a real number that is greater than 0. However, the spectrum of the transmission signal is not limited to being present in all frequencies from direct current (DC) to N [Hz]. Accordingly, transmission unit 2905 may have a configuration in which it does not include a frequency converter (radio frequency (RF) unit).

Transmission signal 2006 travels over a power line and is input into communication device 2950 as reception signal 2908. The power line over which transmission signal 2006 travels also provides power to device 2950. Demodulator 2953 receives an input of reception signal 2908, performs decoding processing such as demapping and/or error correction decoding, and outputs reception data 2954.

Storage 2955 receives an input of reception data 2954, and when storage 2955 determines that reception data 2954 is updated data, stores a part of all of reception data 2954. Transmission unit 2957 receives an input of stored data 2956.

Note that storage 2955 may use control signal 2990 to determine whether reception data 2954 is updated data.

Transmission unit 2957 receives an input of stored data 2956, and performs processing such as modulation to generate and output transmission signal 2958. Here, frequency conversion is not performed (accordingly, transmission signal 2958 is a signal having a frequency spectrum from DC to P [Hz] (P is a real number that is greater than 0)).

AC-DC converter 2951 receives an input of reception signal 2980, converts AC reception signal 2980 to a DC signal, and outputs converted signal 2952.

Signal selector 2960 receives inputs of transmission signal 2958, converted signal 2952, and control signal 2959, selects one of transmission signal 2958 and converted signal 2952 based on control signal 2959, and outputs the selection as selected signal 2961. Selected signal 2961 is then transmitted from light source 2962.

Note that when signal selector 2960 selects converted signal 2952 as selected signal 2961, selected signal 2961 may include a signal other than converted signal 2952.

As described above, selective switching is performed to transmit either transmission signal 2958 or converted signal 2952, whereby the advantageous effect that data that the user or device desires can be obtained is achievable. Moreover, by transmitting, for example, emergency, unexpected, or necessary information using converted signal 2952, the advantageous effect that it is possible to obtain data that the user or device desired with increased flexibility can be achieved. Moreover, by AC-DC converting the modulated signal generated for PLC use and transmitting the converted signal as a modulated optical signal, it is possible to relay PLC modulated signal with a modulated optical signal using small-scale circuitry (since a PLC modulated signal has the frequency spectrum as described above), which makes it possible to achieve the advantageous effect that data desired by a greater amount of users and devices can be transmitted.

Figure 30:
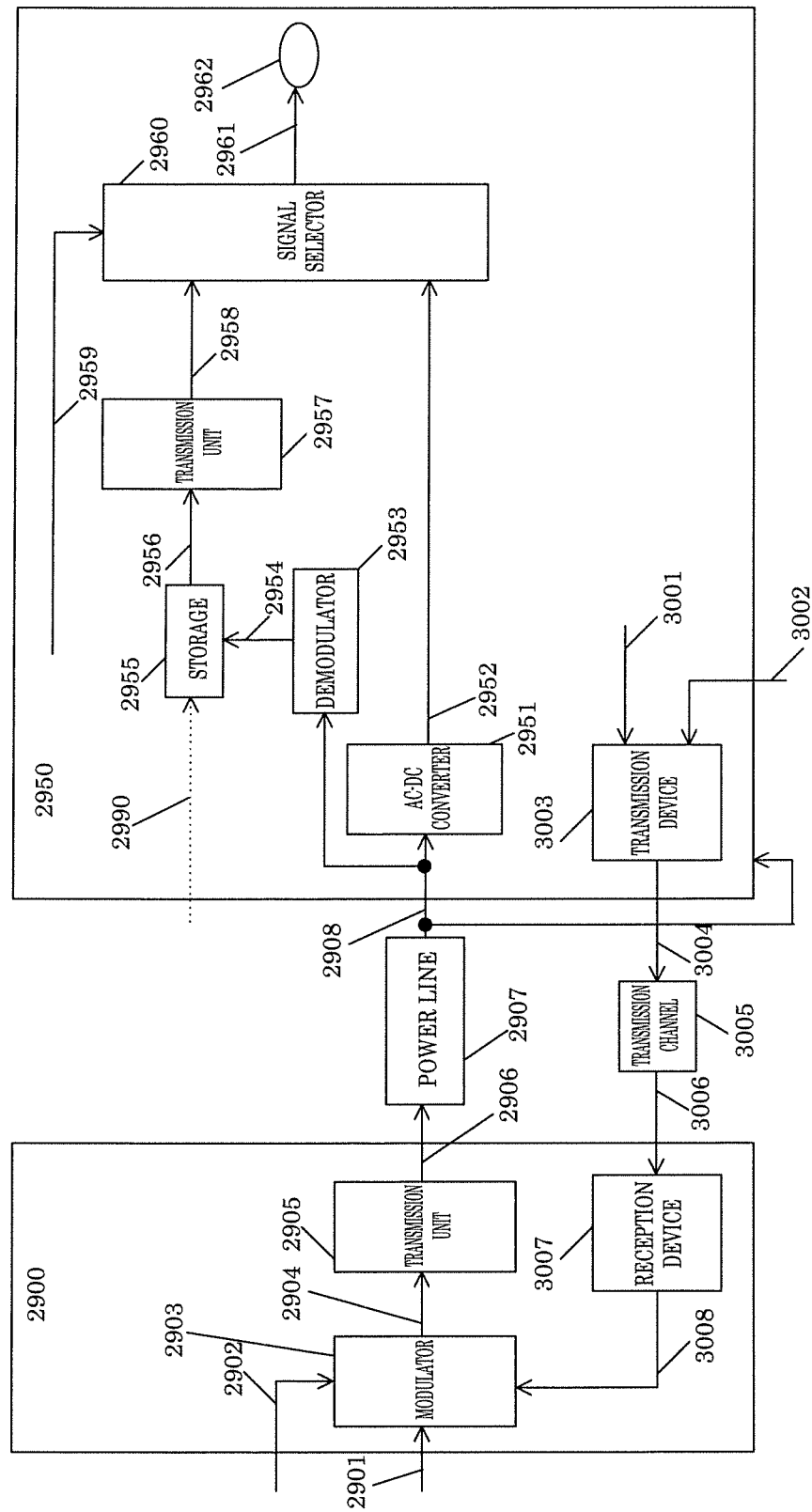
FIG. 30 illustrates one example of a configuration of a device related to modulated optical signal transmission.

FIG. 30 illustrates one example of a configuration of a device related to modulated optical signal transmission according to this embodiment, which differs from the configuration illustrated in FIG. 29. Note that in FIG. 30, objects that operate the same as in FIG. 29 share like reference marks. Accordingly, repeated description thereof will be omitted.

Transmission device 3003 receives inputs of data 3001 and external data 3002, and performs processing such as error correction encoding and modulation to generate and output transmission signal 3004. Note that external data 3002 shall include, for example, instruction information for updating data stored in storage 2955. In other words, communication device 2950 shall transmit, to communication device 2900, a request to update data stored in storage 2955.

Transmission signal 3004 travels over transmission channel 3005, and is input into communication device 2900 as reception signal 3006.

Reception device 3007 receives an input of reception signal 3006, performs processing such as demapping and/or error correction decoding, and outputs reception data 3008.

Modulator 2903 determines whether to transmit updated information in storage 2955 based on information on the request to update data in storage 2955 from communication device 2950 that is included in reception data 3008.

The above operations make it possible for the communication system illustrated in FIG. 30 to achieve the same advantageous effects as those described with reference to FIG. 29.

Hereinafter, one example of operations performed by AC-DC converter 2951 described above will be given.

AC-DC converter 2951 splits reception signal 2980 into an AC power component having an AC power frequency of, for example, 50 Hz or 60 Hz, and a signal component having a frequency higher than the AC power frequency. The splitting of the reception signal 2980 into an AC power component and a signal component can be accomplished using, for example, a frequency filter such as a high-pass filter, low-pass filter, or bandpass filter, or any combination thereof.

AC-DC converter 2951 generates a DC power component by implementing, on the split AC power component, an AC-DC conversion that converts the AC power component into a DC power component. AC-DC converter 2951 generates converted signal 2952 by superimposing the split signal component onto the DC power component. Here, the process for superimposing the signal component onto the DC power component is performed by, for example, coupling the signal component to the power line that supplies the DC power component via, for example, a coupling transformer.

Note that the DC power component onto which the signal component is superimposed need not be obtained by converting the AC power component into the DC power component; the signal component may be superimposed on a DC power component generated using a different configuration that is included in communication device 2950 and not illustrated in the drawings. Moreover, converted signal 2952 may be a signal that includes a signal component that does not include the DC power component.

Moreover, AC-DC converter 2951 may perform processing such as amplification using an amplifier on the split signal component. With this configuration, the strength (or amplitude) of the signal component included in the modulated optical signal transmitted from light source 2962 can be controlled, so there is a possibility that reception quality of the modulated optical signal will improve.

Note that in the description that refers to FIG. 29 and FIG. 30, the PLC communication device 2900 is exemplified as superimposing a PLC signal onto power line 2907 that supplies AC power, but communication device 2900 may superimpose the PLC signal onto power line 2907 that supplies DC power. Such a configuration makes it possible to simplify the configuration of communication device 2950 since communication device 2950 can, without including AC-DC converter, supply the signal component, i.e., the DC power superimposed with the PLC signal to signal selector 2960 and light source 2962 as converted signal 2952.

Note that in the above description, it is described that the PLC transmission signal has a frequency spectrum from direct current (DC) to N [Hz], but the spectrum is not limited to being present in all frequencies. Hereinafter, one example of such a PLC transmission signal will be described.

For example, the PLC signal may be a signal for communication using frequencies from 10 kHz to 450 kHz, known as low-speed PLC, and may be a signal for communication using frequencies from 2 MHz to 30 MHz or from 2 MHz to 80 MHz, known as high-speed PLC. Moreover, in part of the frequency band used for communication, only power lower than other frequencies may be output, or a notch band, which is a frequency band that is not used for communication, may be provided. When a PLC signal having a notch band is transmitted as the modulated optical signal, an optical signal intensity-modulated with a modulated signal in which the components corresponding to the notch band are suppressed is transmitted. Note that methods that can be used to provide a notch band in the PLC transmission signal include a method of controlling the notch band signal component using a frequency filter such as a band elimination filter, or a method of generating a modulated signal that does not include a notch band sub carrier using a Wavelet-OFDM multi-carrier scheme having deep filter characteristics.

Note that in the above description, PLC communication using a power line is exemplified as the transmission path, but a cable other than a power line, such as a coaxial cable, twisted pair cable, or telephone line, may be used as the transmission path.

Embodiment 9

In this embodiment, one example of configurations of the transmission device and the reception device described in the present specification will be described. Note that a characterizing feature of the transmission device in this embodiment is the transmission of a plurality of modulated optical signals.

Figure 31:
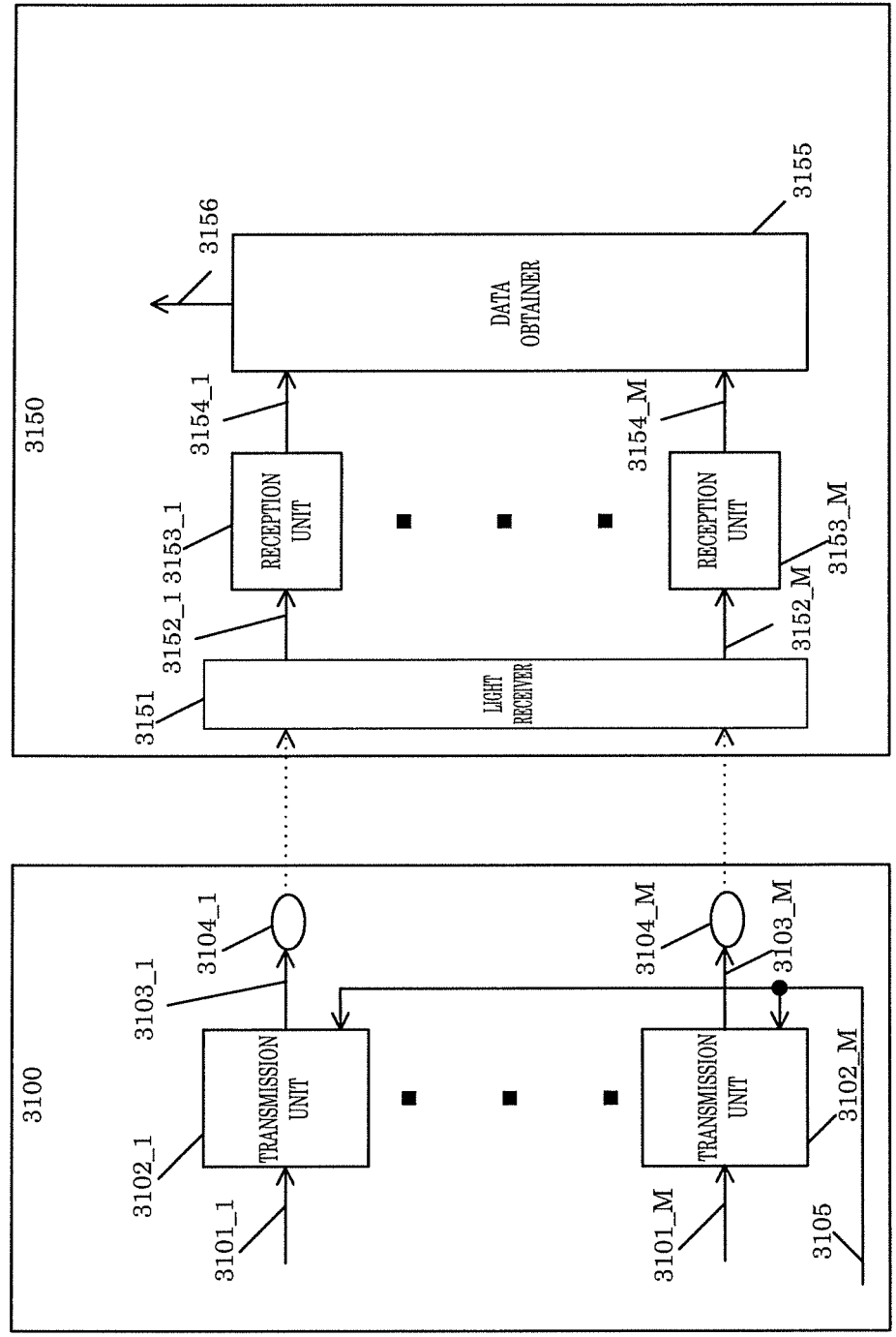
FIG. 31 illustrates a configuration example of a transmission device and a reception device.

FIG. 31 illustrates an example of configurations of the transmission device and the reception device according to this embodiment. In FIG. 31, transmission device 3100 transmits a plurality of modulated optical signals, and reception device 3150 receives a plurality of modulated optical signals to obtain reception data.

The transmission device illustrated in FIG. 31 transmits M modulated optical signals. Note that M is an integer that is greater than or equal to 2.

Transmission unit $3102\_i$ receives inputs of data $3101\_i$ and control signal 3105, and based on information related to the error correction encoding method and information related to the transmission method included in control signal 3105, implements signal processing based on the error correction encoding and transmission method to generate and output modulated optical signal $3103\_i$. Note that i is an integer that is greater than or equal to 1 and less than or equal to M.

Modulated optical signal $3103\_i$ is transmitted from light source $3104\_i$.

Light receiver 3151, one example of which is an image sensor, receives light corresponding to modulated optical signal $3103\_i$. Here, light receiver 3151 receives light corresponding to the M modulated optical signal.

Light receiver 3151 outputs optical reception signal $3152\_i$ corresponding to modulated optical signal $3103\_i$. Note that i is an integer greater than or equal to 1 and less than or equal to M.

Reception unit $3153\_i$ receives an input of optical reception signal $3152\_i$ corresponding to modulated optical signal $3103\_i$, performs processing such as demodulation and error correction decoding, and outputs reception data $3154\_i$ corresponding to data $3101\_i$.

Data obtainer 3155 receives inputs of data $3154\_1$, data $3154\_2$, ..., and data $3154\_M$, and generates and outputs data 3156.

Figure 32:
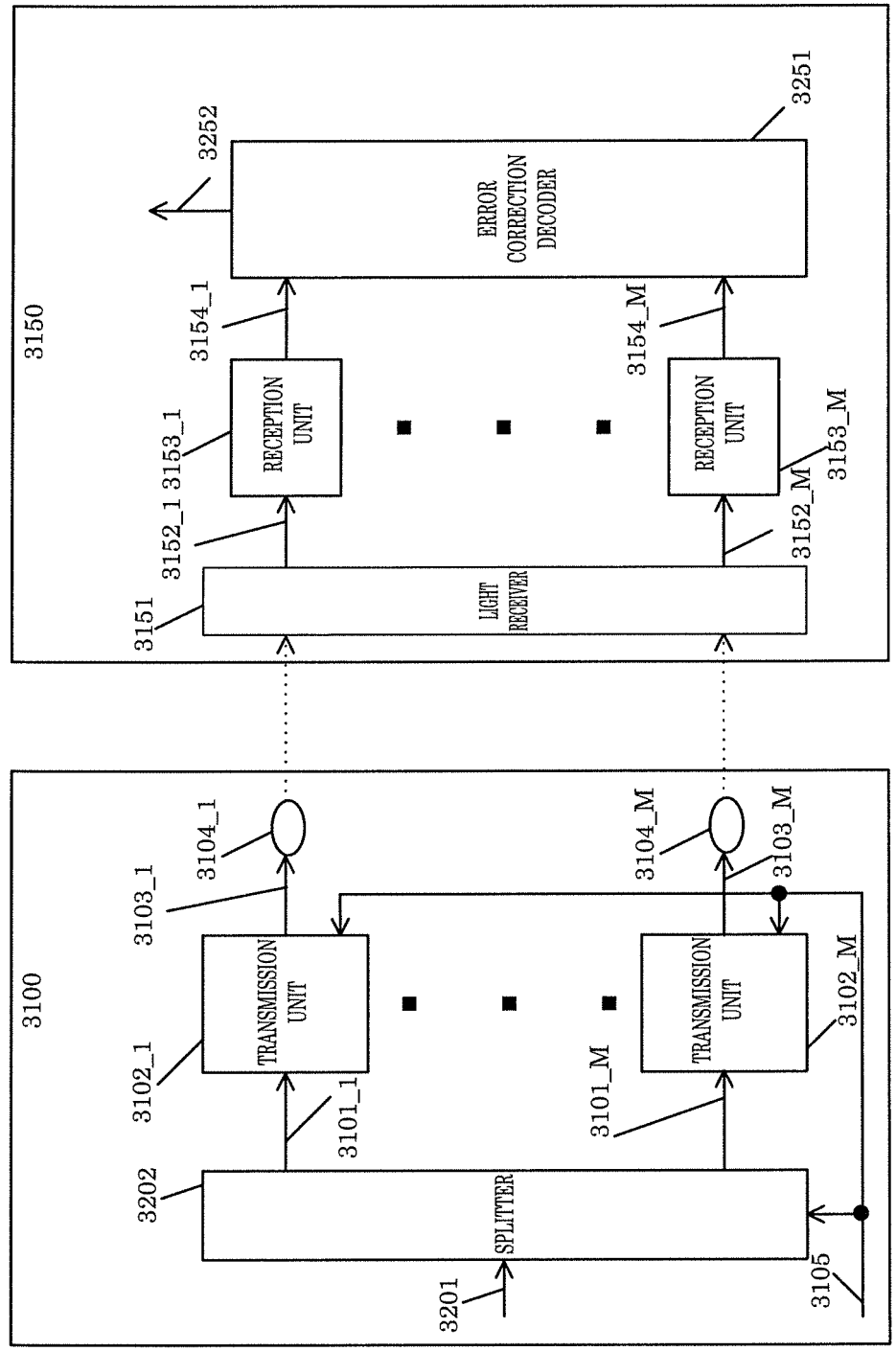
FIG. 32 illustrates a configuration example of a transmission device and a reception device.

FIG. 32 illustrates an example of configurations of the transmission device and the reception device according to this embodiment, which differ from FIG. 31. Note that in FIG. 32, configurations that operate in the same manner as FIG. 31 share like reference signs.

Splitter 3202 receives inputs of information 3201 and control signal 3105, and based on information related to the error correction encoding method included in control signal 3105, performs error correction encoding on information 3201 to generate error correction encoded data. Splitter 3202 then splits the error correction encoded data and outputs error correction encoded data $A2001\_i$.

Note that the splitting of the data into M items of error correction encoded data $3101\_i$ may be performed using any method. For example, the error correction encoded data may be split into M items and a data sequence of the split M items of data may be allocated as the M items of error correction encoded data $3101\_i$. Moreover, M data sequences configured of the same data may be generated based on the error correction encoded data, and the data sequences may be allocated as the items of error correction encoded data $3101\_i$. The method of allocating the error correction encoded data $3101\_i$ is not limited to these examples, any method may be used so long as M data sequences are generated from the error correction encoded data, and the data sequences are allocated as the items of error correction encoded data $3101\_i$.

Transmission unit $3102\_i$ receives inputs of data $3101\_i$ and control signal 3105, and based on information related to the transmission method included in control signal 3105, implements signal processing based on the transmission method to generate and output modulated optical signal $3103\_i$. Note that i is an integer greater than or equal to 1 and less than or equal to M.

Modulated optical signal $3103\_i$ is transmitted from light source $3104\_i$.

Light receiver 3151, one example of which is an image sensor, receives light corresponding to modulated optical signal $3103\_i$. Here, light receiver 3151 receives light corresponding to the M modulated optical signal.

Light receiver 3151 outputs optical reception signal $3152\_i$ corresponding to modulated optical signal $3103\_i$. Note that i is an integer greater than or equal to 1 and less than or equal to M.

Reception unit $3153\_i$ receives an input of optical reception signal $3152\_i$ corresponding to modulated optical signal

3103_i, performs processing such as demodulation, and outputs (the log-likelihood ratio of) reception data 3154_i corresponding to data 3101_i.

Error correction decoder 3251 receives inputs of (the log-likelihood ratio of) reception data 3154_1, (the log-likelihood ratio of) reception data 3154_2, . . . , and (the log-likelihood ratio of) reception data 3154_M, performs error correction decoding, and outputs reception data 3252.

Each of the above embodiments in the present specification can be carried out in the same manner using the above-described transmission device and reception device and still achieve the same advantageous effects described in the respective embodiments.

Embodiment 10

In this embodiment, a configuration of a device related to modulated optical signal transmission that is different from the device related to modulated optical signal transmission described in Embodiment 8 with reference to FIG. 29 and FIG. 30 will be described.

Figure 33:
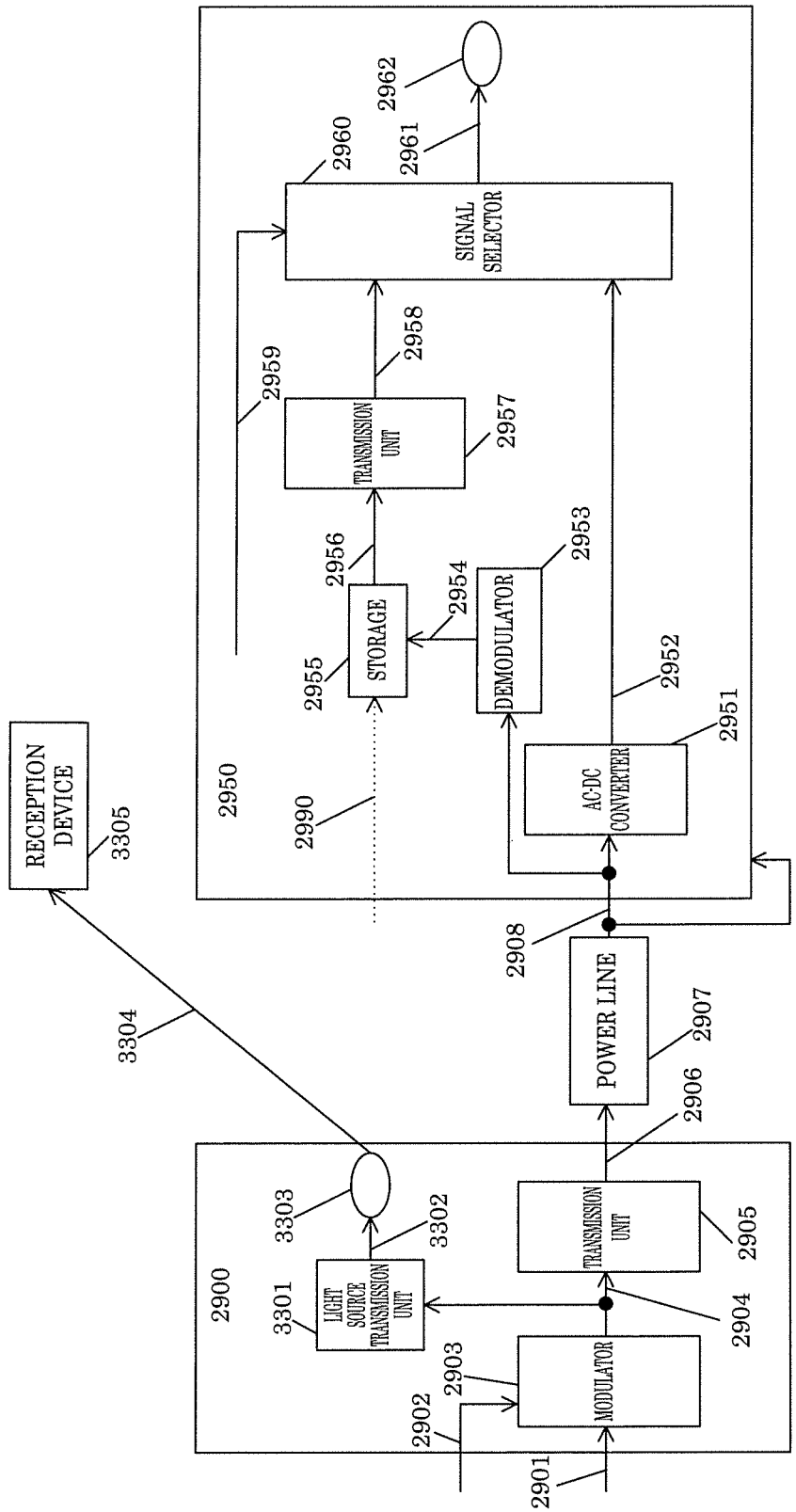
FIG. 33 illustrates one example of a configuration of a device related to modulated optical signal transmission.

FIG. 33 illustrates one example of a configuration of a device related to modulated optical signal transmission that is different from FIG. 29 and FIG. 30. Note that in FIG. 33, objects that operate the same as in FIG. 29 share like reference marks. Accordingly, repeated description thereof will be omitted.

A characterizing feature of FIG. 33 is that communication device 2900 transmits a modulated optical signal.

Light source transmission unit 3301 receives an input of modulated signal 2904, and implements signal processing for the light source, and generates and outputs modulated optical signal 3302. Modulated optical signal 3302 is emitted from light source 3303 as light.

Reception device 3305 receives reception signal 3304 corresponding to the modulated optical signal, and implements processing such as demodulation and error correction decoding to obtain reception data.

With the above configuration, the advantageous effects described in Embodiment 8 can be achieved, and as a result of communication device 2900 receiving the modulated optical signal, it is possible for more communication devices to obtain information.

Figure 34:
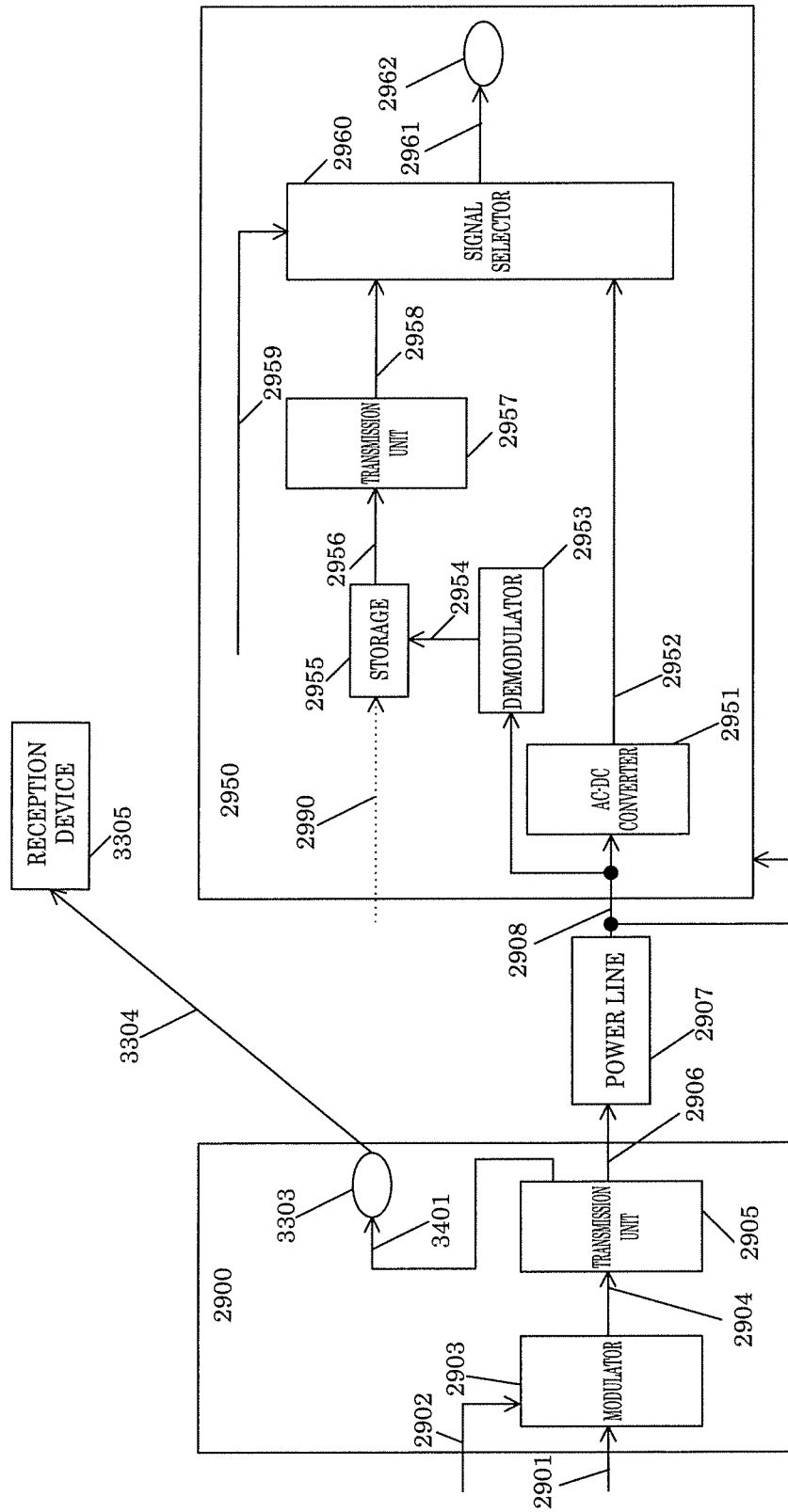
FIG. 34 illustrates one example of a configuration of a device related to modulated optical signals.

FIG. 34 illustrates one example of a configuration of a device related to modulated optical signals that is different from FIG. 29, FIG. 30, and FIG. 33. Note that in FIG. 34, objects that operate the same as in FIG. 29 and FIG. 33 share like reference marks. Accordingly, repeated description thereof will be omitted.

FIG. 34 differs from FIG. 33 in that modulated optical signal 3401 is generated by transmission unit 2905. Accordingly, transmission unit 2905 receives an input of modulated signal 2904, and generates and outputs transmission signal 2906 for PLC and transmission signal 3401 for optical communication (visible light communication). Note that transmission signal 2906 for PLC and transmission signal 3401 for optical communication (visible light communication) are both signals having a frequency spectrum from DC to N [Hz] (N is a real number that is greater than 0). However, the spectrum of the transmission signals are not limited to being present in all frequencies from DC to N [Hz]. Transmission signal 3401 for optical communication (visible light communication) is emitted from light source 3303 as light.

With the above configuration, the advantageous effects described in Embodiment 8 can be achieved, and as a result of communication device 2900 receiving the modulated optical signal, it is possible for more communication devices to obtain information.

Figure 35:
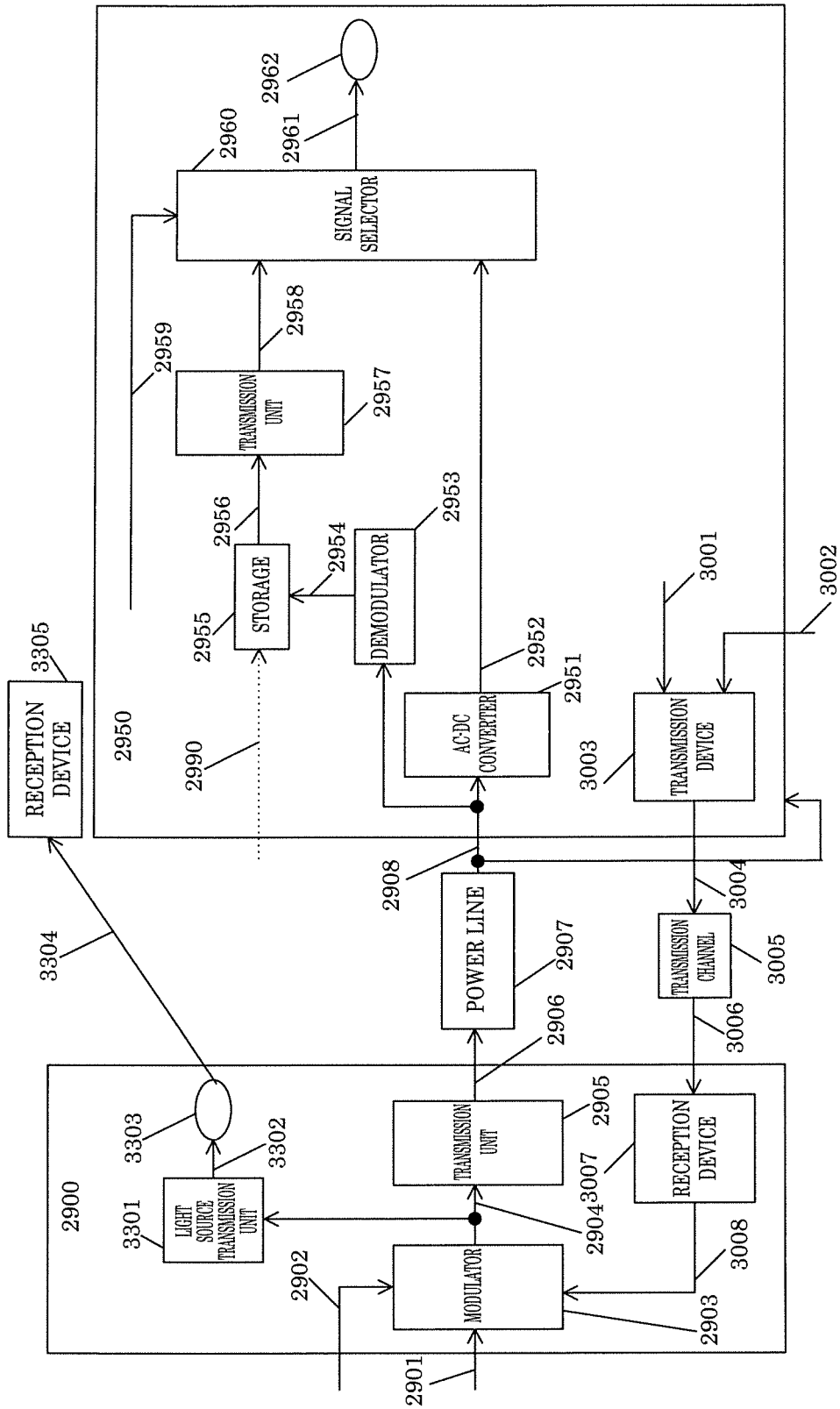
FIG. 35 illustrates one example of a configuration of a transmission device related to modulated optical signals.

FIG. 35 illustrates one example of a configuration of a transmission device related to modulated optical signals that is different from FIG. 29, FIG. 30, and FIG. 33. Note that in FIG. 35, objects that operate the same as in FIG. 29, FIG. 30, and FIG. 33 share like reference marks. Accordingly, repeated description thereof will be omitted. Note that since the components in FIG. 35 have already been described, repeated description thereof will be omitted.

With the above configuration, the advantageous effects described in Embodiment 8 can be achieved, and as a result of communication device 2900 receiving the modulated optical signal, it is possible for more communication devices to obtain information.

Figure 36A:
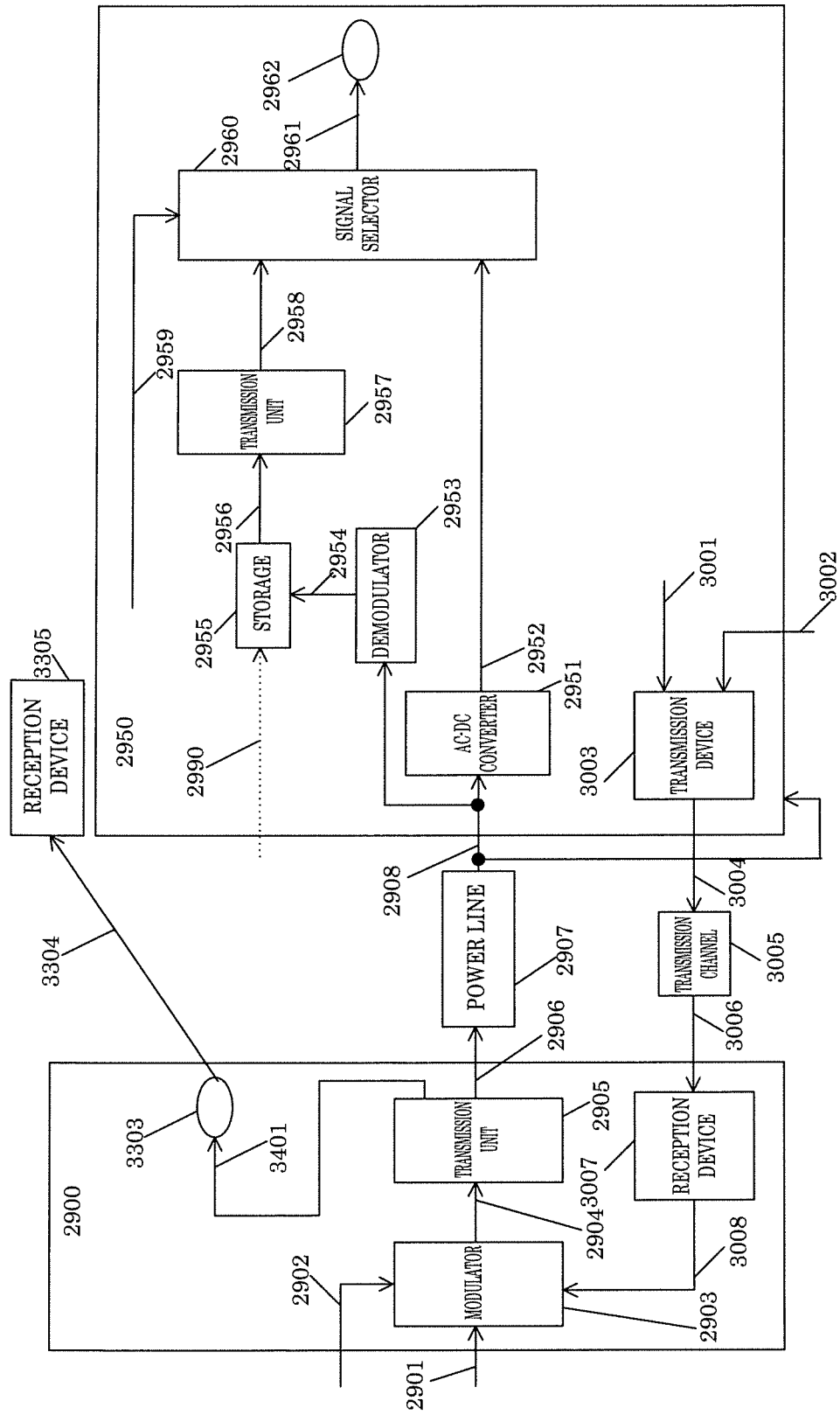
FIG. 36A illustrates one example of a configuration of a transmission device related to modulated optical signals.

FIG. 36A illustrates one example of a configuration of a transmission device related to modulated optical signals that is different from FIG. 29, FIG. 30, FIG. 33, and FIG. 34. Note that in FIG. 36A, objects that operate the same as in FIG. 29, FIG. 30, FIG. 33, and FIG. 34 share like reference marks. Accordingly, repeated description thereof will be omitted. Note that since the components in FIG. 36A have already been described, repeated description thereof will be omitted.

With the above configuration, the advantageous effects described in Embodiment 8 can be achieved, and as a result of communication device 2900 receiving the modulated optical signal, it is possible for more communication devices to obtain information.

Supplemental Information 2

Note that at least one of the field programmable gate array (FPGA) and central processing unit (CPU) may be configured to be able to download all or part of software required for implementing the communication method described in the present disclosure via wireless or wired communication, and moreover may be configured to be able to download all or part of software for receiving updates via wireless or wired communication. The downloaded software may be stored in storage, and the digital signal processing described in the present disclosure may be implemented by operating at least one of the FPGA and CPU based on the stored software.

Here, a device including at least one of the FPGA and CPU may be connected to a telecommunications modem via a wireless or wired connection, and the communication method described in the present disclosure may be implemented by the device and the telecommunications modem.

For example, a communication device, such as the base station, AP, terminal described in the present specification may include at least one of an FPGA and a CPU, and may include an interface for obtaining software for operating the at least one of an FPGA and a CPU from an external source. Furthermore, the communication device may include storage for storing software obtained from an external source, and may implement the signal processing described in the present disclosure by operating the FPGA and/or CPU based on the stored software.

The transmission device described in the present specification may be included in a first automobile or vehicle, and the reception device described in the present specification may be included in a second automobile or vehicle, and the transmission and receiving of data may be implemented under such a configuration.

The transmission device or part of the functions of the transmission device described in the present specification may be connected to the first automobile or vehicle via an interface, and the reception device or part of the functions of the reception device described in the present specification may be connected to the second automobile or vehicle via an interface, and the transmission of data may be implemented via transmission and reception thereby.

The transmission device described in the present specification may be included in a first automobile or vehicle, and the transmission and receiving of data between this transmission device and the reception device described in the present specification may be implemented under such a configuration.

The reception device described in the present specification may be included in a second automobile or vehicle, and the transmission and receiving of data between this reception device and the transmission device described in the present specification may be implemented under such a configuration.

Furthermore, the transmission device or part of the functions of the transmission device described in the present specification may be connected to the first automobile or vehicle via an interface, and the transmission and receiving of data between this string of transmission devices and the reception device described in the present specification may be implemented under such a configuration.

The reception device or part of the functions of the reception device described in the present specification may be connected to the second automobile or vehicle via an interface, and the transmission and receiving of data between this string of reception devices and the transmission device described in the present specification may be implemented under such a configuration.

When the automobile or vehicle includes the transmission device or part of the transmission device described in the present specification, or when the automobile or vehicle and the transmission device described in the present specification or part of the functions of the transmission device described in the present specification are connected via an interface, the light source included in the transmission device described in the present specification may be a light source included in the automobile or vehicle.

Figure 36B:
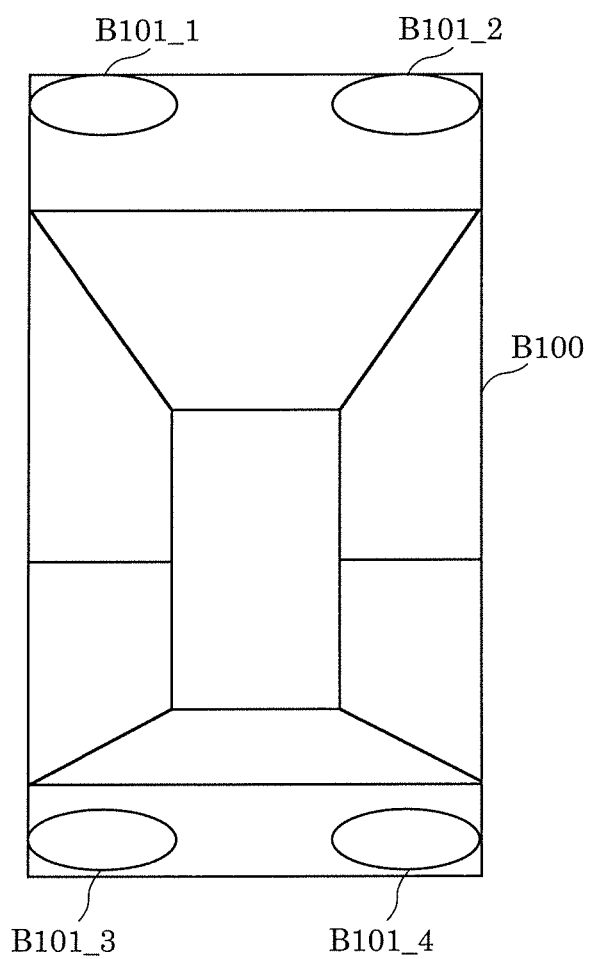
FIG. 36B illustrates one example of a configuration of a vehicle.

For example, automobile B100 illustrated in FIG. 36B includes light sources B101_1, B101_2, B101_3, and B101_4, and one or more of these light sources may be the light source to be used by the transmission device according to the present specification for transmitting the modulated optical signal.

Moreover, the function for selecting which light source among the plurality of light sources included in automobile B100 the transmission device according to the present specification uses for transmitting the modulated optical signal may be included in the transmission device or a device connected to the transmission device. Moreover, the brightness of the light source, the angle of emission of the light source, the positioning of the light source may be configurable.

When the automobile or vehicle includes the reception device or part of the reception device described in the present specification, or when the automobile or vehicle and the reception device described in the present specification or part of the functions of the reception device described in the present specification are connected via an interface, the light receiver included in the reception device described in the present specification may be a light receiver included in the automobile or vehicle (for example, an image sensor or photodiode).

Figure 36C:
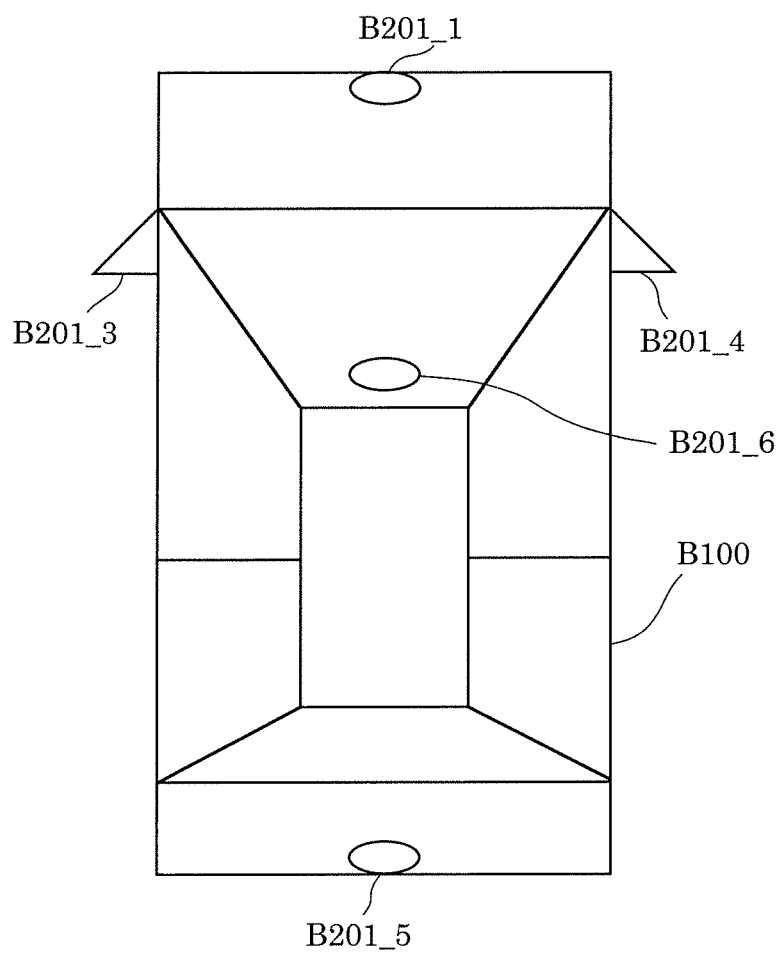
FIG. 36C illustrates one example of a configuration of a vehicle.

For example, automobile B100 illustrated in FIG. 36C includes light receivers B201_1, B201_2, B201_3, B201_4, B201_5, and B201_6, and one or more of these light receivers may be the light receiver to be used by the reception device according to the present specification for receiving the modulated optical signal.

Moreover, the function for selecting which light receiver among the plurality of light receivers included in automobile B100 the reception device according to the present specification uses for receiving the modulated optical signal may be included in the reception device or a device connected to the reception device. Moreover, the angle of the light receiver and the positioning of the light receiver may be configurable.

Furthermore, the reception device described in the present specification may display, on the front panel included in the automobile or in the cockpit of the vehicle, a notification indicating that data has been received. Moreover, the reception device described in the present specification may notify a user that data has been received by vibrating the steering wheel of, for example, the automobile, or vibrating a vibrator included on the steering wheel.

Moreover, an automobile including the reception device according to the present specification and the terminal may be connected via an interface, and data obtained from the reception device may be stored in storage included in the terminal. Moreover, the automobile may also include a storage, and the automobile may store received data therein. Moreover, the storage included in the terminal and the storage included in the automobile may both store received information.

In the present specification, a server may provide an application related to processes pertaining to the reception device, and the functions of the reception device according to the present specification may be implemented by the terminal installing the application. Note that the application may be provided to the terminal by the communication device including in the transmission device according to the present specification connecting to a server over a network, and may be provided to the terminal by a communication device including a different transmission function connecting to a server over a network.

Similarly, in the present specification, a server may provide an application related to processes pertaining to the transmission device, and the functions of the transmission device according to the present specification may be implemented by the terminal installing the application. Note that a method in which the application is provided to a different communication device by the communication device connecting to a server over a network is conceivable.

Moreover, a server may provide software related to the light source included in the transmission device and the light receiver included in the reception device, and transmission and reception of the modulated optical signal by the light source included in the transmission device and the light receiver included in the reception device, respectively, may be supported by obtaining this software.

Furthermore, the transmission device according to the present specification may function as a server, and an application included in the transmission device may be provided to the communication device using some communication means, and the reception device according to the present specification can be implemented by the application obtained by the communication device downloading the application.

Note that in the present specification, there is reference to a "lamp" and a "light source", but the method may be a method of a projector displaying, for example, a still picture, moving picture, or advertisement, and the modulated optical signal being included in that light. In other words, the "lamp" and a "light source" may include functions other than the emission of light. Moreover, the "lamp" and a "light source" may comprise a plurality of lamps and light sources.

Furthermore, the transmission method used by the communication device that generates a modulated optical signal and emits light may be a method other than the transmission method described in the present specification. Moreover, the modulated optical signal may include information other than what is described in the present specification.

Moreover, the lamp and/or light source, such as an LED lamp and/or light source, may itself include the functions of the transmission device described in the present specification.

Furthermore, the device that generates the optical transmission modulated signal may not include a lamp or light source, and may be connected to a lamp and/or light source via an interface.

Figure 36D:
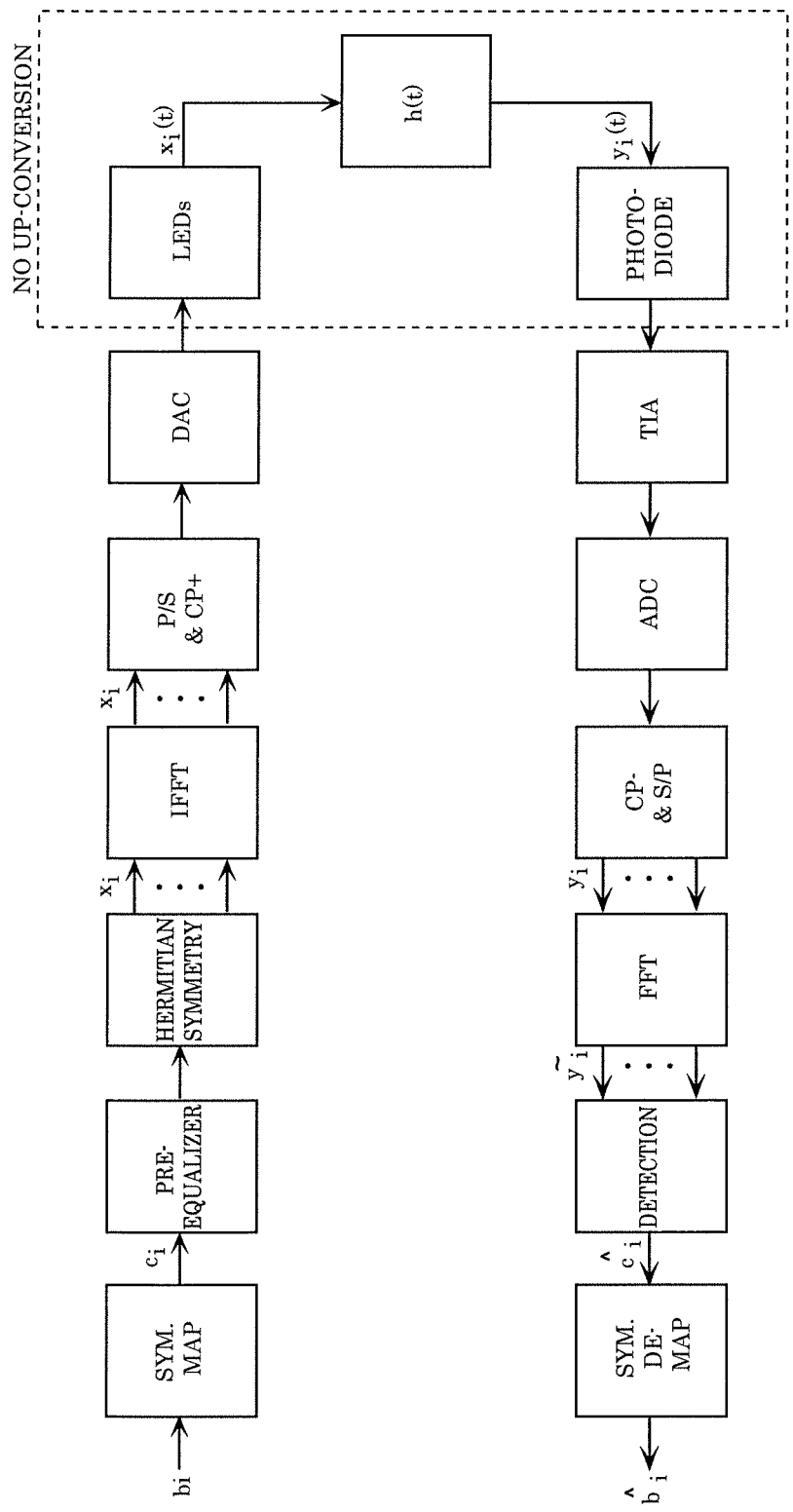
FIG. 36D illustrates one example of a communication method used by a transmission device and a reception device.

The communication method between the transmission device and the reception device described in the present embodiment may be the communication method illustrated in FIG. 36D. Hereinafter, FIG. 36D will be described.

The symbol mapper receives an input of transmission data, performs mapping based on a modulation scheme, and outputs a symbol sequence (ci).

The pre-equalizer receives an input of the symbol sequence, performs pre-equalizing processing on the symbol sequence to reduce the equalizing processes on the reception-side, and outputs a pre-equalized symbol sequence.

The Hermitian symmetry processor receives an input of the pre-equalized symbol sequence, allocates sub-carriers to the pre-equalized symbol sequence to secure Hermitian symmetry, and outputs parallel signals.

The inverse (fast) Fourier transformer receives inputs of the parallel signals, applies an inverse (fast) Fourier transform to the parallel signals, and outputs inverse (fast) Fourier transformed signals.

The parallel serial and cyclic prefix adder receives an input of the inverse (fast) Fourier transformed signals, performs parallel conversion and adds cyclic prefix, and outputs the signal-processed signal.

The digital-to-analog converter receives an input of the signal-processed signal, performs digital-to-analog conversion, outputs an analog signal, and the analog signal is emitted as light from, for example, one or more LEDs.

Note that the pre-equalizer and the Hermitian symmetry processor need not be included. In other words, there may be instances in which the pre-equalizer and the Hermitian symmetry processor do not perform their respective processes.

The photodiode receives an input of light, and obtains a reception signal via a transimpedance amplifier (TIA).

The analog-to-digital converter performs an analog-to-digital conversion on the reception signal, and outputs a digital signal.

The cyclic prefix subtractor and serial parallel converter receives an input of the digital signal, subtracts the cyclic prefix, and then performs serial parallel conversion, and receives an input of parallel signals.

The (fast) Fourier transformer receives inputs of the parallel signals, applies a (fast) Fourier transform to the parallel signals, and outputs (fast) Fourier transformed signals.

The detector receives inputs of the (fast) Fourier transformed signals, performs detection, and outputs a series of reception symbols.

The symbol demapper receives an input of the series of reception symbols, performs demapping, and obtains a series of reception data.

In this way, even when such a transmission device that transmits the modulated optical signals and such a reception device that receives the modulated optical signals are applied to the amendments according to the present specification, the embodiments can be implemented in the same manner.

Moreover, the communication method between the transmission device and the reception device described in the present embodiment may be the following communication method.

Line Scan Sampling

An image sensor such as a complementary metal oxide semiconductor (CMOS) sensor is included in a smartphone or digital camera or the like. For example, the entire scene in a single image captured by the CMOS sensor is not captured at a single instant, but rather, for example, captured line by line using a rolling shutter method, whereby the sensor reads out the amount of light received line by line. Accordingly, the amount of time required for the reading out is calculated, and exposure start and end times are controlled for each line by implementing a time delay. In other words, images captured by the CMOS sensor are constructed from a plurality of lines captured with a slight time lag between each line.

This exploits the rolling shutter scheme of the CMOS sensor to allow for an improvement in visible light signal reception speeds.

Figure 36E:
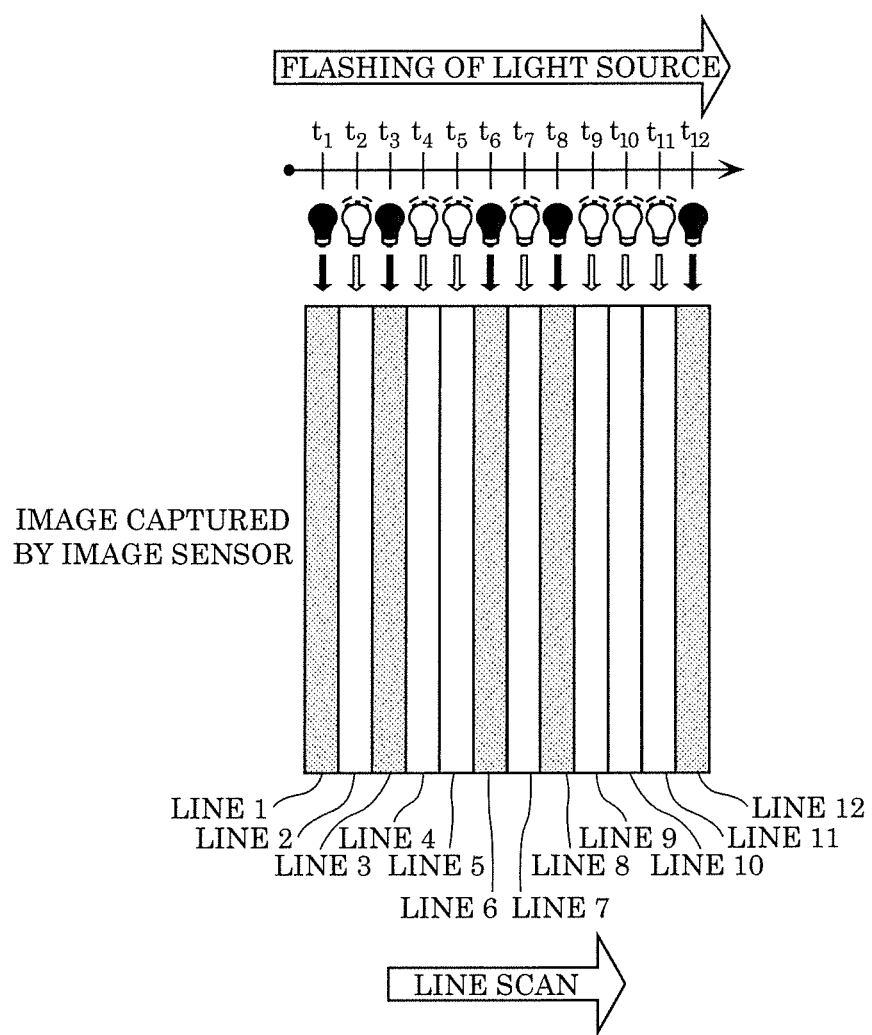
FIG. 36E illustrates one example of a visible light communication method.

In other words, in a first example of a visible light communication scheme, as illustrated in FIG. 36E, utilizing the slight time lag between the exposure period of each line, the luminance and color of the light source across a plurality of points in time can be calculated line by line from a single image (image captured by the image sensor), making it possible to capture a signal modified faster than the frame rate of the image sensor.

This sampling method is referred to as "line scan sampling", and a single row of pixels exposed at the same time is referred to as an "exposure line".

Note that line scan sampling can be implemented using the rolling shutter scheme of a CMOS sensor, but even when the rolling shutter scheme is implemented using a sensor other than a CMOS sensor, such as a charge-coupled device (CCD) sensor or an organic CMOS sensor, the line scan sampling can be implemented in the same manner.

Figure 36F:
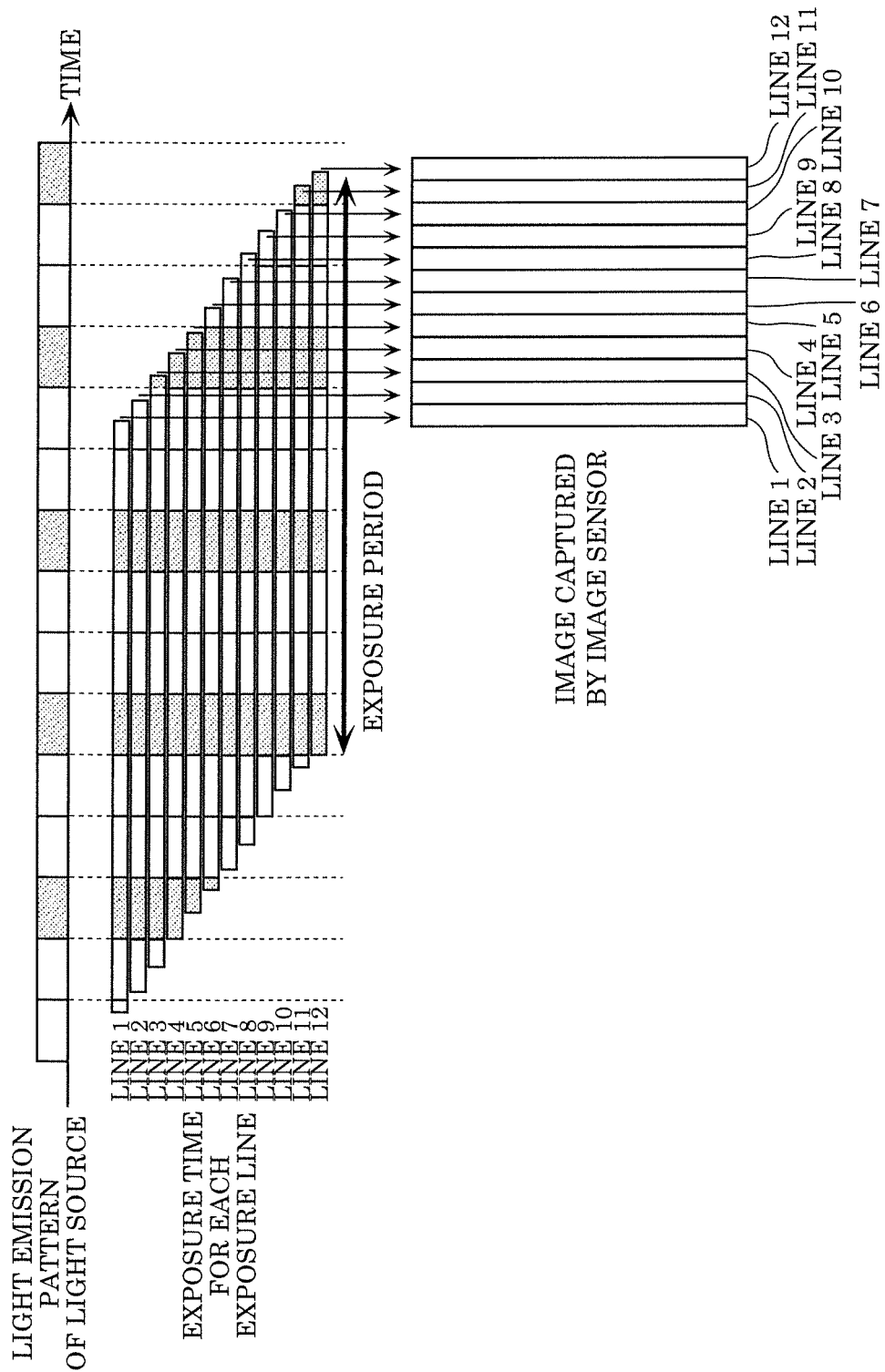
FIG. 36F illustrates an example of a light-emission pattern of a light source and a captured image.

However, in the settings used when capturing an image in the camera functions (capturing functions for moving or still images), even if a rapidly flashing light source is captured, the flashing will not appear as a striped pattern extending along the exposure lines. This is because, with this setting, the exposure period is sufficiently longer than the flash cycle of the light source, so, as illustrated in FIG. 36F, the changes in luminance resulting from the flashing (light emission pattern) of the light source are uniform, resulting in a substantially small variation in pixel values between exposure lines, producing an approximately uniform image.

In contrast, as illustrated in FIG. 36G, by setting the exposure period equal to or slower than the flash cycle of the light source, the state (light emission pattern) of the flashing of the light source can be observed as variations in luminance between exposure lines.

For example, the exposure lines are designed to extend parallel lengthwise relative to the image sensor. In such cases, as one example, assuming the frame rate is 30 frames per second (fps), when the resolution is 1920×1080, at least 32400 samples are obtained per second, and when the resolution is 3840×2160, at least 64800 samples are obtained per second.

Line Scan Sampling Application Example

Note that the above described line scan sampling in which a signal indicating an amount of light received per line is read out, but methods of sampling an optical signal using an image sensor such as a CMOS sensor are not limited to this example. A variety of methods that can obtain a sampled signal at a sampling rate that is higher than the frame rate used to capture a normal moving picture, can be used as the sampling method to be used to receive the optical signals. For example, a method of controlling the exposure time per pixel and reading out a signal or a method of controlling the exposure time per group of pixels arranged in a shape other than a line and reading out a signal may be used by utilizing a global shutter method that has a shutter function for each pixel. Moreover, a method of reading out signals a plurality of times from the same pixel in a period equivalent to one frame in the frame rate used in the capture of a normal moving picture may be used.

Frame Sampling

Furthermore, with a frame rate method that gives a shutter method for each non-pixel, it is possible to sample optical signals even in a method by which the frame rate is sped up.

For example, the present specification can be implemented in any of the line scan sampling, line scan sampling application example, and frame sampling methods described above.

Light Source And Modulation Scheme

With visible light communication, for example, a light emitting diode (LED) can be used as a transmitter. LEDs are commonly used in lamps and in backlit light sources in displays, and can flash at high speeds.

However, light sources that are used as visible light communication transmitters cannot be allowed to flash uncontrolled when performing visible light communication. If the changes in luminance made for visible light communication are recognizable to the human eye, the original functionality of a light source as a lamp will be lost. Accordingly, the transmission signal needs to be emitted at a desired brightness and needs to be imperceptible to the human eye.

Figure 36H:
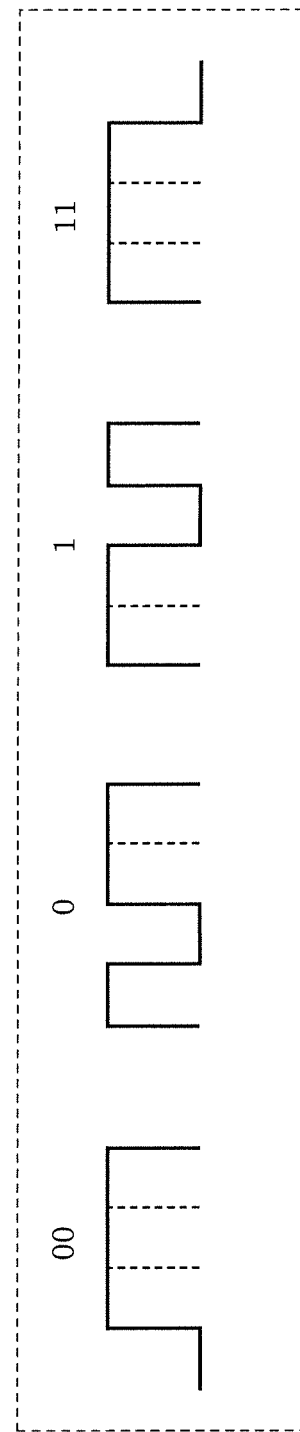
FIG. 36H illustrates one example of a modulation scheme.

One modulation scheme that meets these requirements is 4-pulse position modulation (4PPM). As illustrated in FIG. 36H, 4 PPM is a scheme in which two bits are represented by a group of four time slots each indicating either bright or dark light emitted by a light source. Moreover, as illustrated in FIG. 36H, in 4 PPM, each group of the four time slots includes three light slots and one dark slot. Accordingly, regardless of the content of the signal, the average brightness (average luminance) is ¾=75%.

Figure 36I:
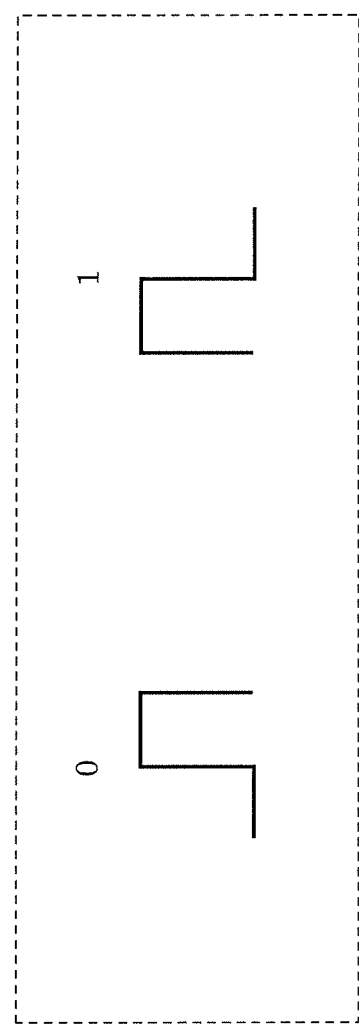
FIG. 36I illustrates one example of a modulation scheme.

For comparison, as a similar scheme, consider the Manchester coding scheme illustrated in FIG. 36I. In the Manchester coding scheme, one bit is expressed with two states, and the modulation efficiency is 50%, which is the same as 4PPM, but among the two states, one is bright and one is dark, so the average luminance is ½=50%. In other words, 4 PPM is more suitable than the Manchester coding scheme as a visible light communication scheme. However, since communication capability is not adversely affected by changes in luminance from visible light communication that are recognizable to the human eye, depending on the application, there may be no problem in using a method in which the changes in luminance are recognizable to the human eye. Accordingly, the transmitter (light source) may use, for example, an amplitude shift keying (ASK) method, a phase shift keying (PSK) method, or a pulse amplitude modulation (PAM) method to generate the modulated signal and pulse the light source to emit light.

Note that the communication method between the transmission device and the reception device described in the present specification is not limited to the above example. Even frequency-based wireless communication methods such as optical, visible light, infrared, ultraviolet methods can be implemented in the same manner.

In the present specification, a symbol related to location or position information, a symbol related to time information, a symbol related to an SSID, a symbol related to an access destination, and a symbol related to an encryption key are described using the terminology "symbol", but these may be referred to as "data" or "information" or "field" or "bit" or "region" instead of "symbol", and the embodiments can be implemented in the same manner. They may be referred to as something other than "data" or "information" or "field" or "bit" or "region" as well. Moreover, the transmission device may transmit any type of symbol configuration, such as a symbol related to location or position information, a symbol related to time information, a symbol related to an SSID, a symbol related to an access destination, and a symbol related to an encryption key. What is important is that data related to location or position information, data related to time information, data related to an SSID, data related to an access destination, data related to an encryption key is transmitted to the communication partner.

In the present specification, in the transmission device that includes, for example, a light source and/or lamp, the light source may be comprised of a plurality of light sources, and/or the lamp may be comprised of a plurality of lamps.

Embodiment A1

In this embodiment, a reception method and reception system for modulated optical signals will be described.

Figure 37:
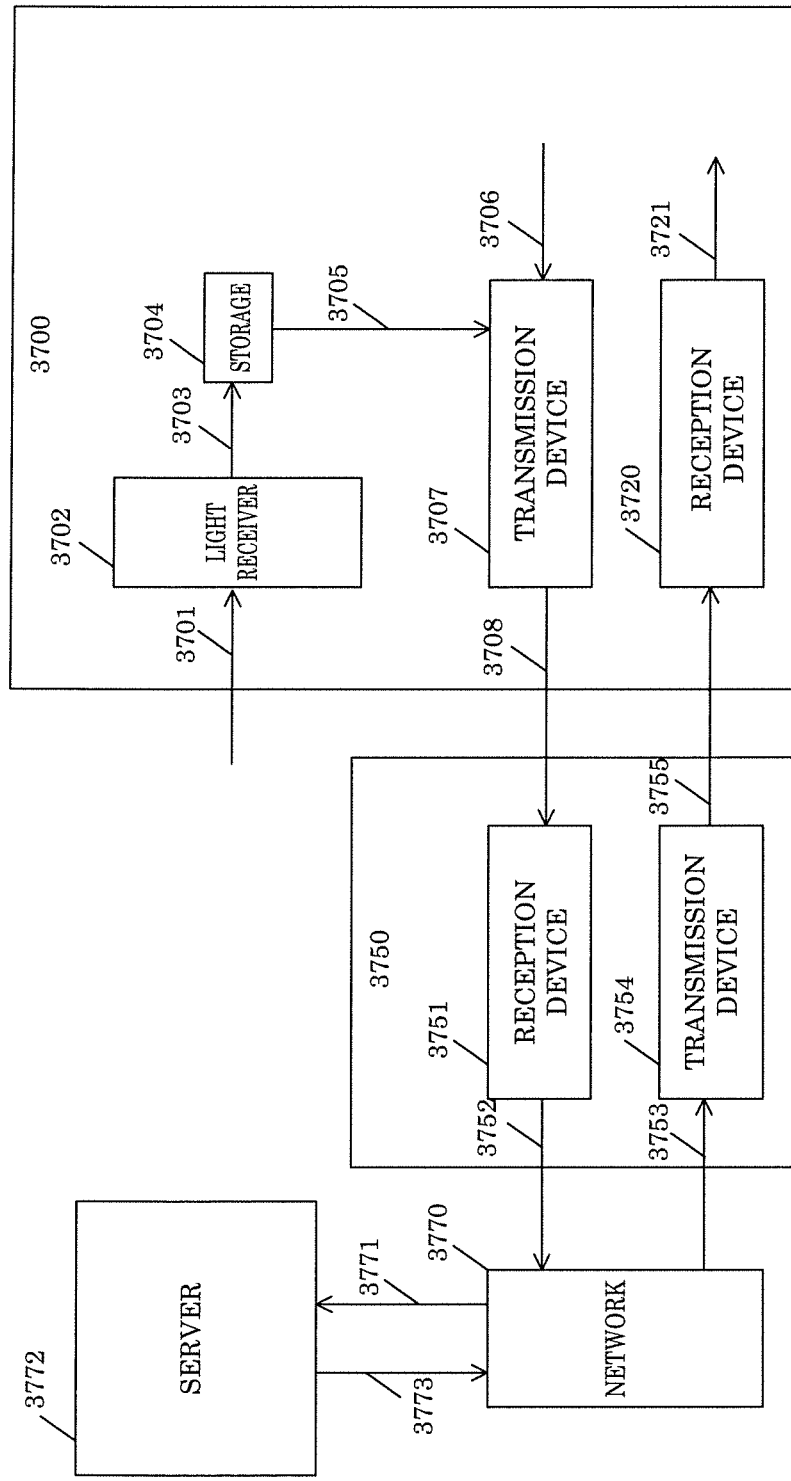
FIG. 37 illustrates a system of communication devices.

FIG. 37 illustrates a system including a communication device according to this embodiment.

Communication device 3700 (for example, a terminal) is a device that receives modulated optical signals. Light receiver 3702 receives an input of modulated optical signal 3701, and outputs reception signal 3704.

Storage 3704 receives an input of, and stores, reception signal 3703. Storage 3704 outputs stored data as stored data 3705.

Transmission device 3707 receives inputs of data 3706 and stored data 3705, performs processing such as error correction encoding and modulation, and outputs modulated signal 3708.

Reception device 3701 in communication device 3750 (for example, a base station or access point (AP)) receives an input of modulated signal 3708 transmitted by communication device 3700. Reception device 3701 performs processing such as demodulation and error correction decoding, and outputs reception data 3752.

Reception data 3752 is received as data 3771 by server 3772 via network 3770.

Server 3772 receives an input of data 3771, performs, for example, and demodulation and error correction decoding on modulated optical signal 3701 to receive and output data 3773 included in modulated optical signal 3701.

Data 3773 is input into transmission device 3754 as data 3753 via network 3770. Transmission device 3754 included in communication device 3750 receives an input of data 3753, performs processing such as error correction encoding and modulation, and outputs modulated signal 3755.

Reception device 3720 included in communication device 3700 receives an input of modulated signal 3755, and performs processing such as demodulation and error correction decoding to obtain and output reception data 3721. Here, reception data 3721 is data included in modulated optical signal 3701.

Description of the above operations in FIG. 37 will be described in greater detail with reference to FIG. 38.

Figure 38:
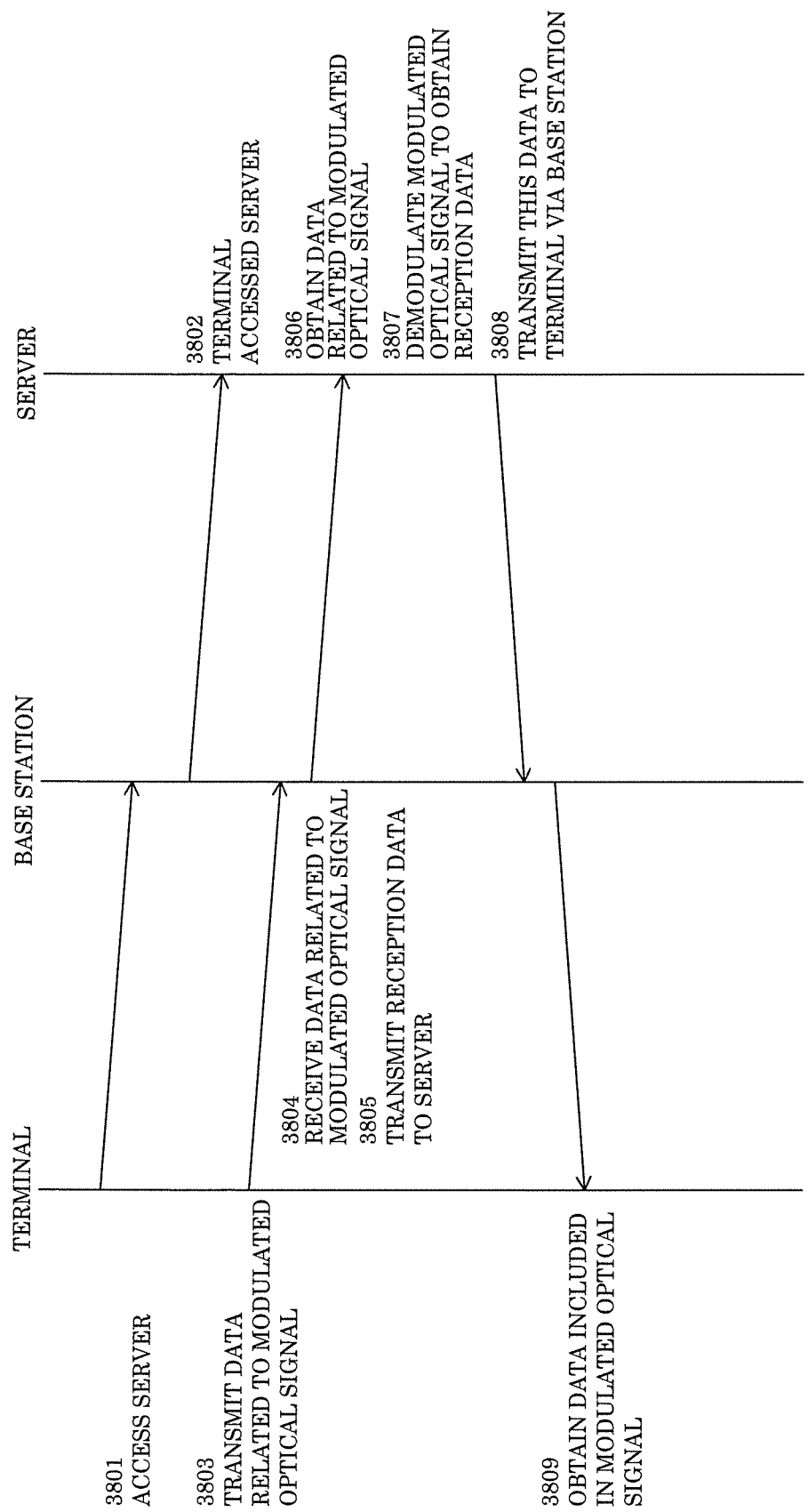
FIG. 38 is a flow chart of one example of processes performed by a terminal, a base station, and a server.

In FIG. 38, "terminal" corresponds to communication device 3700 in FIG. 37, "base station" corresponds to communication device 3750 in FIG. 37, and "server" corresponds to sever 3772 in FIG. 37.

First, the terminal accesses the server via a base station (3801). Then, the server confirms that the terminal as has accessed it (3802).

The terminal then receives a modulated optical signal. The terminal then creates data related to a modulated optical signal for transmission to the server. However, this data is not the data that is included in the modulated optical signal.

Here, in order to be subsequently transmitted the server, the terminal transmits, to the base station, the data related to a modulated optical signal (3803).

The base station receives the data related to a modulated optical signal transmitted by the terminal (3804). The base station then transmits this reception data to the server.

Then, the server obtains the data related to a modulated optical signal transmitted by the base station (3806). Then, from the data related to a modulated optical signal, the server performs processing such as demodulation and error correction decoding on the modulated optical signal to obtain data included in the modulated optical signal (3807). The server then transmits, to the base station, the data included in the modulated optical signal, that is to say, the data obtained from the processing such as the demodulation, and the base station transmits this data to the terminal (3808).

With this, the terminal obtains the reception data in the modulated optical signal.

With this, the light receiver, one example of which is an image sensor, and the terminal having a communication function for connecting with the server can obtain the reception data in the modulated optical signal without needed to include therein another signal processor. Stated differently, the advantageous effect can be achieved whereby the reception data in the modulated optical signal can be received even though the scale of the circuitry in and the scale of computation performed by the terminal is reduced.

Note that in this embodiment, the devices are referred to as a "terminal", a "base station", and a "server", but these devices may be referred to by other names; the system may be configured of devices that include communication functions. Moreover, the reception method of the modulated optical signal described in this embodiment can be applied as the reception method for the modulated optical signal described in the present specification.

Embodiment A2

In this embodiment, a video provision method that uses modulated optical signals will be described.

Figure 39A:
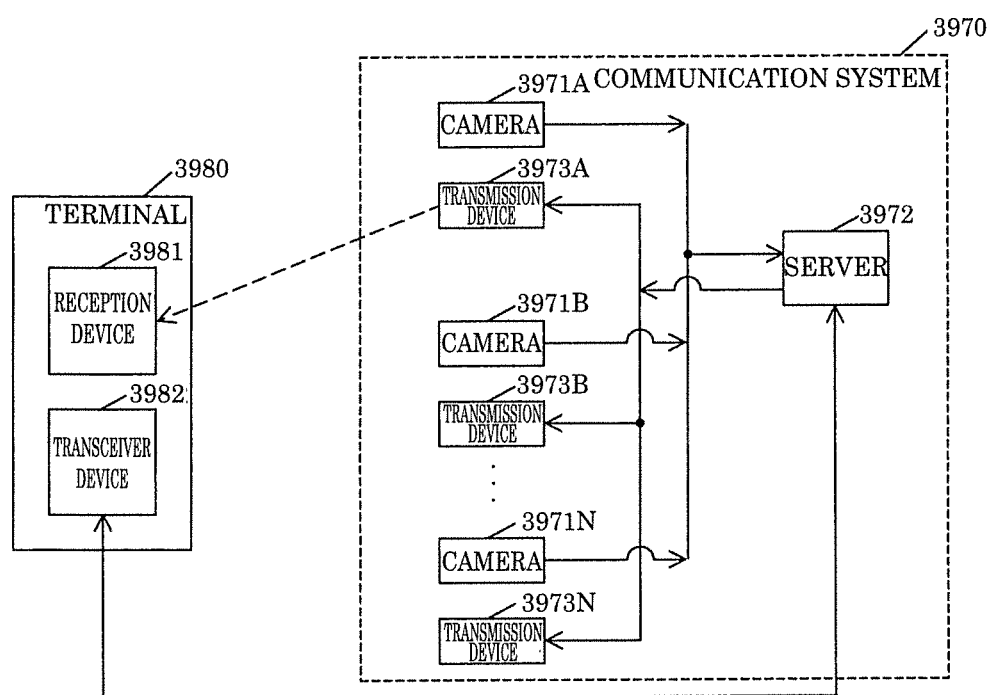
FIG. 39A illustrates a first example of a system related to a video provision method that uses modulated optical signals.

FIG. 39A illustrates a first example of a system related to a video provision method that uses modulated optical signals according to this embodiment.

As illustrated in FIG. 39A, the system includes communication system 3970 and terminal 3980. Communication system 3970 includes: a plurality of cameras 3971A, 3971B, . . . , and 3971N; server 3972; and a plurality of transmission devices 3973A, 3973B, . . . , and 3973N.

The plurality of cameras 3971A, etc., generate image data via capturing.

Server 3972 stores image data generated by the plurality of cameras 3971A, etc.

The plurality of transmission devices 3973A, etc., are provided in one-to-one correspondence with the plurality of cameras 3971A, etc., and each of the plurality of transmission devices 3973A, etc., transmits light including, as a visible light communication signal, information related to communication for access to a storage location at which the image data generated by the camera corresponding to the transmission device is stored in the server.

For example, the information may include address information indicating the storage location of the stored image data. The address information is, for example, a URL. For example, the address information can be included in a frame of the modulated optical signal as a symbol including access-related information.

For example, the information may include an encryption key used in the encryption of the communication for the terminal to access the storage location of the stored image data. For example, the encryption key can be included in a frame of the modulated optical signal as a symbol related to an encryption key.

For example, the information may include an identifier of a base station for wireless communication for the terminal to access the storage location of the stored image data. The identifier of the base station is, for example, an SSID. For example, the identifier of the base station can be included in a frame of the modulated optical signal as a symbol related to an SSID.

For example, the information may include position information indicating the position of the location at which the image was captured. Position information is, for example, an identifier that can uniquely specify a seat in a stadium. For example, the position information can be included in a frame of the modulated optical signal as a symbol related to position information.

Terminal 3980 includes reception device 3981 and transceiver device 3982.

Reception device 3981 receives light including, as a visible light communication signal, information indicating the storage location of image data.

Transceiver device 3982 receives image data from the storage location indicated in the information received by reception device 3981.

Next, processes performed by the system will be described.

Figure 39B:
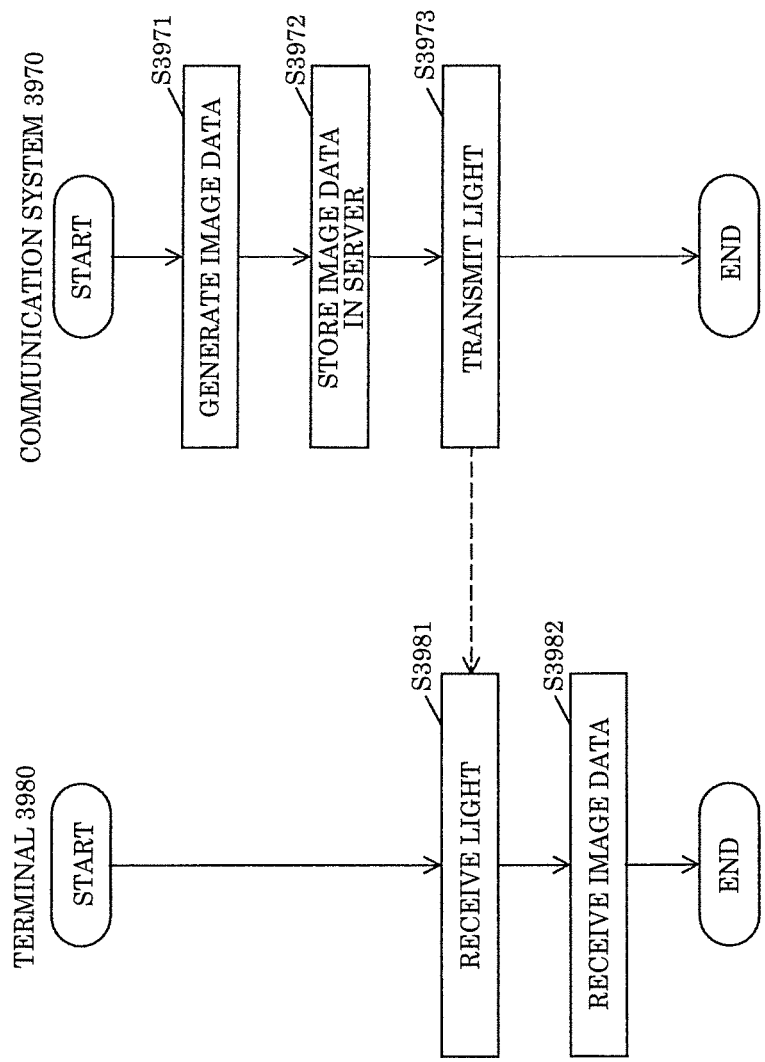
FIG. 39B is a flow chart illustrating an example of processes related to a video provision method that uses modulated optical signals.

FIG. 39B is a flow chart illustrating an example of processes related to the video provision method that uses modulated optical signals.

As illustrated in FIG. 39B, in step S3971, image data is generated by capturing by the plurality of cameras 3971A, etc.

In step S3972, the image data generated by each of the plurality of cameras 3971A, etc., is stored in server 3972.

Each of the plurality of transmission devices 3973A, etc., transmits light including, as a visible light communication signal, information related to communication for access to the storage location at which the image data generated by the camera corresponding to the transmission device is stored in server 3972.

In step S3981, light including information indicating the storage location of the image data is received as a visible light communication signal.

In step S3982, image data is received from the storage location indicated in the received information.

Hereinafter, the system will be described in greater detail.

Figure 39C:
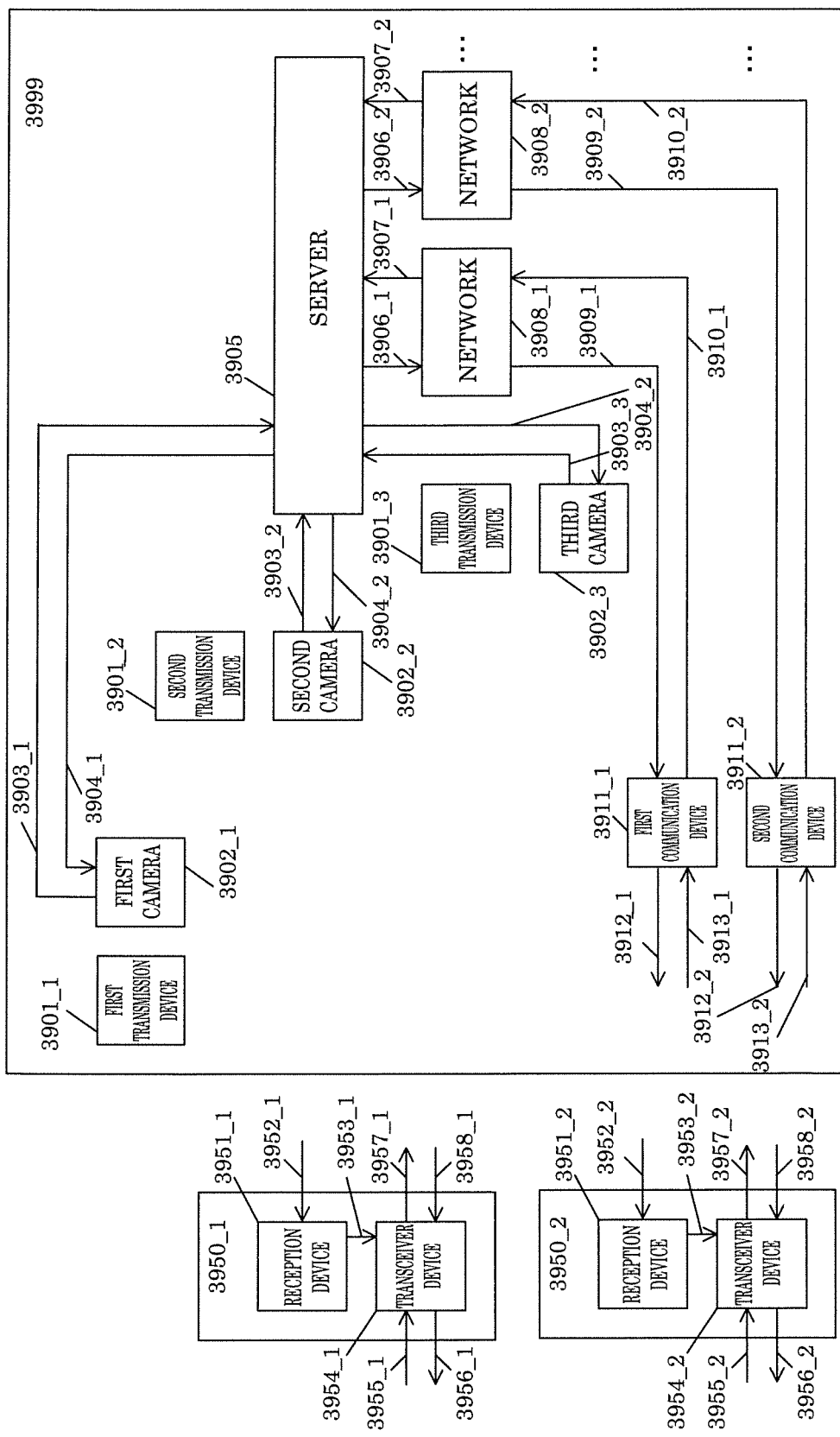
FIG. 39C illustrates a second example of a system related to a video provision method that uses modulated optical signals.

FIG. 39C illustrates a second example of a system related to a video provision method that uses modulated optical signals according to this embodiment.

This system includes video provision system 3999 and terminals 3950_1 and 3950_2. Video provision system 3999 corresponds to the communication system described above.

First camera 3902_1 communicates with server 3905, transmits signal 3903_1 including first captured data to server 3905, and server 3905 transmits a signal including first data to first camera 3902_1.

Second camera 3902_2 communicates with server 3905, transmits signal 3903_2 including second captured data to server 3905, and server 3905 transmits a signal including second data to second camera 3902_2.

Third camera 3902_3 communicates with server 3905, transmits signal 3903_3 including third captured data to server 3905, and server 3905 transmits a signal including third data to third camera 3902_3.

Here, server 3905 provides a video or still image captured by first camera 3902_1 (corresponding to the first captured data) to, for example, an accessed terminal. Similarly, server 3905 provides a video or still image captured by second camera 3902_2 (corresponding to the second captured data) to, for example, an accessed terminal. Further, server 3905 provides a video or still image captured by third camera 3902_3 (corresponding to the third captured data) to, for example, an accessed terminal.

First transmission device 3901_1 includes a transmission device for transmitting (emitting) a modulated optical signal, and a transmitted modulated optical signal includes information on the access destination of server 3905 for obtaining a video or still image captured by first camera 3902_1 (corresponding to the first captured data) (this access destination information is, for example, a uniform resource locator (URL)). Accordingly, as a result of the terminal receiving the modulated optical signal transmitted (emitted) by first transmission device 3901_1, the terminal can obtain the access destination information for server 3905, and thus obtain the video or still image captured by first camera 3902_1 (corresponding to the first captured data).

Second transmission device 3901_2 includes a transmission device for transmitting (emitting) a modulated optical signal, and a transmitted modulated optical signal includes information on the access destination of server 3905 for obtaining a video or still image captured by second camera 3902_2 (corresponding to the second captured data) (this access destination information is, for example, a URL). Accordingly, as a result of the terminal receiving the modulated optical signal transmitted (emitted) by second transmission device 3901_2, the terminal can obtain the access destination information for server 3905, and thus obtain the video or still image captured by second camera 3902_2 (corresponding to the second captured data).

Third transmission device 3901_3 includes a transmission device for transmitting (emitting) a modulated optical signal, and a transmitted modulated optical signal includes information on the access destination of server 3905 for obtaining a video or still image captured by third camera 3902_3 (corresponding to the third captured data) (this access destination information is, for example, a URL). Accordingly, as a result of the terminal receiving the modulated optical signal transmitted (emitted) by third transmission device 3901_3, the terminal can obtain the access destination information for server 3905, and thus obtain the video or still image captured by third camera 3902_3 (corresponding to the third captured data).

Note that the video may include sound.

First communication device 3911_1 is a device that communicates with, for example, terminal 3950_1 or terminal 3950_2. Server 3905 outputs signal 3906_1 (3909_1) including data, and first communication device 3911_1 receives this as an input via network 3908_1. First communication device 3911_1 then transmits this modulated signal 3912_1 including data.

On the other hand, first communication device 3911_1 receives reception signal 3913_1 from a terminal, performs signal processing such as demodulation to obtain reception data, and outputs signal 3910_1 including this data. Signal 3910_1 (3907_1) is input into server 3905 via the network.

Second communication device 3911_2 is a device that communicates with, for example, terminal 3950_1 or terminal 3950_2. Server 3905 outputs signal 3906_2 (3909_2) including data, and second communication device 3911_2 receives this as an input via network 3908_2. Second communication device 3911_2 then transmits this modulated signal 3912_2 including data.

On the other hand, second communication device 3911_2 receives reception signal 3913_2 from a terminal, performs signal processing such as demodulation to obtain reception data, and outputs signal 3910_2 including this data. Signal 3910_2 (3907_2) is input into server 3905 via the network.

Terminal 3950_1 includes reception device 3951_1 that receives and demodulates modulated optical signals and reception device 3954_1 that communicates with first communication device 3911_1 and second communication device 3911_2.

Reception device 3951_1 receives modulated optical signal 3952_1 (received by first transmission device 3901_1 or second transmission device 3901_2 or third transmission device 3901_3), and performs processing such as demodulation and error correction decoding on modulated optical signal 3952_1 to obtain and output reception data 3953_1.

Transceiver device 3954_1 receives inputs of data 3955_1 and (reception) data 3953_1, and performs signal processing such as error correction encoding and modulation to generate and output modulated signal 3957_1.

Transceiver device 3954_1 also receives an input of reception signal 3958_1 of the modulated signal transmitted by first communication device 3911_1 and/or second communication device 3911_2, etc., performs processing such as demodulation and error correction decoding, and obtains and outputs reception data 3956_1.

Similarly, terminal 3950_2 includes reception device 3951_2 that receives and demodulates modulated optical signals and reception device 3954_2 that communicates with first communication device 3911_1 and second communication device 3911_2.

Reception device 3951_2 receives modulated optical signal 3952_2 (received by first transmission device 3901_1 or second transmission device 3901_2 or third transmission device 3901_3), and performs processing such as demodulation and error correction decoding on modulated optical signal 3952_2 to obtain and output reception data 3953_2.

Transceiver device 3954_2 receives inputs of data 3955_2 and (reception) data 3953_2, and performs signal processing such as error correction encoding and modulation to generate and output modulated signal 3957_2.

Transceiver device 3954_2 also receives an input of reception signal 3958_2 of the modulated signal transmitted by first communication device 3911_1 and/or second communication device 3911_2, etc., performs processing such as demodulation and error correction decoding, and obtains and outputs reception data 3956_2.

Next, the video provision method that uses modulated optical signals, and operations performed by the system illustrated in FIG. 39C will be described with reference to FIG. 40, FIG. 41, and FIG. 42.

Figure 40:
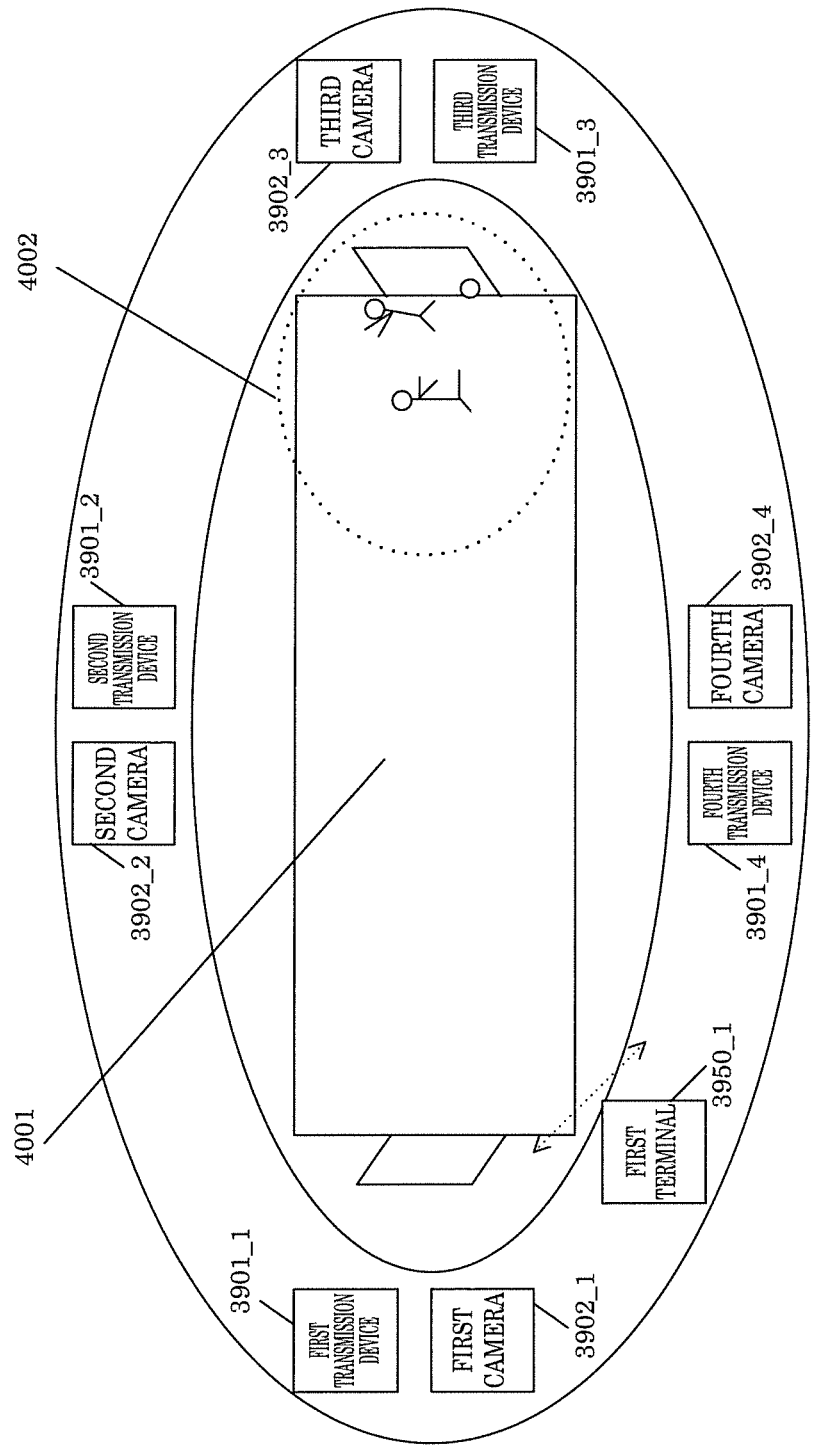
FIG. 40 illustrates one example of a scene in a stadium.

FIG. 40 illustrates one example of a scene in, for example, a stadium. Assume a soccer match is taking place on field 4001. Moreover, assume a goal is being made in area 4002. Note that in FIG. 40, devices that correspond to those in FIG. 39C share like reference signs.

Assume first camera 3902_1, second camera 3902_2, third camera 3902_3, and fourth camera 3902_4 are set up so as to capture a video or still image of, for example, the match on the field or the spectators in the stands. Note that as operations pertaining to first camera 3902_1, second camera 3902_2, third camera 3902_3, and fourth camera 3902_4 have already been described with reference to FIG. 39C, repeated description will be omitted.

First transmission device 3901_1, second transmission device 3901_2, third transmission device 3901_3, and fourth transmission device 3901_4 are provided in correspondence with first camera 3902_1, second camera 3902_2, third camera 3902_3, and fourth camera 3902_4. Note that as operations pertaining to first transmission device 3901_1, second transmission device 3901_2, third transmission device 3901_3, and fourth transmission device 3901_4 have already been described with reference to FIG. 39C, repeated description will be omitted. Here, first transmission device 3901_1 may be set up near first camera 3902_1, second transmission device 3901_2 may be set up near second camera 3902_2, third transmission device 3901_3 may be set up near third camera 3902_3, and fourth transmission device 3901_4 may be set up near fourth camera 3902_4. Moreover, first transmission device 3901_1, second transmission device 3901_2, third transmission device 3901_3, and fourth transmission device 3901_4 may also function to illuminate the field of the stadium.

In FIG. 40, first terminal 3950_1 and the user of first terminal 3950_1 are in the position indicated in FIG. 40. From this position, there is a high probability that the goal being made in area 4002 is difficult to see. Accordingly, assume the user of first terminal 3950_1 wishes to view a video or still image being captured by a camera near area 4002 of the goal, i.e., third camera 3902_3.

Therefore, assume the user faces the light receiver of reception device 3951 in first terminal 3950_1 toward third camera 3902_3. With this, first terminal 3905_1 receives a modulated optical signal transmitted (emitted) by third transmission device 3901_3 disposed near third camera 3902_3.

This results in first terminal 3905_1 obtaining the video or still image information captured by third camera 3902_3, which will be described in greater detail with reference to FIG. 41 and FIG. 42.

Figure 41:
FIG. 41 illustrates an example of a flow of operations performed by a camera, a transmission device, and a server.

FIG. 41 illustrates an example of the flow of processes performed by k-th camera 3902_k, k-th transmission device 3901_k, and server 3905. Note that in the example illustrated in FIG. 40, k is 1 or 2 or 3 or 4. However, the number of cameras and transmission devices is not limited to 4.

Moreover, in FIG. 39C and FIG. 40, the device that transmits a modulated optical signal including information on (for example, the URL of) the access destination of server 3905 for obtaining the video or still image captured by k-th camera 3902_k (corresponding to k-th captured data) is exemplified as a single device, but the device that transmits a modulated optical signal including information on (for example, the URL of) the access destination of server 3905 for obtaining the video or still image captured by k-th camera 3902_k (corresponding to k-th captured data) may be a plurality of devices. Even in such cases, the present disclosure can be implemented in the same manner.

As illustrated in FIG. 41, k-th camera 3902_k captures a video or still image (4101).

k-th camera 3902_k then transmits the captured data to server 3905. k-th camera 3902_k then transmits information on the access destination for watching the video or still image on the server to k-th transmission device 3901_k (4102).

Then, k-th transmission device 3901_k obtains the information on the access destination for watching the video or still image stored on the server. k-th transmission device 3901_k then transmits (emits) a modulated optical signal including this information (4103).

Server 3905 stores and distributes the captured data transmitted by k-th camera 3902_k (4104).

Note that in the example illustrated in FIG. 41, k-th camera 3902_k transmits access destination information for viewing the video or still image on the server to k-th transmission device 3901_k, but instead of this, k-th transmission device 3901_k may store in advance the access destination information for viewing the video or still image on the server. As another method, the operation of k-th camera 3902_k transmitting information on the access destination for watching the video or still image on the server to k-th transmission device 3901_k is not limited to being performed at the timing exemplified in FIG. 41; the operation may be performed at any time.

Figure 42:
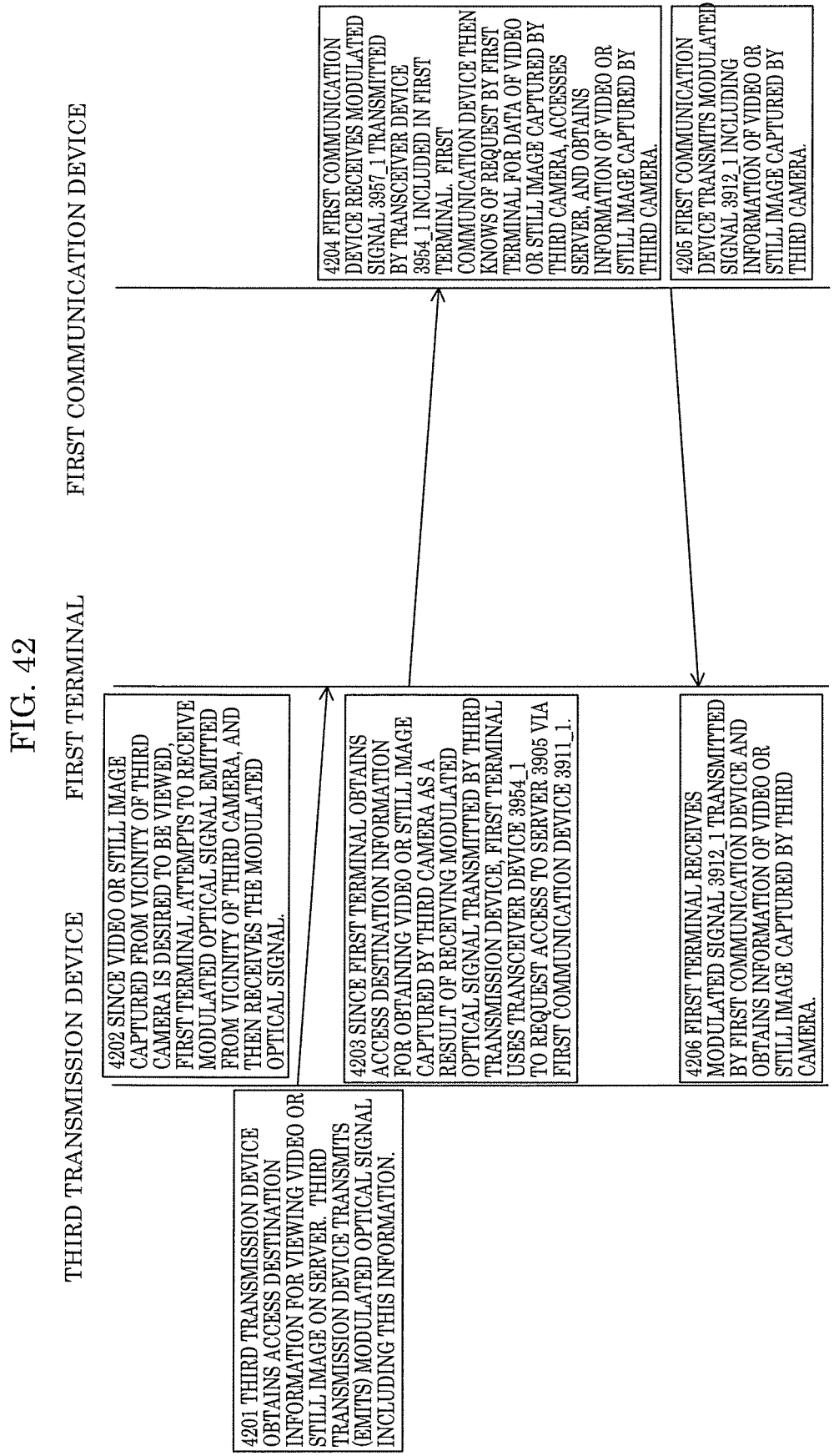
FIG. 42 illustrates an example of a flow of operations performed by a terminal, a transmission device, and a communication device.

FIG. 42 illustrates an example of a flow of operations performed by first terminal 3950_1, third transmission device 3902_3, and first communication device 3911_1 when, in the scene illustrated in FIG. 40, first terminal 3950_1 attempts to obtain the video or still image information captured by third camera 3902_3.

As illustrated in FIG. 42, third transmission device 3901_3 obtains information on the access destination for viewing the video or still image captured by third camera 3902_3, which is stored on server 3905. Third transmission device 3901_3 then transmits (emits) a modulated optical signal including this information (4201).

Since the user of first terminal 3950_1 wants to view a video or still image captured from the vicinity of third camera 3902_3, first terminal 3950_1 attempts to receive a modulated optical signal emitted from the vicinity of third camera 3902_3, that is to say, a modulated optical signal transmitted by third transmission device 3901_3, and then receives the modulated optical signal (4202).

Then, since first terminal 3950_1 obtains information on the access destination for obtaining the video or still image captured by third camera 3902_3 as a result of receiving the modulated optical signal transmitted by third transmission device 3901_3, first terminal 3950_1 uses transceiver device 3954_1 to request access to server 3905 via first communication device 3911_1 (4203).

First communication device 3911_1 receives modulated signal 3957_1 transmitted by transceiver device 3954_1 included in first terminal 3950_1. First communication device 3911_1 then knows of the request by first terminal 3950_1 for the data of the video or still image captured by third camera 3902_3, accesses server 3905, and obtains the information of the video or still image captured by third camera 3902_3 (4204).

First communication device 3911_1 then transmits modulated signal 3912_1 including the information of the video or still image captured by third camera 3902_3 (4205).

As a result, first terminal 3950_1 receives modulated signal 3912_1 transmitted by first communication device 3911_1, and obtains the information of the video or still image captured by third camera 3902_3 (4206).

In the example given for describing the scene in FIG. 40, only a single first terminal 3950_1 is exemplified as being present, but this example is not limiting. In other words, a plurality of terminals may, for example, access the information of the video or still image captured by third camera 3902_3.

Moreover, in FIG. 39C, two communication devices for accessing server 3950, i.e., first communication device 3911_1 and second communication device 3911_2, but the number of communication devices is not limited to two; the number of communication devices may be one, and may be two or more.

With the above, it is possible to achieve the advantageous effect that a user of a terminal can obtain desired video or still image data.

Next, an example of the frame configuration of the modulated signal transmitted by the devices in FIG. 39C will be given.

Figure 43:
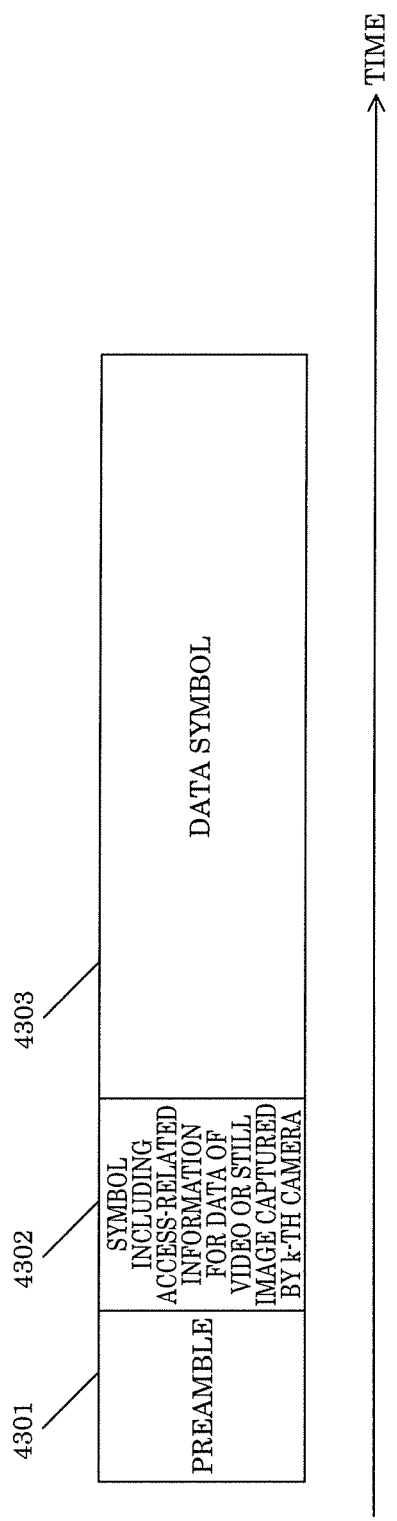
FIG. 43 illustrates one example of a frame configuration of a modulated optical signal transmitted by a transmission device.

FIG. 43 illustrates one example of a frame configuration of the modulated optical signal transmitted by first transmission device 3901_1, second transmission device 3901_2, and third transmission device 3901_3 in FIG. 39C. Time is represented on the horizontal axis. For example, k-th transmission device 3901_$k$ transmits, in stated order: preamble 4301; a symbol including access-related information for the data of the video or still image captured by the k-th camera; and data symbol 4303.

Note that preamble 4301 shall include a symbol for performing synchronization, such as time synchronization, by the reception device of the communication partner, a symbol for performing signal detection by the reception device of the communication partner, and a symbol including control information necessary for the reception device of the communication partner to demodulate the various symbols (for example, information on the communication method, information on the modulation scheme, and/or information related to the error correction code).

Symbol 4302 including access-related information on the data of the video or still image captured by the k-th camera is a symbol for notifying a reception device, which is the communication partner, of information related to the access destination of the data of the video or still image captured by the k-th camera.

Data symbol 4303 is a symbol for first transmission device 3901_1, second transmission device 3901_2, and third transmission device 3901_3 to transmit data to terminals, such as first terminal 3950_1 and second terminal 3950_2.

Note that in FIG. 43, symbols may be arranged along the frequency axis, that is to say, the carrier axis. Accordingly, the modulated signal may be a multi-carrier modulated signal such as an Orthogonal Frequency Division Multiplexing (OFDM) modulated signal, and symbols other than those shown in FIG. 43 may be included in the frame. Moreover, the order in which the symbols are transmitted is not limited to the example illustrated in FIG. 43.

Figure 44:
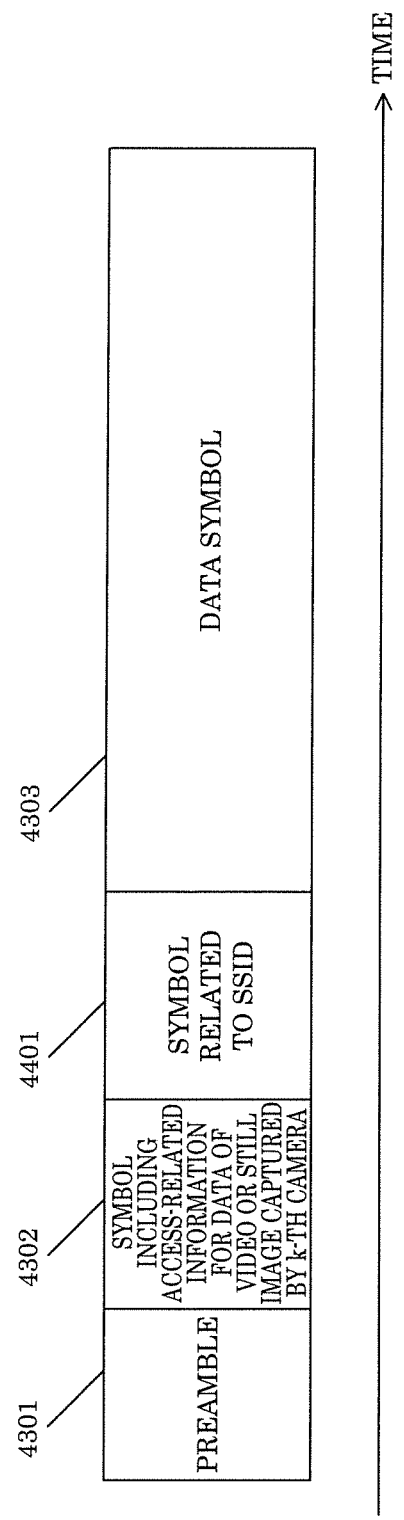
FIG. 44 illustrates one example of a frame configuration of a modulated optical signal transmitted by a transmission device.

FIG. 44 illustrates one example of a frame configuration of the modulated optical signal transmitted by first transmission device 3901_1, second transmission device 3901_2, and third transmission device 3901_3 in FIG. 39C, which differs from the example illustrated in FIG. 43. Time is represented on the horizontal axis. Note that in FIG. 44, objects that operate the same as in FIG. 43 share like reference marks. Accordingly, repeated description thereof will be omitted.

FIG. 44 differs from FIG. 43 in regard to the inclusion in the frame of symbol 4401 related to an SSID. In other words, first transmission device 3901_1, second transmission device 3901_2, and third transmission device 3901_3 notify terminals, such as first terminal 3950_1 and second terminal 3950_2, of the SSID of, for example, a wireless LAN that are they can access. With this, a terminal can easily and securely connect to the wireless LAN. Note that since details regarding the method used to access, for example, the wireless LAN, using symbol 4401 related to an SSID, have already been described in Embodiments 1 through 7, repeated description will be omitted.

With this, terminals such as first terminal 3950_1 and second terminal 3950_2 can access the data of the video or still image captured by first camera 3902_1, the data of the video or still image captured by second camera 3902_2, and the data of the video or still image captured by third camera 3902_3, via an access point such as a wireless LAN access point.

Note that in such cases, first communication device 3911_1 and second communication device 3911_2 in FIG. 39C are, for example, wireless LAN access points. Moreover, in FIG. 44, symbols may be arranged along the frequency axis, that is to say, the carrier axis. Accordingly, the modulated signal may be a multi-carrier modulated signal such as an OFDM modulated signal, and symbols other than those shown in FIG. 44 may be included in the frame. Moreover, the order in which the symbols are transmitted is not limited to the example illustrated in FIG. 44.

Figure 45:
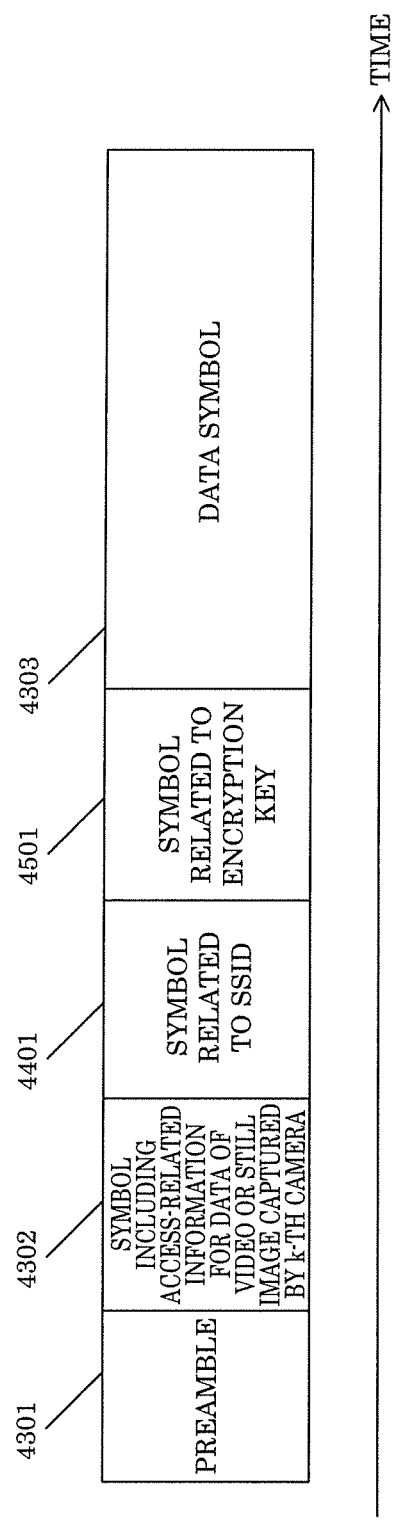
FIG. 45 illustrates one example of a frame configuration of a modulated optical signal transmitted by a transmission device.

FIG. 45 illustrates one example of a frame configuration of the modulated optical signal transmitted by first transmission device 3901_1, second transmission device 3901_2, and third transmission device 3901_3 in FIG. 39C, which differs from the example illustrated in FIG. 43 and FIG. 44. Time is represented on the horizontal axis. Note that in FIG. 45, objects that operate the same as in FIG. 43 and FIG. 44 share like reference marks. Accordingly, repeated description thereof will be omitted.

FIG. 45 differs from FIG. 43 and FIG. 44 in regard to the inclusion in the frame of symbol 4501 related to an encryption key. In other words, first transmission device 3901_1, second transmission device 3901_2, and third transmission device 3901_3 notify terminals, such as first terminal 3950_1 and second terminal 3950_2, of the SSID of, for example, a wireless LAN that are they can access, and the encryption key for that wireless LAN. With this, a terminal can easily and securely connect to the wireless LAN. Note that since details regarding the method used to access, for example, the wireless LAN, using symbol 4401 related to an SSID and symbol 4501 related to an encryption key, have already been described in Embodiments 1 through 7, repeated description will be omitted.

With this, terminals such as first terminal 3950_1 and second terminal 3950_2 can access the data of the video or still image captured by first camera 3902_1, the data of the video or still image captured by second camera 3902_2, and the data of the video or still image captured by third camera 3902_3, via an access point such as a wireless LAN access point.

Note that in such cases, first communication device 3911_1 and second communication device 3911_2 in FIG. 39C are, for example, wireless LAN access points. Moreover, in FIG. 45, symbols may be arranged along the frequency axis, that is to say, the carrier axis. Accordingly, the modulated signal may be a multi-carrier modulated signal such as an OFDM modulated signal, and symbols other than those shown in FIG. 45 may be included in the frame. Moreover, the order in which the symbols are transmitted is not limited to the example illustrated in FIG. 45.

Figure 46:
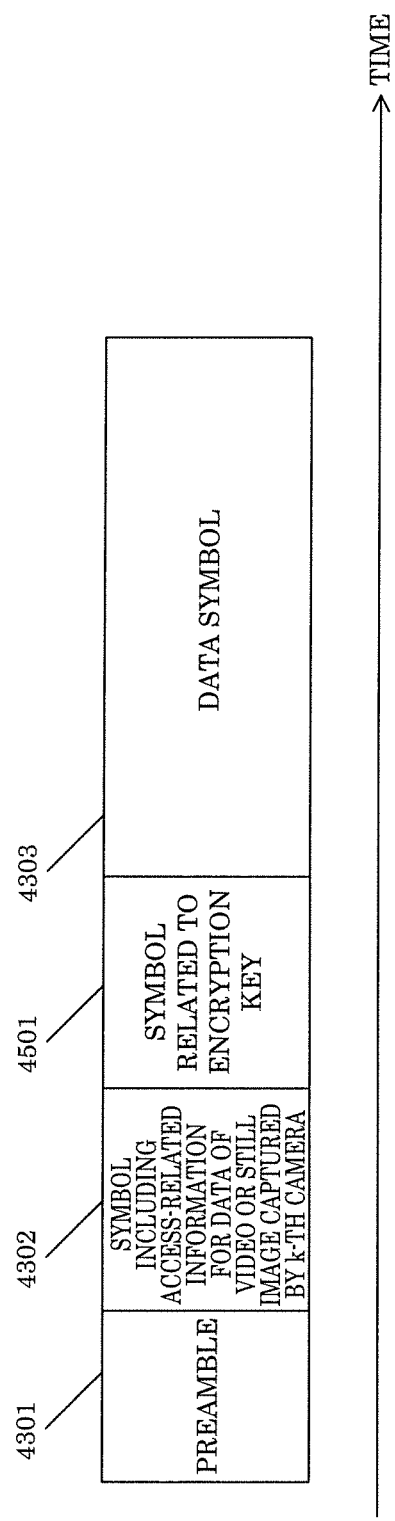
FIG. 46 illustrates one example of a frame configuration of a modulated optical signal transmitted by a transmission device.

FIG. 46 illustrates one example of a frame configuration of the modulated optical signal transmitted by first transmission device 3901_1, second transmission device 3901_2, and third transmission device 3901_3 in FIG. 39C, which differs from the example illustrated in FIG. 43, FIG. 44, and FIG. 45. Time is represented on the horizontal axis. Note that in FIG. 46, objects that operate the same as in FIG. 43 and FIG. 45 share like reference marks. Accordingly, repeated description thereof will be omitted.

A characterizing feature of FIG. 46 is that the frame does not include a symbol related to an SSID and does include symbol 4501 related to an encryption key. Here, either of the following two methods may be applied.

(First Method)

The transmission device that transmits a frame like that in FIG. 44 that includes symbol 4401 related to an SSID and the transmission device that transmits a frame like that in FIG. 46 that includes symbol 4501 related to an encryption key are separate devices. The terminal receives the modulated optical signals from the two transmission devices, and can thereby access a communication device such as a wireless LAN communication device.

With this, the terminal can access the data of the video or still image captured by first camera 3902_1, the data of the video or still image captured by second camera 3902_2, and the data of the video or still image captured by third camera 3902_3, via a communication device such as a wireless LAN communication device.

Note in one of the frame configuration in FIG. 44 and the frame configuration in FIG. 46 need not include symbol 4302 including access-related information for the data of the video or still image captured by the k-th camera.

With this, terminals such as first terminal 3950_1 and second terminal 3950_2 can access the data of the video or still image captured by first camera 3902_1, the data of the video or still image captured by second camera 3902_2, and the data of the video or still image captured by third camera 3902_3, via an access point such as a wireless LAN access point.

Note that in such cases, first communication device 3911_1 and second communication device 3911_2 in FIG. 39C are, for example, wireless LAN access points. Moreover, in FIG. 46, symbols may be arranged along the frequency axis, that is to say, the carrier axis. Accordingly, the modulated signal may be a multi-carrier modulated signal such as an OFDM modulated signal, and symbols other than those shown in FIG. 46 may be included in the frame. Moreover, the order in which the symbols are transmitted is not limited to the example illustrated in FIG. 46.

(Second Method)

Consider a situation in which a terminal is capable of obtaining information on an access point such as a wireless LAN access point. In such cases, assume the terminal receives a modulated optical signal having the frame configuration illustrated in FIG. 46, and obtains symbol 4501 related to an encryption key. With this, the terminal can connect to an access point such as a wireless LAN access point. With this, terminals such as first terminal 3950_1 and second terminal 3950_2 can access the data of the video or still image captured by first camera 3902_1, the data of the video or still image captured by second camera 3902_2, and the data of the video or still image captured by third camera 3902_3, via an access point such as a wireless LAN access point.

Note that in such cases, first communication device 3911_1 and second communication device 3911_2 in FIG. 39C are, for example, wireless LAN access points. Moreover, in FIG. 46, symbols may be arranged along the frequency axis, that is to say, the carrier axis. Accordingly, the modulated signal may be a multi-carrier modulated signal such as an OFDM modulated signal, and symbols other than those shown in FIG. 46 may be included in the frame.

By implementing the above, in order to obtain video or still image captured at a position desired by the user, the user orients the terminal toward the position desired by the user, and the terminal can achieve the advantageous effect that the video or still image captured at the position desired by the user with simple operations.

Embodiment A3

In this embodiment, a frame configuration will be described that is different from the frame configurations described in Embodiment A2 and illustrated in FIG. 43 through FIG. 46 of a modulated optical signal transmitted by first transmission device 3901_1, second transmission device 3901_2, and third transmission device 3901_3 in FIG. 39C.

Figure 47:
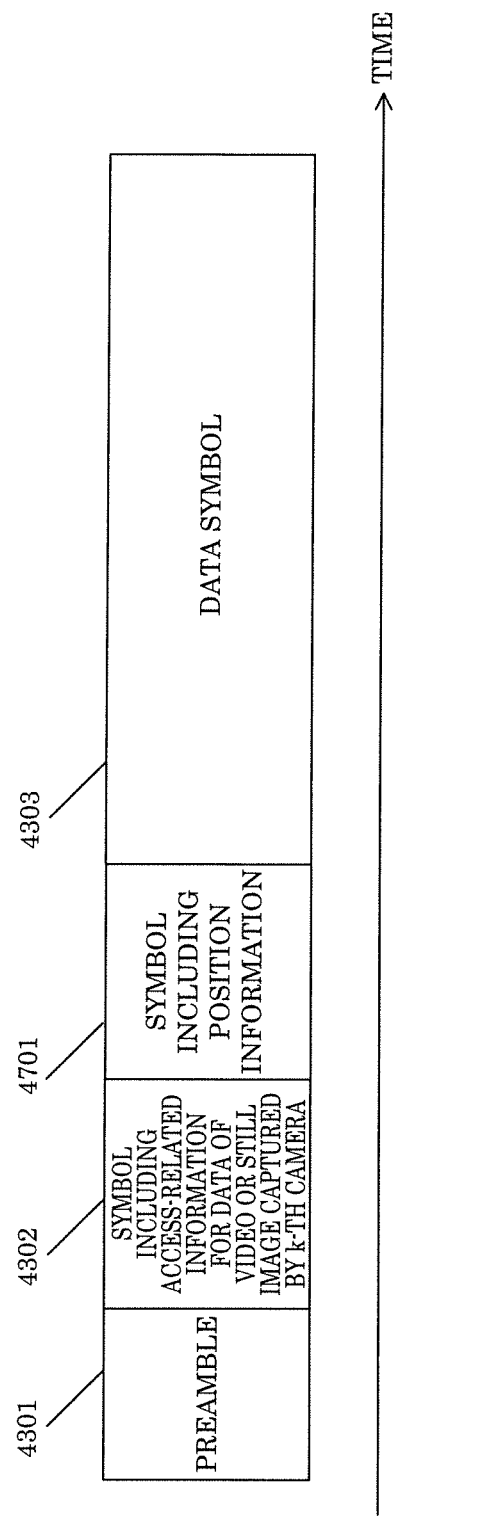
FIG. 47 illustrates one example of a frame configuration of a modulated optical signal transmitted by a transmission device.

FIG. 47 illustrates one example of a frame configuration of the modulated optical signal transmitted by first transmission device 3901_1, second transmission device 3901_2, and third transmission device 3901_3 in FIG. 39C. Time is represented on the horizontal axis. The frame configuration in FIG. 47 includes, in addition to the symbols included in the frame illustrated in FIG. 43, symbol 4701 including position information. For example, when first transmission device 3901_1 illustrated in FIG. 39C transmits the frame configuration illustrated in FIG. 47, symbol 4701 including position information includes information on the vicinity of the position of first transmission device 3901_1 or first camera 3902_1. For example, this information may indicate a seat in a stadium.

With this, a terminal can obtain information on the position at which the video or still image that the terminal is attempting to obtain was captured from, and the terminal can thus achieve the advantageous effect that it can determine whether the video or still image information is the desired information or not.

Furthermore, in, for example, a stadium, a terminal can obtain symbol 4701 including position information included in FIG. 47 whereby the advantageous effect that the user of the terminal can easily search for a seat can be obtained.

Note that in FIG. 47, symbols may be arranged along the frequency axis, that is to say, the carrier axis. Accordingly, the modulated signal may be a multi-carrier modulated signal such as an OFDM modulated signal, and symbols other than those shown in FIG. 47 may be included in the frame. Moreover, the order in which the symbols are transmitted is not limited to the example illustrated in FIG. 47.

Figure 48:
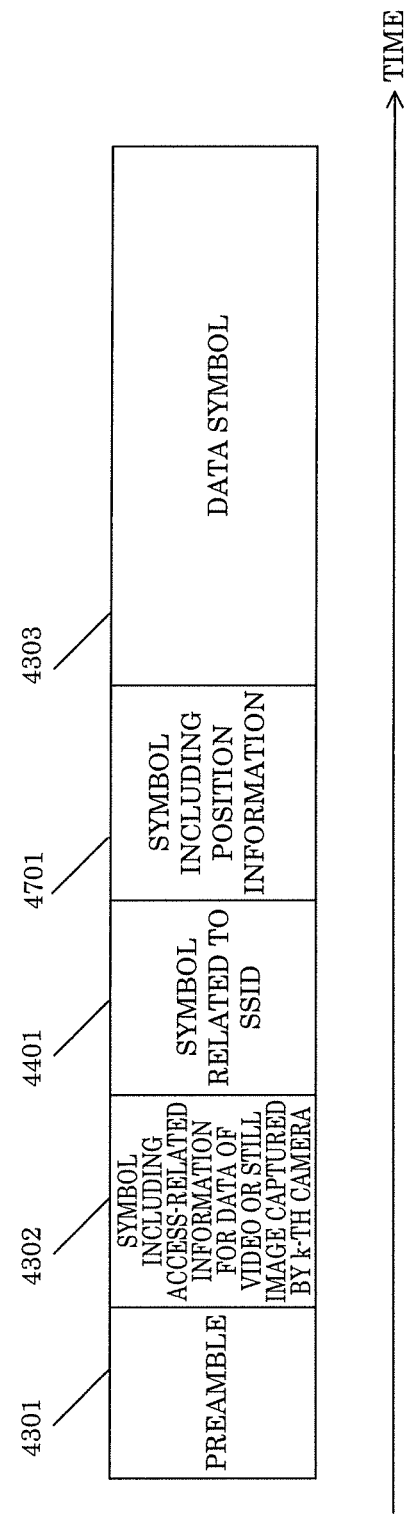
FIG. 48 illustrates one example of a frame configuration of a modulated optical signal transmitted by a transmission device.

FIG. 48 illustrates one example of a frame configuration of the modulated optical signal transmitted by first transmission device 3901_1, second transmission device 3901_2, and third transmission device 3901_3 in FIG. 39C. Time is represented on the horizontal axis. The frame configuration in FIG. 48 includes, in addition to the symbols included in the frame illustrated in FIG. 44, symbol 4701 including position information. For example, when first transmission device 3901_1 illustrated in FIG. 39C transmits the frame configuration illustrated in FIG. 48, symbol 4701 including position information includes information on the vicinity of the position of first transmission device 3901_1 or first camera 3902_1. For example, this information may indicate a seat in a stadium.

With this, a terminal can obtain information on the position at which the video or still image that the terminal is attempting to obtain was captured from, and the terminal can thus achieve the advantageous effect that it can determine whether the video or still image information is the desired information or not.

Furthermore, in, for example, a stadium, a terminal can obtain symbol 4701 including position information included in FIG. 48 whereby the advantageous effect that the user of the terminal can easily search for a seat can be obtained.

Figure 49:
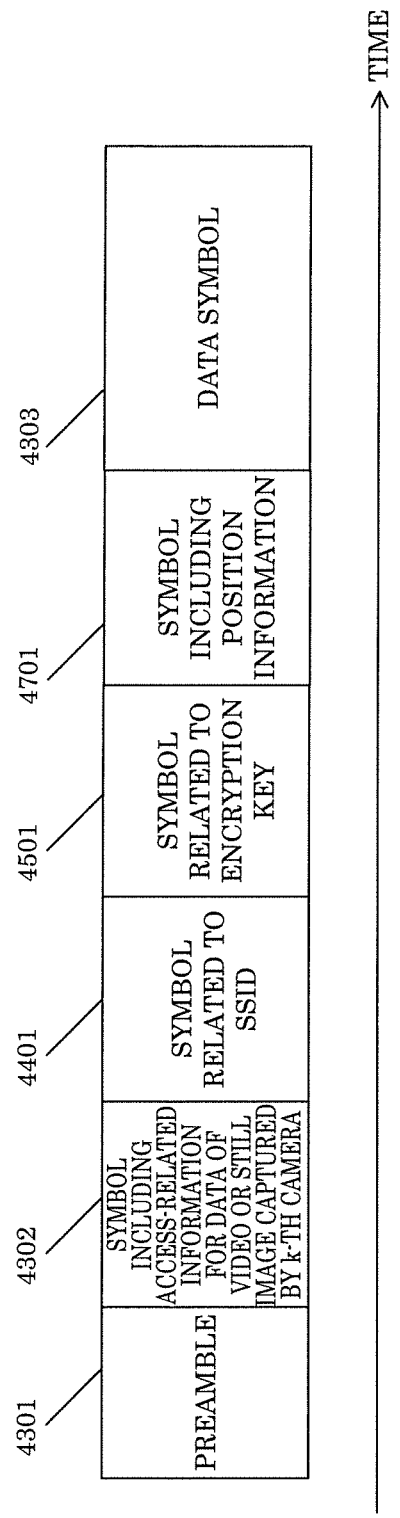
FIG. 49 illustrates one example of a frame configuration of a modulated optical signal transmitted by a transmission device.

FIG. 49 illustrates one example of a frame configuration of the modulated optical signal transmitted by first transmission device 3901_1, second transmission device 3901_2, and third transmission device 3901_3 in FIG. 39C. Time is represented on the horizontal axis. The frame configuration in FIG. 49 includes, in addition to the symbols included in the frame illustrated in FIG. 45, symbol 4701 including position information. For example, when first transmission device 3901_1 illustrated in FIG. 39C transmits the frame configuration illustrated in FIG. 49, symbol 4701 including position information includes information on the vicinity of the position of first transmission device 3901_1 or first camera 3902_1. For example, this information may indicate a seat in a stadium.

With this, a terminal can obtain information on the position at which the video or still image that the terminal is attempting to obtain was captured from, and the terminal can thus achieve the advantageous effect that it can determine whether the video or still image information is the desired information or not.

Furthermore, in, for example, a stadium, a terminal can obtain symbol 4701 including position information included in FIG. 49 whereby the advantageous effect that the user of the terminal can easily search for a seat can be obtained.

Figure 50:
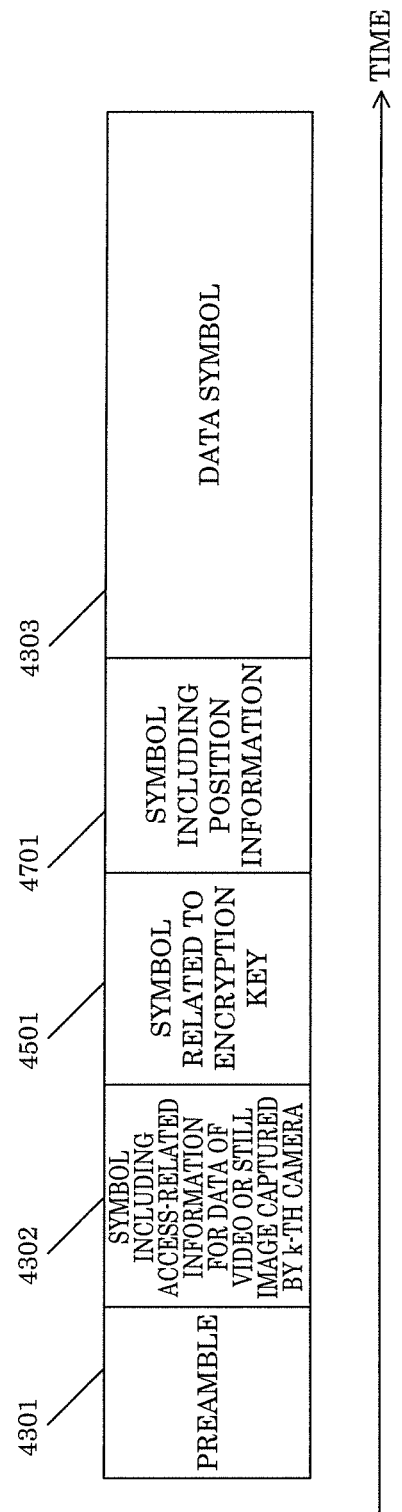
FIG. 50 illustrates one example of a frame configuration of a modulated optical signal transmitted by a transmission device.

FIG. 50 illustrates one example of a frame configuration of the modulated optical signal transmitted by first transmission device 3901_1, second transmission device 3901_2, and third transmission device 3901_3 in FIG. 39C. Time is represented on the horizontal axis. The frame configuration in FIG. 50 includes, in addition to the symbols included in the frame illustrated in FIG. 46, symbol 4701 including position information. For example, when first transmission device 3901_1 illustrated in FIG. 39C transmits the frame configuration illustrated in FIG. 50, symbol 4701 including position information includes information on the vicinity of the position of first transmission device 3901_1 or first camera 3902_1. For example, this information may indicate a seat in a stadium.

With this, a terminal can obtain information on the position at which the video or still image that the terminal is attempting to obtain was captured from, and the terminal can thus achieve the advantageous effect that it can determine whether the video or still image information is the desired information or not.

Furthermore, in, for example, a stadium, a terminal can obtain symbol 4701 including position information included in FIG. 50 whereby the advantageous effect that the user of the terminal can easily search for a seat can be obtained.

Moreover, first terminal 3950_1 and second terminal 3950_2 illustrated in FIG. 39C may have the function of storing the position information included in symbol 4701 including position information transmitted by first transmission device 3901_1, second transmission device 3901_2, and third transmission device 3901_3. With this, the user of the terminals can easily summon the position information (seat information for the stadium), and can know the access destination for obtaining the video and still image, along with the position information.

Supplemental Information 3

In embodiments including description of operations related to a vehicle including the communication device in the present specification, "vehicle including the communication device" may be rewritten as "robot including the communication device", "conveyance including the communication device", "mobile home appliance (electrical machine used in the home) including the communication device", "two-wheeled vehicle including the communication device", "drone including the communication device", "aircraft including the communication device", "airship including the communication device", or "watercraft including the communication device". Even in such cases, the embodiments may be implemented in the same manner and achieve the same advantageous effects.

Moreover, in Embodiment A2, for example, in FIG. 40, first terminal 3950_1 is exemplified as obtaining any one of: a video or image captured by first camera 3902_1; a video or image captured by second camera 3902_2; a video or image captured by third camera 3902_3; and a video or image captured by fourth camera 3902_4, but for example, when a fifth transmission device 3901_5 is present between third transmission device 3901_3 and fourth transmission device 3901_4, and first terminal 3950_1 obtains this modulated optical signal, from among a plurality of videos and images included among a video or image captured by first camera 3902_1, a video or image captured by second camera 3902_2, a video or image captured by third camera 3902_3, and a video or image captured by fourth camera 3902_4, a video or image estimated to be captured in the vicinity of fifth transmission device 3901_5 may be generated and provided to first terminal 3950_1. Note that the generation of this video or image may be performed by, for example, server 3905 in FIG. 39C, and provided to first terminal 3950_1 using the same method as the video or image provision method described in Embodiment A2.

Communication system 3970 in FIG. 39A described in Embodiment A2 may be provided in, for example, a robot, a vehicle, a conveyance, a (mobile) home appliance (electrical machine used in the home), a two-wheeled vehicle, a drone, aircraft, an airship, and watercraft. Moreover, as previously described, when a plurality of cameras are provided, a composite or virtual viewpoint video or image may be generated from the video or images obtained from the plurality of cameras and provided to the terminal. Note that in FIG. 39A, a composite or virtual viewpoint video or image is generated by, for example, server 3972. Note that although this component is referred to as a "server", it may be a signal processor.

In the present specification, the component referred to as a server is not limited to being identified this naming, and may be a signal processor, personal computer, computer, tablet, calculation processor, CPU, or Graphics Processing Unit (GPU).

Each of the components in each of the above-described embodiments may be configured in the form of an exclusive hardware product, or may be realized by executing a software program suitable for the component. Each of the components may be realized by means of a program executing unit, such as a CPU or a processor, reading and executing the software program recorded on a recording medium such as a hard disk or a semiconductor memory. Here, the software program for realizing the system or device according to each of the embodiments is a program described below.

The program causes a computer to execute: a control method for a communication system including a plurality of cameras, a server, and a plurality of transmission devices in one-to-one correspondence with the plurality of cameras, the method including: generating image data by the plurality of cameras capturing an image; storing the image data generated by each of the plurality of cameras in the server; and transmitting, by each of the plurality of transmission devices, light including, as a visible light communication signal, information related to communication for accessing a storage location at which the image data generated by a corresponding one of the plurality of cameras is stored in the server.

Moreover, the program causes a computer to execute: a control method for a terminal, including: receiving light including, as a visible light communication signal, information indicating a storage location of image data; and receiving the image data from the storage location indicated in the information received.

While the foregoing has described a communication system, etc., according to one or more aspect based on embodiments, the present disclosure is not limited to these embodiments. Various modifications of the embodiments as well as embodiments resulting from combinations of components described in the different embodiments that may be conceived by those skilled in the art are intended to be included within the scope of the one or more aspect, as long as they do not depart from the true scope of the present disclosure.

INDUSTRIAL APPLICABILITY

The present disclosure is applicable in the obtainment of location information.

What is claimed is:

1. A communication system, comprising:
a plurality of cameras that generate image data by capturing an image;
a server that stores the image data generated by each of the plurality of cameras; and
a plurality of transmission devices in one-to-one correspondence with the plurality of cameras, wherein each of the plurality of transmission devices transmits light including a visible light communication signal whose luminance is temporally modulated in accordance with information related to communication for accessing a storage location at which the image data generated by a corresponding one of the plurality of cameras is stored in the server.

2. The communication system according to claim 1, wherein the information includes address information indicating the storage location at which the image data is stored.

3. The communication system according to claim 1, wherein the information includes an encryption key used in encryption of communication for a terminal to access the storage location at which the image data is stored.

4. The communication system according to claim 1, wherein the information includes an identifier of a base station for wireless communication for a terminal to access the storage location at which the image data is stored.

5. The communication system according to claim 1, wherein the information includes position information indicating a position of a location at which the image was captured.

6. A control method for a communication system including a plurality of cameras, a server, and a plurality of transmission devices in one-to-one correspondence with the plurality of cameras, the control method comprising:
generating image data by the plurality of cameras capturing an image;
storing the image data generated by each of the plurality of cameras in the server; and
transmitting, by each of the plurality of transmission devices, light including a visible light communication signal whose luminance is temporally modulated in accordance with information related to communication for accessing a storage location at which the image data generated by a corresponding one of the plurality of cameras is stored in the server.

* * * * *